United States Patent
Fadeev et al.

(10) Patent No.: US 11,872,189 B2
(45) Date of Patent: *Jan. 16, 2024

(54) GLASS ARTICLES WITH LOW-FRICTION COATINGS

(71) Applicant: CORNING INCORPORATED, Corning, NY (US)

(72) Inventors: Andrei Gennadyevich Fadeev, Elmira, NY (US); Theresa Chang, Painted Post, NY (US); Dana Craig Bookbinder, Corning, NY (US); Santona Pal, Painted Post, NY (US); Chandan Kumar Saha, Franklin, MI (US); Steven Edward DeMartino, Painted Post, NY (US); Christopher Lee Timmons, Big Flats, NY (US); John Stephen Peanasky, Big Flats, NY (US)

(73) Assignee: Corning Incorporated, Corning, NY (US)

(*) Notice: Subject to any disclaimer, the term of this patent is extended or adjusted under 35 U.S.C. 154(b) by 162 days.

This patent is subject to a terminal disclaimer.

(21) Appl. No.: 16/870,657

(22) Filed: May 8, 2020

(65) Prior Publication Data

US 2020/0268608 A1 Aug. 27, 2020

Related U.S. Application Data

(63) Continuation of application No. 16/185,493, filed on Nov. 9, 2018, which is a continuation of application
(Continued)

(51) Int. Cl.
*A61J 1/14* (2023.01)
*B65D 23/08* (2006.01)
(Continued)

(52) U.S. Cl.
CPC ........ *A61J 1/1468* (2015.05); *B65D 23/0821* (2013.01); *C03C 17/005* (2013.01);
(Continued)

(58) Field of Classification Search
CPC ...... A61J 1/1468; C03C 17/005; C03C 17/30; C03C 17/32; C03C 17/3405;
(Continued)

(56) References Cited

U.S. PATENT DOCUMENTS 2,644,802 A 7/1953 Lontz
2,691,548 A 10/1954 Feucht et al.
(Continued)

FOREIGN PATENT DOCUMENTS

CA 853121 A 10/1970
CA 1333785 C 1/1995
(Continued)

OTHER PUBLICATIONS

"Lyophilization: Growing with Biotechnology", Genetic Engineering & Biotechnology News, 2005, vol. 25, acquired from https://www.genengnews.com/magazine/35/lyophilization-growing-with-biotechnology/ (Year: 2005).*
(Continued)

*Primary Examiner* — Gerard Higgins
(74) *Attorney, Agent, or Firm* — Dinsmore & Shohl LLP

(57) ABSTRACT

According to embodiments, a method of making a coated pharmaceutical container, may include: forming a glass tube; forming the glass tube into a pharmaceutical container comprising an interior surface and an exterior surface; and applying a coating to the exterior surface. The coating has a coefficient of friction less than or equal to 0.7 relative to a second pharmaceutical container when tested in a vial-on-vial testing jig under a normal load of 30 N. The coated pharmaceutical container may be thermally stable after
(Continued)

depyrogenation at a temperature of at least 260° C. for 30 minutes in air.

48 Claims, 42 Drawing Sheets

Related U.S. Application Data

No. 16/024,825, filed on Jun. 30, 2018, which is a continuation of application No. 15/374,338, filed on Dec. 9, 2016, now Pat. No. 10,034,816, which is a continuation of application No. 13/780,754, filed on Feb. 28, 2013, now Pat. No. 9,918,898.

(60) Provisional application No. 61/665,682, filed on Jun. 28, 2012, provisional application No. 61/604,220, filed on Feb. 28, 2012.

(51) Int. Cl.
   *C03C 17/30* (2006.01)
   *C03C 21/00* (2006.01)
   *C03C 17/32* (2006.01)
   *C03C 17/42* (2006.01)
   *C03C 17/00* (2006.01)

(52) U.S. Cl.
   CPC .............. *C03C 17/30* (2013.01); *C03C 17/32* (2013.01); *C03C 17/42* (2013.01); *C03C 21/002* (2013.01); *C03C 2217/78* (2013.01); *Y10T 428/1321* (2015.01); *Y10T 428/24926* (2015.01); *Y10T 428/265* (2015.01)

(58) Field of Classification Search
   CPC ........... B65D 23/0821; Y10T 428/1321; Y10T 428/24942
   See application file for complete search history.

(56) References Cited

U.S. PATENT DOCUMENTS

| | | |
|---|---|---|
| 3,179,634 A | 4/1965 | Edwards |
| 3,287,311 A | 11/1966 | Edwards |
| 3,323,889 A | 6/1967 | Carl et al. |
| 3,395,069 A | 7/1968 | Plueddemann |
| 3,441,432 A | 4/1969 | Levene |
| 3,445,267 A | 5/1969 | Layne |
| 3,577,256 A | 5/1971 | Benford, Jr. et al. |
| 3,607,186 A | 9/1971 | Bognar |
| 3,674,690 A | 7/1972 | Clow et al. |
| 3,772,061 A | 11/1973 | McCoy et al. |
| 3,791,809 A | 2/1974 | Lau |
| 3,801,361 A | 4/1974 | Kitaj |
| 3,811,921 A | 5/1974 | Crawford et al. |
| 3,819,346 A | 6/1974 | Southwick et al. |
| 3,844,754 A | 10/1974 | Grubb et al. |
| 3,878,960 A | 4/1975 | Jonsson |
| 3,900,329 A | 8/1975 | Grubb et al. |
| 3,926,604 A | 12/1975 | Smay |
| 3,958,073 A | 5/1976 | Trevisan et al. |
| 3,989,864 A | 11/1976 | Hey et al. |
| 4,030,904 A | 6/1977 | Battye et al. |
| 4,056,208 A | 11/1977 | Prejean |
| 4,056,651 A | 11/1977 | Scola |
| 4,065,317 A | 12/1977 | Baak et al. |
| 4,065,589 A | 12/1977 | Lenard et al. |
| 4,086,373 A | 4/1978 | Tobias et al. |
| 4,093,759 A | 6/1978 | Otsuki et al. |
| 4,130,677 A | 12/1978 | Huntsberger |
| 4,161,556 A | 7/1979 | Lenard et al. |
| 4,164,402 A | 8/1979 | Watanabe |
| 4,214,886 A | 7/1980 | Shay et al. |
| 4,215,165 A | 7/1980 | Gras et al. |
| 4,238,041 A | 12/1980 | Jönsson et al. |
| 4,264,658 A | 4/1981 | Tobias et al. |
| 4,280,944 A | 7/1981 | Saito et al. |
| 4,315,573 A | 2/1982 | Bradley et al. |
| 4,351,882 A | 9/1982 | Concannon |
| 4,385,086 A | 5/1983 | Nakayama et al. |
| 4,386,164 A | 5/1983 | Moser |
| 4,395,527 A | 7/1983 | Berger |
| 4,431,692 A | 2/1984 | Hofmann et al. |
| 4,558,110 A | 12/1985 | Lee |
| 4,595,548 A | 6/1986 | St. Clair et al. |
| 4,603,061 A | 7/1986 | St. Clair et al. |
| 4,620,985 A | 11/1986 | Goodburn et al. |
| 4,636,411 A | 1/1987 | Dubois et al. |
| 4,654,235 A | 3/1987 | Effenberger et al. |
| 4,668,268 A | 5/1987 | Lindner et al. |
| 4,680,373 A | 7/1987 | Gallagher et al. |
| 4,689,085 A | 8/1987 | Plueddemann |
| 4,696,994 A | 9/1987 | Nakajima et al. |
| 4,748,228 A | 5/1988 | Shoji et al. |
| 4,749,614 A | 6/1988 | Andrews et al. |
| 4,767,414 A | 8/1988 | Williams et al. |
| 4,778,727 A | 10/1988 | Tesoro et al. |
| 4,842,889 A | 6/1989 | Hu et al. |
| 4,860,906 A | 8/1989 | Pellegrini et al. |
| 4,880,895 A | 11/1989 | Higashi et al. |
| 4,882,210 A | 11/1989 | Romberg et al. |
| 4,902,106 A | 2/1990 | Dijon et al. |
| 4,923,960 A | 5/1990 | Chen, Sr. et al. |
| 4,931,539 A | 6/1990 | Hayes |
| 4,961,976 A | 10/1990 | Hashimoto et al. |
| 4,961,996 A | 10/1990 | Carre et al. |
| 4,988,288 A | 1/1991 | Melgaard |
| 5,002,359 A | 3/1991 | Sayegh |
| 5,036,145 A | 7/1991 | Echterling et al. |
| 5,037,701 A | 8/1991 | Carre et al. |
| 5,049,421 A | 9/1991 | Kosh |
| 5,112,658 A | 5/1992 | Skutnik et al. |
| 5,114,757 A | 5/1992 | Linde et al. |
| 5,120,341 A | 6/1992 | Nozawa et al. |
| 5,124,618 A | 6/1992 | Ohtaka et al. |
| 5,137,751 A | 8/1992 | Burgess et al. |
| 5,206,337 A | 4/1993 | Takeda et al. |
| 5,230,429 A | 7/1993 | Etheredge, III |
| 5,232,783 A | 8/1993 | Pawar et al. |
| 5,246,782 A | 9/1993 | Kennedy et al. |
| 5,251,071 A | 10/1993 | Kusukawa et al. |
| 5,252,703 A | 10/1993 | Nakajima et al. |
| 5,258,487 A | 11/1993 | Okinoshima et al. |
| 5,281,690 A | 1/1994 | Flaim et al. |
| 5,286,527 A | 2/1994 | Blum et al. |
| 5,302,458 A | 4/1994 | Blum et al. |
| 5,306,537 A | 4/1994 | Gustafson et al. |
| 5,310,862 A | 5/1994 | Nomura et al. |
| 5,326,601 A | 7/1994 | Kawano et al. |
| 5,336,925 A | 8/1994 | Moss et al. |
| 5,337,537 A | 8/1994 | Soughan |
| 5,403,700 A | 4/1995 | Heller et al. |
| 5,476,692 A | 12/1995 | Ellis et al. |
| 5,482,768 A | 1/1996 | Kawasato et al. |
| 5,488,092 A | 1/1996 | Kausch et al. |
| 5,498,758 A | 3/1996 | Scholes et al. |
| 5,504,830 A | 4/1996 | Ngo et al. |
| 5,594,231 A | 1/1997 | Pellicori et al. |
| 5,601,905 A | 2/1997 | Watanabe et al. |
| 5,633,079 A | 5/1997 | Shoshi et al. |
| 5,736,251 A | 4/1998 | Pinchuk |
| 5,736,476 A | 4/1998 | Watzke et al. |
| 5,756,144 A | 5/1998 | Wolff et al. |
| 5,849,369 A | 12/1998 | Ogawa |
| 5,851,200 A | 12/1998 | Higashikawa et al. |
| 5,908,542 A | 6/1999 | Lee et al. |
| 5,916,632 A | 6/1999 | Mishina et al. |
| 5,938,919 A | 8/1999 | Najafabadi |
| 5,979,714 A | 11/1999 | Bleile et al. |
| 6,013,333 A | 1/2000 | Carson et al. |
| 6,046,758 A | 4/2000 | Brown et al. |
| 6,048,911 A | 4/2000 | Shustack et al. |
| 6,084,034 A | 7/2000 | Miyama et al. |

(56) References Cited

U.S. PATENT DOCUMENTS

| | | |
|---|---|---|
| 6,096,432 A | 8/2000 | Sakaguchi et al. |
| 6,156,435 A | 12/2000 | Gleason et al. |
| 6,214,429 B1 | 4/2001 | Zou et al. |
| 6,232,428 B1 | 5/2001 | Deets et al. |
| 6,277,950 B1 | 8/2001 | Yang et al. |
| 6,346,315 B1 | 2/2002 | Sawatsky |
| 6,358,519 B1 | 3/2002 | Waterman |
| 6,444,783 B1 | 9/2002 | Dodd et al. |
| 6,472,068 B1 | 10/2002 | Glass et al. |
| 6,482,509 B2 | 11/2002 | Buch-Rasmussen et al. |
| 6,561,275 B2 | 5/2003 | Glass et al. |
| 6,586,039 B2 | 7/2003 | Heinz et al. |
| 6,599,594 B1 | 7/2003 | Walther et al. |
| 6,627,377 B1 | 9/2003 | Itatani et al. |
| 6,627,569 B1 | 9/2003 | Naumann et al. |
| 6,737,105 B2 | 5/2004 | Richard |
| 6,797,396 B1 | 9/2004 | Liu et al. |
| 6,818,576 B2 | 11/2004 | Ikenishi et al. |
| 6,852,393 B2 | 2/2005 | Gandon |
| 6,866,158 B1 | 3/2005 | Sommer et al. |
| 6,921,788 B1 | 7/2005 | Izawa et al. |
| 6,939,819 B2 | 9/2005 | Usui et al. |
| 6,989,181 B2 | 1/2006 | Brandt |
| 7,087,307 B2 | 8/2006 | Nagashima et al. |
| 7,215,473 B2 | 5/2007 | Fleming |
| 7,236,296 B2 | 6/2007 | Liu et al. |
| 7,315,125 B2 | 1/2008 | Kass |
| 7,470,999 B2 | 12/2008 | Saito et al. |
| 7,569,653 B2 | 8/2009 | Landon |
| 7,619,042 B2 | 11/2009 | Poe et al. |
| 7,845,346 B2 | 12/2010 | Langford et al. |
| 7,871,554 B2 | 1/2011 | Oishi et al. |
| 7,985,188 B2 | 7/2011 | Felts et al. |
| 8,048,938 B2 | 11/2011 | Poe et al. |
| 8,053,492 B2 | 11/2011 | Poe et al. |
| 8,110,652 B2 | 2/2012 | Bito et al. |
| 8,234,883 B2 | 8/2012 | Krall, Jr. et al. |
| 8,273,801 B2 | 9/2012 | Baikerikar et al. |
| 8,277,945 B2 | 10/2012 | Anderson et al. |
| 8,309,627 B2 | 11/2012 | Poe et al. |
| 8,324,304 B2 | 12/2012 | Burch et al. |
| 8,518,545 B2 | 8/2013 | Akiba et al. |
| 9,034,442 B2 | 5/2015 | Chang et al. |
| 9,428,302 B2 | 5/2016 | Fadeev et al. |
| 9,918,898 B2 | 3/2018 | Fadeev et al. |
| 10,034,816 B2 | 7/2018 | Fadeev et al. |
| 10,737,973 B2 | 8/2020 | Bayne et al. |
| 2002/0016438 A1 | 2/2002 | Sugo et al. |
| 2002/0037943 A1 | 3/2002 | Madsen |
| 2002/0081401 A1 | 6/2002 | Hessok et al. |
| 2002/0155216 A1 | 10/2002 | Reitz et al. |
| 2002/0182410 A1 | 12/2002 | Szum et al. |
| 2003/0031799 A1 | 2/2003 | Haque |
| 2003/0072932 A1 | 4/2003 | Gandon |
| 2004/0048997 A1 | 3/2004 | Sugo |
| 2004/0096588 A1 | 5/2004 | Brandt |
| 2004/0105985 A1 | 6/2004 | Tenze et al. |
| 2004/0129026 A1* | 7/2004 | Bartsch .................. C03B 23/11 65/86 |
| 2004/0199138 A1 | 10/2004 | McBay et al. |
| 2005/0009953 A1 | 1/2005 | Shea |
| 2005/0048297 A1 | 3/2005 | Fukuda et al. |
| 2005/0170722 A1 | 8/2005 | Keese |
| 2006/0099360 A1 | 5/2006 | Farha |
| 2006/0233675 A1 | 10/2006 | Stein |
| 2007/0082135 A1 | 4/2007 | Lee |
| 2007/0116907 A1 | 5/2007 | Landon |
| 2007/0157919 A1 | 7/2007 | Marandon |
| 2007/0178256 A1 | 8/2007 | Landon |
| 2007/0187280 A1 | 8/2007 | Haines et al. |
| 2007/0224427 A1 | 9/2007 | Kunita et al. |
| 2007/0225823 A1 | 9/2007 | Hawkins et al. |
| 2007/0289492 A1 | 12/2007 | Wynne et al. |
| 2007/0293388 A1 | 12/2007 | Zuyev et al. |
| 2008/0008838 A1 | 1/2008 | Arpac et al. |
| 2008/0069970 A1 | 3/2008 | Wu |
| 2008/0071228 A1 | 3/2008 | Wu et al. |
| 2008/0114096 A1 | 5/2008 | Qu et al. |
| 2008/0121621 A1 | 5/2008 | Stockum et al. |
| 2008/0199618 A1 | 8/2008 | Wen et al. |
| 2008/0214777 A1 | 9/2008 | Poe |
| 2008/0281260 A1 | 11/2008 | William et al. |
| 2008/0292496 A1 | 11/2008 | Madsen |
| 2009/0048537 A1 | 2/2009 | Lydon et al. |
| 2009/0092759 A1 | 4/2009 | Chen et al. |
| 2009/0126404 A1 | 5/2009 | Sakhrani et al. |
| 2009/0155490 A1 | 6/2009 | Bicker et al. |
| 2009/0155506 A1 | 6/2009 | Martin et al. |
| 2009/0155570 A1 | 6/2009 | Bonnet et al. |
| 2009/0162530 A1 | 6/2009 | Nesbitt |
| 2009/0162664 A1 | 6/2009 | Ou |
| 2009/0176108 A1 | 7/2009 | Toyama et al. |
| 2009/0197048 A1 | 8/2009 | Amin et al. |
| 2009/0197088 A1 | 8/2009 | Murata |
| 2009/0197390 A1 | 8/2009 | Rothwell et al. |
| 2009/0203929 A1 | 8/2009 | Hergenrother et al. |
| 2009/0208175 A1 | 8/2009 | Hongo et al. |
| 2009/0208657 A1 | 8/2009 | Siebenlist et al. |
| 2009/0239759 A1 | 9/2009 | Balch |
| 2009/0247699 A1 | 10/2009 | Buehler et al. |
| 2009/0269597 A1 | 10/2009 | Bito et al. |
| 2009/0275462 A1 | 11/2009 | Murata |
| 2009/0286058 A1 | 11/2009 | Shibata et al. |
| 2009/0297857 A1 | 12/2009 | Pascal et al. |
| 2009/0325776 A1 | 12/2009 | Murata |
| 2010/0044268 A1 | 2/2010 | Haines et al. |
| 2010/0047521 A1 | 2/2010 | Amin et al. |
| 2010/0056666 A1 | 3/2010 | Poe et al. |
| 2010/0062188 A1 | 3/2010 | Miyamoto et al. |
| 2010/0063244 A1 | 3/2010 | Poe et al. |
| 2010/0087307 A1 | 4/2010 | Murata et al. |
| 2010/0101628 A1 | 4/2010 | Poe et al. |
| 2010/0249309 A1 | 9/2010 | Lewin et al. |
| 2010/0264645 A1 | 10/2010 | Jones et al. |
| 2010/0273019 A1 | 10/2010 | Kitaike et al. |
| 2010/0317506 A1 | 12/2010 | Fechner et al. |
| 2011/0014475 A1 | 1/2011 | Murata |
| 2011/0045219 A1 | 2/2011 | Stewart et al. |
| 2011/0062619 A1 | 3/2011 | Laine et al. |
| 2011/0065576 A1 | 3/2011 | Campbell et al. |
| 2011/0091732 A1 | 4/2011 | Lu et al. |
| 2011/0098172 A1 | 4/2011 | Brix |
| 2011/0159318 A1 | 6/2011 | Endo et al. |
| 2011/0177252 A1 | 7/2011 | Kanagasabapathy et al. |
| 2011/0177987 A1 | 7/2011 | Lenting et al. |
| 2011/0189486 A1 | 8/2011 | Wendell, Jr. |
| 2011/0200805 A1 | 8/2011 | Tomamoto et al. |
| 2011/0226658 A1 | 9/2011 | Tata-Venkata et al. |
| 2011/0272322 A1 | 11/2011 | Yamagata et al. |
| 2011/0274916 A1 | 11/2011 | Murata |
| 2011/0313363 A1 | 12/2011 | D'Souza et al. |
| 2012/0016076 A1 | 1/2012 | Kim et al. |
| 2012/0034435 A1 | 2/2012 | Borrelli et al. |
| 2012/0052293 A1 | 3/2012 | Poe et al. |
| 2012/0052302 A1 | 3/2012 | Matusick et al. |
| 2012/0061342 A1 | 3/2012 | Perrot |
| 2012/0097159 A1 | 4/2012 | Iyer et al. |
| 2012/0107174 A1 | 5/2012 | Zambaux |
| 2012/0142829 A1 | 6/2012 | Ichinose |
| 2012/0148770 A1 | 6/2012 | Rong et al. |
| 2012/0172519 A1 | 7/2012 | Dörr et al. |
| 2012/0199203 A1 | 8/2012 | Nishizawa et al. |
| 2012/0251748 A1 | 10/2012 | Ashmead et al. |
| 2012/0282449 A1 | 11/2012 | Gross |
| 2013/0011650 A1 | 1/2013 | Akiba et al. |
| 2013/0071078 A1 | 3/2013 | Bennett et al. |
| 2013/0095261 A1 | 4/2013 | Ahn et al. |
| 2013/0101792 A1 | 4/2013 | Pranov |
| 2013/0211344 A1 | 8/2013 | Rodriguez et al. |
| 2013/0299380 A1 | 11/2013 | Zambaux et al. |
| 2014/0001143 A1 | 1/2014 | Adib et al. |
| 2014/0031499 A1 | 1/2014 | Cho et al. |
| 2014/0069202 A1 | 3/2014 | Fisk |
| 2014/0150499 A1 | 6/2014 | Danielson et al. |

(56) References Cited

U.S. PATENT DOCUMENTS

| | | | |
|---|---|---|---|
| 2014/0151370 A1 | 6/2014 | Chang et al. | |
| 2014/0220327 A1 | 8/2014 | Adib et al. | |
| 2014/0323800 A1 | 10/2014 | Dye | |
| 2014/0339194 A1 | 11/2014 | Gu et al. | |
| 2015/0203631 A1 | 7/2015 | Miyazaki et al. | |
| 2016/0145150 A1 | 5/2016 | Bookbinder et al. | |
| 2019/0210768 A1* | 7/2019 | Adib | A61J 1/1468 |

FOREIGN PATENT DOCUMENTS

| | | |
|---|---|---|
| CN | 2483332 Y | 3/2002 |
| CN | 1963650 A | 5/2007 |
| CN | 101190969 A | 6/2008 |
| CN | 101479355 A | 7/2009 |
| CN | 101585666 A | 11/2009 |
| CN | 201390409 Y | 1/2010 |
| CN | 201404453 Y | 2/2010 |
| CN | 101717189 A | 6/2010 |
| CN | 101831175 A | 9/2010 |
| CN | 201694531 U | 1/2011 |
| CN | 102050572 A | 5/2011 |
| CN | 102066462 A | 5/2011 |
| CN | 202006114 U | 10/2011 |
| CN | 102317168 A | 1/2012 |
| CN | 103562324 A | 2/2014 |
| CN | 104194618 A | 12/2014 |
| CN | 104508008 A | 4/2015 |
| DE | 1167706 B | 4/1964 |
| DE | 1954314 A1 | 5/1971 |
| DE | 4128634 A1 | 3/1993 |
| DE | 4130414 A1 | 4/1993 |
| DE | 29702816 U1 | 4/1997 |
| DE | 102004011009 A1 | 9/2005 |
| EP | 0176062 A2 | 4/1986 |
| EP | 0330456 A1 | 8/1989 |
| EP | 0515801 A1 | 12/1992 |
| EP | 1464631 A2 | 6/2004 |
| EP | 2031124 A1 | 3/2009 |
| EP | 524802 B2 | 10/2009 |
| EP | 2540682 A1 | 1/2013 |
| FR | 93015 E | 1/1969 |
| FR | 2033431 A5 | 12/1970 |
| FR | 2973804 A1 | 10/2012 |
| GB | 702292 A | 1/1954 |
| GB | 720778 A | 12/1954 |
| GB | 966731 A | 8/1964 |
| GB | 1267855 A | 3/1972 |
| GB | 1529386 A | 10/1978 |
| IN | 231117 B | 3/2009 |
| JP | S49104910 A | 10/1974 |
| JP | S49115088 A | 11/1974 |
| JP | S5663845 A | 5/1981 |
| JP | 56155044 A | 12/1981 |
| JP | S5738346 A | 3/1982 |
| JP | S57123223 A | 7/1982 |
| JP | S58156553 A | 9/1983 |
| JP | 60254022 A | 12/1985 |
| JP | S6147932 A | 3/1986 |
| JP | 62047623 A | 3/1987 |
| JP | S6268828 A | 3/1987 |
| JP | 62140257 A | 6/1987 |
| JP | S62172081 A | 7/1987 |
| JP | 63236731 A | 10/1988 |
| JP | S63270330 A | 11/1988 |
| JP | S6479269 A | 3/1989 |
| JP | H01201047 A | 8/1989 |
| JP | 1279058 A | 11/1989 |
| JP | 102225344 A | 9/1990 |
| JP | H05213631 A | 8/1993 |
| JP | 7223845 A | 8/1995 |
| JP | H083510 A | 1/1996 |
| JP | H08151564 A | 6/1996 |
| JP | 11171593 A | 6/1999 |
| JP | 11314931 A | 11/1999 |
| JP | 2000007372 A | 1/2000 |
| JP | 2000211644 A | 8/2000 |
| JP | 2000219621 A | 8/2000 |
| JP | 2001033348 A | 2/2001 |
| JP | 2001072441 A | 3/2001 |
| JP | 2001180969 A | 7/2001 |
| JP | 2001192239 A | 7/2001 |
| JP | 2001229526 A | 8/2001 |
| JP | 2001236634 A | 8/2001 |
| JP | 2001302284 A | 10/2001 |
| JP | 2002003241 A | 1/2002 |
| JP | 2002249340 A | 9/2002 |
| JP | 2003053259 A | 2/2003 |
| JP | 2003146699 A | 5/2003 |
| JP | 2004161993 A | 6/2004 |
| JP | 2006100379 A | 4/2006 |
| JP | 2006291049 A | 10/2006 |
| JP | 2007204728 A | 8/2007 |
| JP | 2008195602 A | 8/2008 |
| JP | 2009108181 A | 5/2009 |
| JP | 2009523105 A | 6/2009 |
| JP | 2009175600 A | 8/2009 |
| JP | 2009204780 A | 9/2009 |
| JP | 2009207618 A | 9/2009 |
| JP | 2010059038 A | 3/2010 |
| JP | 4483331 B2 | 6/2010 |
| JP | 2011057547 A | 3/2011 |
| JP | 2011236100 A | 11/2011 |
| JP | 2012224824 A | 11/2012 |
| JP | 2013003310 A | 1/2013 |
| JP | 2013516387 A | 5/2013 |
| KR | 1006303090000 | 9/2006 |
| RO | 83460 A2 | 3/1984 |
| RU | 2071492 C1 | 1/1997 |
| RU | 2220219 C1 | 12/2003 |
| RU | 2514939 C2 | 5/2014 |
| SU | 504719 A1 | 2/1976 |
| SU | 990700 A1 | 1/1983 |
| TW | 201034993 A | 10/2010 |
| TW | 201113233 A | 4/2011 |
| TW | 201213260 A | 4/2012 |
| TW | 201223895 A | 6/2012 |
| WO | WO90/05031 A1 | 5/1990 |
| WO | WO95/10487 A1 | 4/1995 |
| WO | WO97/25932 A1 | 7/1997 |
| WO | WO01/17569 A2 | 3/2001 |
| WO | 2007097376 A1 | 8/2007 |
| WO | 2008050500 A1 | 5/2008 |
| WO | 2009002660 A2 | 12/2008 |
| WO | 2009028862 A1 | 3/2009 |
| WO | 2009095569 A1 | 8/2009 |
| WO | 2010115728 A2 | 10/2010 |
| WO | 2010129758 A1 | 11/2010 |
| WO | 2011001501 A1 | 1/2011 |
| WO | 2011047840 A2 | 4/2011 |
| WO | 2011069338 A1 | 6/2011 |
| WO | 2011073106 A1 | 6/2011 |
| WO | 2011080543 A1 | 7/2011 |
| WO | 2011103798 A1 | 9/2011 |
| WO | 2012047950 A1 | 4/2012 |
| WO | 2013063290 A1 | 5/2013 |
| WO | 2013130724 A2 | 9/2013 |
| WO | 2013185018 A1 | 12/2013 |
| WO | 2014005030 A1 | 1/2014 |
| ZA | 9706079 A | 3/1998 |

OTHER PUBLICATIONS

Iacocca et al., "Factors Affecting the Chemical Durability of Glass Used in the Pharmaceutical Industry", AAPS PharmaSci Tech, 2010, vol. 11, p. 1340-1349. (Year: 2010).*

Anderson, et al., "Polyimide-Substrate Bonding Studies Using γ-APS Coupling Agent", IEEE Transactions on Components, Hybrids, and Manufacturing Technology, vol. CHMT-9, No. 4, p. 364-369, Dec. 1986.

Benitez, et al., "SiOx—SiNx functional coatings by PECVD of organosilicon monomers other than silane", Annual Technical Conference Proceedings—Society of Vacuum Coaters (2002), 45th, 280-285; ISSN: 0731-1699.

(56) References Cited

OTHER PUBLICATIONS

Cho, et al. "Adhesion behavior of PDMS-containing polyimide to glass", Journal of Adhesion Science and Technology 12:3, pp. 253-269, Taylor & Francis (1998), DOI: 10.1163/156856198X00867.
Dow Corning, "A Guide to Silane Solutions: Fiberglass and Composites", Silicones Simplified [online]. Dow Corning Corporation, 2009. Retrieved from the Internet: <URL: https://www.xiameter.com/en/ExploreSilicones/Documents/95-728-01%20Fiberglass%20and%20Composites.pdf>.
Dow Corning, Resins and Intermediates Selection Guide; Paints & Inks Solutions, p. 1-8, 2010.
"DuPont Teflon PFA TE-7224 Aqueous Fluoropolymers made with Echelon Dispersion Technology" [online]. Dupont, 2006. Retrieved from the Internet: <URL: http://www2.dupont.com/Teflon_Industrial/en_US/assets/downloads/k15758.pdf>.
Francen, et al., "Fluorochemical glass treatments", The Glass Industry (1965), 46(10), 594-7; 628-9; ISSN: 0017-1026.
G. L. Witucki, "A Silane Primer: Chemistry and Applications of Alkoxy Silanes", Journal of Coatings Technology, (vol. 65) pp. 57-60, Federation of Societies for Coatings Technology, Blue Bell, Pennsylvania (Jul. 1993).
Gelest, Inc., MSDS, Material Safety Data Sheet, Aminopropylsilsesquioxane Oligomer, 22-25%—WSA-9911 [online]. Gelest, Inc. Morrisville, PA, 2008. Retrieved from the Internet: <URL: http://shop.gelest.com/Product.aspx?catnum=WSA-9911&Index=0&TotalCount=1>.
Iacocca, et al., "Factors Affecting the Chemical Durability of Glass Used in the Pharmaceutical Industry", AAPS PharmSciTech, vol. 11, No. 3, pp. 1340-1349, Sep. 2010.
Jin, et al., "Preparation and characterization of poly(phthalazinone ether ketone)/SiO2 hybrid composite thin films with low friction coefficient", Journal of Sol-Gel Science and Technology, Springer Science+Business Media, LLC (2008), 46(2), 208-216; ISSN: 0928-0707.
Jin, et al., "Preparation and investigation of the tribological behavior of poly(phthalazinone ether keytone)/silica thin films", Chinese Journal of Materials Research. vol. 22, No. 1, pp. 26-30. Feb. 25, 2008. ISSN: 1005-3093. Published by: Chinese Academy of Sciences, No. 1, Beijing, China.
"Thermal Stability of the Silica-Aminopropylsilane-Polyimide Interface", Linde, et al. Journal of Polymer Science, Polymer Chemistry Edition, vol. 22, 3043-3062, John Wiley & Sons, Inc. (1984).
Metwalli et al., Journal of Colloid and Interface Science 298 (2006) 825-831.
Poe, et al., "Zero CTE polyimides for athermal optical membranes", Proceedings of SPIE, vol. 7061, Issue: Novel Optical Systems Design and Optimization XI, pp. 706114/1-706114/9, Journal, 2008, Publisher: Society of Photo-Optical Instrumentation Engineers, ISSN: 0277-786X.
Schmid, et al. "Recommendations on Delamination Risk Mitigation & Prediction for Type I Pharmaceutical Containers Made of Tubing Glass", Nuova Ompi: Glass Division, p. 40-42., 2012, Frederick Furness Publishing.
Schmid, et al., "Glass Delamination: Facts—Prevention—Recommendations", Stevanato Group Market Update, News Issue 5, May 2011, p. 1-4.
Smay, G. L., "The characteristics of high-temperature resistant organic polymers and the feasibility of their use as glass coating materials", Journal of Materials Science, 20 (4), pp. 1494-1500, Chapman & Hall Ind. (1985), ISSN: 0022-2461.
Wahab, et al., "Silica- and Silsesquioxane-Containing Polymer Nanohybrids", Macromolecules Containing Metal and Metal-Like Elements, vol. 4: Group IVA Polymers, Chapter 6, 2005 John Wiley & Sons, Inc.
"Spectroscopic Ellipsometry Methods for Thin Absorbing Coatings", by Hilfiker et al. from Society of Vacuum Coaters 505/856-7188, pp. 511-516, 51st Annual Technical Conference Proceedings, Chicago, IL, Apr. 19-24, (2008).
Non-Final Office Action dated Jul. 30, 2013 relating to U.S. Appl. No. 13/780,740, filed Feb. 28, 2013. pp. 1-34.

Pantano, Carlo G., "The Role of Coatings and Other Surface Treatments in the Strength of Glass", [online], Department of Materials Science and Engineering Materials Research Institute, The Pennsylvania State University, University Park, PA. 2009. Retrieved from the Internet: <URL: http://www.gmic.org/Strength%20In%20Glass/Pantano%20Pac%20Rim.pdf>. pp. 1-55.
Non-Final Office Action dated May 30, 2019, for U.S. Appl. No. 15/337,695, filed Oct. 28, 2016. pp. 1-13.
English Translation of Japanese 1st Office Action dated Mar. 6, 2019 for JP Patent Application No. 2018-006413. pp. 1-11.
International Search Report & Written Opinion dated Oct. 28, 2013, relating to PCT/US2013/028187 filed Feb. 28, 2013. pp. 1-13.
International Search Report & Written Opinion dated Oct. 28, 2013 relating to PCT/US2013/048589 filed Jun. 28, 2013. pp. 1-15.
International Search Report & Written Opinion dated Jan. 16, 2014 relating to PCT/US2013/066370 filed Oct. 23, 2013. pp. 1-12.
Huang, et al., "Cubic silsesquioxane-polymide nanocomposites with improved thermomechanical and dielectric properties", Acta Materialia, Elsevier, vol. 53, No. 8, pp. 2395-2404, May 1, 2005; ISSN: 1359-6454.
Final Office Action dated Jan. 28, 2014 relating to U.S. Appl. No. 13/780,740, filed Feb. 28, 2013. pp. 1-37.
Non-Final Office Action dated Mar. 10, 2014 relating to U.S. Appl. No. 14/052,048, filed Oct. 11, 2013. pp. 1-11.
ASTM, "Standard Specification for Glasses in Laboratory Apparatus," Designation E438-92 (Reapproved 2006). Retrieved from the Internet: <URL: http://enterprise2.astm.org/DOWNLOAD/E438-92R06.1656713-1.pdf>. p. 1.
International Search Report & Written Opinion dated Feb. 26, 2014 for International Patent Application No. PCT/US2013/071437 filed Nov. 22, 2013. pp. 1-12.
International Search Report & Written Opinion dated Feb. 26, 2014 for International Patent Application No. PCT/US2013/071447 filed Nov. 22, 2013. pp. 1-13.
International Search Report & Written Opinion dated Feb. 26, 2014 for International Patent Application No. PCT/US2013/071460 filed Nov. 22, 2013. pp. 1-12.
International Search Report & Written Opinion dated Feb. 26, 2014 for International Patent Application No. PCT/US2013/071473 filed Nov. 22, 2013. pp. 1-13.
Non-Final Office Action dated Mar. 20, 2014 relating to U.S. Appl. No. 14/057,697, filed Oct. 18, 2013. pp. 1-14.
Non-Final Office Action dated Aug. 13, 2014 relating to U.S. Appl. No. 13/780,740, filed Feb. 28, 2013. pp. 1-43.
Non-Final Office Action dated Sep. 9, 2014 relating to U.S. Appl. No. 14/057,697, filed Oct. 18, 2013. pp. 1-15.
U.S. Pharmacopeia Convention Medicines Compendium, "<660> Containers-Glass" [online], (2014). Retrieved from the Internet: <URL: https://mc.usp.org/general-chapters>. pp. 1-5.
European Pharmacopeia, 5th edition, 3.2 Containers, [online]. Retrieved from the Internet: <URL: http://pharmacyebooks.com/2009/09/european-pharmacopoeia-5-0-online.html>. 4 Pages, (2005).
Ciullo, P.A., Industrial Minerals and Their Uses—A Handbook and Formulary. William Andrew Publishing/Noyes, (1996). ISBN: 0-8155-1408-5. Online version available at: <URL: http://app.knovel.com/hotlink/toc/id:kpIMTUAHFB/industrial-minerals-their/industrial-minerals-their>. pp. 1-7.
Final Office Action dated Jul. 16, 2014 relating to U.S. Appl. No. 14/052,048, filed Oct. 11, 2013. pp. 1-9.
Plueddemann, Edwin, "Silane Coupling Agents," Springer Science+Business Media, LLC (1982). ISBN: 978-1-4899-0344-0. pp. 1-18.
Non-Final Office Action dated Nov. 14, 2014 relating to U.S. Appl. No. 14/075,605, filed Nov. 8, 2013. pp. 1-9.
Notice of Allowance dated Jan. 7, 2015 relating to U.S. Appl. No. 14/052,048, filed Oct. 11, 2013. pp. 1-10.
Non-Final Office Action dated Jan. 29, 2015 relating to U.S. Appl. No. 13/780,740, filed Feb. 28, 2013. pp. 1-79.
Hawley's Condensed Chemical Dictionary Melting Points, 2007. pp. 1-5.
Non-Final Office Action dated Mar. 4, 2015 relating to U.S. Appl. No. 14/057,697, filed Oct. 18, 2013. pp. 1-12.
Final Office Action dated May 6, 2015 relating to U.S. Appl. No. 13/780,740, filed Feb. 28, 2013. pp. 1-36.

(56) References Cited

OTHER PUBLICATIONS

English Machine Translation of CN 101831175 A (Sep. 15, 2010); pp. 1-13.
Pappalardo, L. T., "DSC Evaluation of Epoxy and Polyimide-Impregnated Laminates (Prepregs)"; Journal of Applied Polymer Science, vol. 21, 809-820, John Wiley & Sons, Inc. (1977).
Keramid and Kerimide 601, Scifinder American Chemical Society (ACS) (2015); pp. 1-5.
Polyimide—Hawley's Condensed Chemical Dictionary—Wiley Online (2007); 1 Page.
Tyzor (Du Pont)—Hawley's Condensed Chemical Dictionary—Wiley Online (2007). 1 Page.
McKeen, L., "Fatigue and Tribological Properties of Plastics and Elastomers," 2d Ed 7 Polyimides, (2010); 25 Pages.
Final Office Action dated Jun. 3, 2015 relating to U.S. Appl. No. 14/075,605, filed Nov. 8, 2013. pp. 1-12.
Notice of Allowance dated Jun. 26, 2015 relating to U.S. Appl. No. 14/057,697, filed Oct. 18, 2013. pp. 1-9.
Non-Final Office Action dated Oct. 6, 2015 relating to U.S. Appl. No. 13/780,754, filed Feb. 28, 2013; pp. 1-24.
Non-Final Office Action dated Oct. 6, 2015 relating to U.S. Appl. No. 14/812,898, filed Jul. 29, 2015; pp. 1-22.
Notice of Allowance dated Dec. 9, 2015 for U.S. Appl. No. 13/780,740, filed Feb. 28, 2013. pp. 1-15.
Non-Final Office Action dated Dec. 16, 2015 for U.S. Appl. No. 14/812,902, filed Jul. 29, 2015. pp. 1-25.
Chao-Ching Chang et al., Synthesis and Optical Properties of Soluble Polyimide/Titania Hybrid Thin Films, Macromolecular Materials and Engineering, vol. 291, Issue 12, pp. 1521-1528, Dec. 8, 2006.
Yang-Yen Yu et al., High transparent polyimide/titania multi-layer anti-reflective hybrid films, Thin Solid Films 519 (2011) 4731-4736.
Qiu, et al., "Morphology and size control of inorganic particles in polyimide hybrids by using SiO2—TiO2 mixed oxide", Polymer 44 (2003) 5821-5826.
Non-Final Office Action dated Feb. 10, 2016 for U.S. Appl. No. 14/812,898, filed Jul. 29, 2015. pp. 1-11.
Non-Final Office Action dated Feb. 10, 2016 for U.S. Appl. No. 13/780,754, filed Feb. 28, 2013. pp. 1-11.
Non-Final Office Action dated Mar. 23, 2016 for U.S. Appl. No. 13/827,732, filed Mar. 14, 2013. pp. 1-28.
Singapore Written Opinion dated Feb. 23, 2016 for SG Patent Application No. 11201504070P. pp. 1-9.
Non-Final Office Action dated May 19, 2016 for U.S. Appl. No. 14/812,902, filed Jul. 29, 2015. pp. 1-15.
Flaim, et al., "High Refractive Index Polymer Coatings for Opto-electronics Applications," Society of Photo-Optical Instrumentation for Engineers (2003), SPIE Proceedings of Optical Systems Design 2003. pp. 1-12.
Chinese 2nd Office Action & Search Report mailed May 19, 2016 for CN Patent Application No. 201380022462.7. pp. 1-11.
Singapore Written Opinion dated May 4, 2016 for SG Patent Application No. 11201503964W. pp. 1-10.
Karlsson, S. et al., The technology of chemical glass strengthening—a review. Glass Technology: European Journal of Glass Science and Technology A, Apr. 30, 2010, vol. 51, No. 2, pp. 41-54.
Singapore Written Opinion dated May 4, 2016 for SG Patent Application No. 11201504033T. pp. 1-9.
Liu, Y.H. et al., Tunable water-based lubrication behavior of alkyl- and fluoroalkyl-silanes, Chinese Science Bulletin, May 31, 2012, vol. 57, No. 15, pp. 1879-1885. doi: 10.1007/s11434-012-5106-2.
Cichomski, M. et al., Investigation of the structure of fluoroalkylsilanes deposited on alumina surface, Applied Surface Science, Jun. 18, 2012, vol. 258, No. 24, pp. 9849-9855.
Non-Final Office Action dated Jun. 15, 2016 for U.S. Appl. No. 13/780,754, filed Feb. 28, 2013. pp. 1-25.
Non-Final Office Action dated Jun. 15, 2016 for U.S. Appl. No. 14/812,898, filed Jul. 29, 2015. pp. 1-24.
Non-Final Office Action dated Jul. 13, 2016 for U.S. Appl. No. 13/780,740, filed Feb. 28, 2013. pp. 1-36.

Romero et al., Synthesis of aliphatic diamine and polyetherimide with long perfluoroalkyl side chain, Journal of Fluorine Chemistry 117 (2002) 27-33.
Chemical Resistance of Plastics and Elastomers, 4th edition, 7 pages, William Andrew Publishing, Plastics Design Library, 13 Eaton Avenue, Norwich, NY (2008).
Gunston, Bill (2009). Cambridge Aerospace Dictionary (2nd edition)—visible light. Cambridge University Press. 1 page.
Scifinder CAS Registry No. 29158-17-6 ACS (2016), 1 page.
Scifinder CAS Acc No. 1987-619259 ACS (2016), 1 page.
Wagner, Steven Robert, "High temperature-high humidity for polyimide coatings for aluminosilicate glass surfaces"; The Libraries at Alfred University; Scholes Library Catalog; (2001), pp. 1-81; OCLC: 671453753.
Non-Final Office Action dated Jan. 12, 2017, for U.S. Appl. No. 14/812,898, filed Jul. 29, 2015. pp. 1-44.
English Machine Translation of detailed description of DE 102004011009 published Sep. 29, 2005; Machine Translation acquired on Jan. 8, 2016. pp. 1-11.
Non-Final Office Action dated Feb. 15, 2017, for U.S. Appl. No. 13/780,740, filed Feb. 28, 2013. pp. 1-39.
Non-Final Office Action dated Jan. 24, 2017, for U.S. Appl. No. 15/331,113 filed Oct. 21, 2016. pp. 1-50.
"Parylene Conformal Coating Specification and Properties", acquired from http://www.nbtc.cornell.edu/sites/default/files/Parylene%20Information%20Sheets.pdf on Dec. 20, 2016.
English Translation of Korean 2nd Office Action dated Sep. 10, 2019, for KR Patent Application No. 2019-7008449. pp. 1-2.
English Translation of Chinese 1st Office Action & Search Report dated Sep. 9, 2019, for CN Patent Application No. 201710851535.3. pp. 1-10.
English Translation of Russian Decision on Grant dated Oct. 4, 2019, for RU Patent Application No. 2018136739. pp. 1-22.
Non-Final Office Action dated Mar. 4, 2020 for U.S. Appl. No. 15/280,101, filed Sep. 29, 2016. pp. 1-17.
Russian 1st Office Action and Search Report dated Feb. 11, 2020, for RU Patent Application No. 2018111021. pp. 1-15.
Non-Final Office Action dated Sep. 1, 2020 for U.S. Appl. No. 15/337,695, filed Oct. 28, 2016. pp. 1-25.
Dean et al., "Pharmaceutical Packaging Technology", CRC Press. Nov. 2000. p. 149.
Taiwan 1st Office Action & Search Report dated Jul. 30, 2018 for TW Patent Application No. 107102807. pp. 1-2.
Non-Final Office Action dated Feb. 6, 2019 for U.S. Appl. No. 15/280,101, filed Sep. 29, 2016. pp. 1-14.
English Translation of Japanese Decision on Rejection dated Nov. 14, 2018, for JP Patent Application No. 2015-545049. pp. 1-5.
English Translation of Japanese 1st Office Action dated Feb. 13, 2019 for JP Patent Application No. 2018-019178. pp. 1-5.
English Translation of Russian 1st Office Action and Search Report dated Feb. 11, 2020, for RU Patent Application No. 2018111021. pp. 1-15.
Final Office Action dated May 12, 2020, for U.S. Appl. No. 15/687,059. pp. 1-18.
Japanese Final Office Action dated Jul. 24, 2018 for JP Patent Application No. 2015-545124. pp. 1-6.
Non-Final Office Action dated May 30, 2017 for U.S. Appl. No. 14/075,620, filed Nov. 8, 2013. pp. 1-61.
Non-Final Office Action dated May 31, 2017 for U.S. Appl. No. 14/075,593, filed Nov. 8, 2013. pp. 1-51.
English Translation of Taiwan Official Communication dated Apr. 17, 2017 & Search Report dated Feb. 20, 2017, for TW Patent Application No. 102143473. pp. 1-3.
English Translation of Japanese Office Action dated May 30, 2017 for JP Patent Application No. 2015-520574. pp. 1-9.
English Translation of Taiwan Search Report dated May 20, 2017 for TW Patent Application No. 102143475. pp. 1-2.
Non-Final Office Action dated Jul. 7, 2017 for U.S. Appl. No. 14/949,320, filed Nov. 23, 2015. pp. 1-15.
De Rosa, et al., "Scratch Resistant Polyimide Coatings for Aluminosilicate Glass Surfaces", The Journal of Adhesion, 78: 113-127, Taylor & Francis (2002), ISSN: 0021-8464.

(56) References Cited

OTHER PUBLICATIONS

Hasegawa et al., "Photophysics, photochemistry, and optical properties of polyimides", Elsevier Science Ltd; Prog. Poly. Sci. 26 (2001), pp. 259-335.
Non-Final Office Action dated Apr. 18, 2017, for U.S. Appl. No. 15/374,338, filed Dec. 9, 2016. pp. 1-45.
English Translation of Japanese 1st Office Action dated Sep. 26, 2017, for JP Patent Application No. 2015-545127. pp. 1-18.
Notice of Allowance dated Nov. 7, 2017, for U.S. Appl. No. 13/780,754. pp. 1-14.
Liu et al., "Influences of heating temperature on mechanical properties of polydimethylsiloxane", Sensors and Actuators A: Physical, 2009, vol. 151, p. 42-45.
Russian Decision of Grant dated Nov. 8, 2017, for RU Patent Application No. 2014138998. pp. 1-20.
Korean 1st Office Action and English Translation dated Dec. 14, 2017, for KR Patent Application No. 2015-7017413. pp. 1-10.
Russian 1st Office Action & Search Report and English Translation dated Oct. 27, 2017, for RU Patent Application No. 2015125913. pp. 1-13.
Japanese 1st Office Action dated Nov. 14, 2017, for JP Patent Application No. 2015-545129. pp. 1-8.
Non-Final Office Action dated Feb. 9, 2018, for U.S. Appl. No. 15/331,120, filed Oct. 21, 2016. pp. 1-26.
FIOLAX clear technical data sheet acquired from http://www.us.schott.com/d/tubing/7c1860b0-5313-4d48-a12f-fa1ac06bc4a9/schott-tubing-datasheet-fiolax-clear-english.pdf. Originally published online Feb. 2010. pp. 1-3.
Non-Final Office Action dated Mar. 29, 2017 for U.S. Appl. No. 13/780,754, filed Feb. 28, 2013. pp. 1-41.
Non-Final Office Action dated Apr. 6, 2017 for U.S. Appl. No. 14/812,902, filed Jul. 29, 2015. pp. 1-43.
Japanese 1st Office Action dated Feb. 21, 2017, for JP Patent Application No. 2014-558980; pp. 1-6.
Canadian Official Action dated Mar. 6, 2017 for CA Patent Application No. 2,864,919. pp. 1-4.
Non-Final Office Action dated Sep. 27, 2016 for U.S. Appl. No. 14/812,902, filed Jul. 29, 2015. pp. 1-37.
Choi, et al., "Organic/Inorganic Imide Nanocomposites from Aminophenylsilsesquioxanes", American Chemical Society, (2003), Chem. Mater. 15, 3365-3375.
Chinese 1st Office Action & Search Report dated Aug. 25, 2020, for CN Patent Application No. 201680057620.6. pp. 1-27.
Final Office Action dated Mar. 12, 2021, for U.S. Appl. No. 15/337,695, filed Oct. 28, 2016. pp. 1-23.
Singapore Written Opinion and Search Report dated Jan. 20, 2021, for SG Patent Application No. 10201704148S. pp. 1-10.
Japanese Office Action dated Jun. 15, 2022, pertaining to JP Patent Application No. 2021-111266, 10 pgs.
Japanese Office Action dated Mar. 7, 2022, pertaining to JP Patent Application No. 2021-039178.
Final Office Action, pertaining to U.S. Appl. No. 17/213,859, filed Mar. 26, 2021, 32 pgs.
Final Office Action, pertaining to U.S. Appl. No. 15/857,557, filed Dec. 28, 2017, 16 pgs.
Non-Final Office Action dated Jun. 8, 2021, for U.S. Appl. No. 15/280,101, filed Sep. 29, 2016. pp. 1-22.
Japanese 1st Office Action dated Jun. 30, 2021, for JP Patent Application No. 2020-82562. pp. 1-12.
Canada Office Action dated Jul. 14, 2022 pertaining to CA Patent Application No. 3,001,514, 5 pgs.
Taiwan Office Action dated Apr. 18, 2022, pertaining to TW Patent Application No. 110124379, 5 pgs.
European Extended Search Report dated May 10, 2022, pertaining to EP Patent Application No. 22153571.9, 6 pgs.
Canadian Exam Report, pertaining to Canadian Appl. No. 3061514, 3 pgs.
Extended European Search Report, pertaining to European Appl. No. 21191737.2, 12 pgs.
Canadian Office Action dated Mar. 3, 2023, pertaining to CA Patent Application No. 3,001,514, 5 pgs.
European Search Report dated Jan. 24, 2023, pertaining to EP Patent Application No. 20177871.9, 6 pgs.
Wohl C. J. et al: Modification of the surface properties of polyimide films using polyhedral oligomeric silsesquioxane deposition and oxygen plasma exposure, Applied Surface Science, Elsevier, Amsterdam, NL, vol. 255, No. 18, Jun. 30, 2009 (Jun. 30, 2009), pp. 8135-8144, XP026221236, ISSN: 0169-4332, DOI: 10.1016/J.APSUSC.2009.05.030.
Shallenberger J. R. et al: Adsorption of polyamides and polyamide-silane mixtures at glass surfaces, Surface and Interface Analysis, vol. 35, No. 8, Aug. 1, 2003 (Aug. 1, 2003), pp. 667-672, XP055081787, ISSN: 0142-2421, DOI: 10.1002/sia.1589.
Extended European Search Report dated Sep. 8, 2021, for EP Patent Application No. 21187669.3. pp. 1-11.
Non-Final Office Action dated Apr. 7, 2023, pertaining to U.S. Appl. No. 16/925,297, 138 pgs.
Notice of Allowance dated Apr. 7, 2023, pertaining to U.S. Appl. No. 17/213,859, 40 pgs.
Notice of Allowance dated Mar. 28, 2023, pertaining to U.S. Appl. No. 16/024,825, 15 pgs.
Andreica V. et al., "High acid resistance packaging glass—consists of silica based mix with alkaline earth oxide(s) in specific proportions", WPI/Thomson, vol. 1984, No. 34, Mar. 30, 1984, XP002690017.
Indian Office Action dated Sep. 21, 2023, pertaining to IN Patent Application No. 201918033671, 6 pgs.

* cited by examiner

30N SCRATCH ON TWO VIAL TYPES

| | | NORMAL LOAD (N) | | | COF | | |
|---|---|---|---|---|---|---|---|
| | VIAL #'S | AVG | MIN | MAX | AVG | ST. DEV. | MAX |
| | 1&2 | 31 | 28 | 34 | 0.42 | 0.18 | 0.66 |
| | 3&4 | 31 | 29 | 36 | 0.45 | 0.18 | 0.7 |
| | 5&6 | 30 | 28 | 34 | 0.45 | 0.11 | 0.64 |
| | 7&8 | 29 | 26 | 32 | 0.33 | 0.14 | 0.54 |
| | 9&10 | 30 | 28 | 33 | 0.16 | 0.15 | 0.59 |
| | 11&12 | 28 | 25 | 33 | 0.16 | 0.09 | 0.6 |
| | 12&14 | 30 | 29 | 33 | 0.22 | 0.16 | 0.61 |
| | 15&16 | 31 | 28 | 35 | 0.53 | 0.11 | 0.71 |
| | AVERAGE | 30 | 28 | 34 | 0.38 | 0.14 | 0.63 |
| REF. COMP. IX@450 COATED 0.1/0.1 APS/NOV.800 | 1&2 | 30 | 28 | 31 | 0.12 | 0.04 | 0.34 |
| | 3&4 | 28 | 24 | 31 | 0.16 | 0.08 | 0.34 |
| | 5&6 | 40 | 30 | 44 | 0.08 | 0.02 | 0.19 |
| | 7&8 | 30 | 27 | 31 | 0.08 | 0.05 | 0.38 |
| | 9&10 | 30 | 28 | 30 | 0.08 | 0.03 | 0.22 |
| | 11&12 | 31 | 30 | 33 | 0.12 | 0.04 | 0.23 |
| | 12&14 | 30 | 29 | 32 | 0.15 | 0.07 | 0.41 |
| | 15&16 | 30 | 28 | 32 | 0.09 | 0.02 | 0.19 |
| | AVERAGE | 31 | 28 | 33 | 0.11 | 0.04 | 0.29 |

FIG. 13

| FORMULATION | RELATIVE THICKNESS | CONDITION |
|---|---|---|
| 0.1% APS/1.0% KAPTON | 10 | AS IS |
| 0.1% APS/0.1% KAPTON | 1 | AS IS |
| | | |
| 0.1 APS 0.5 DC806A | 5 | 1 H TUMBLE |
| 0.1 APS 0.1 DC806A | 1 | 1 H TUMBLE |
| 0.1 APS 0.1 KAPTON | 1 | 1 H TUMBLE |
| 0.1 APS 0.5 KAPTON | 5 | 1 H TUMBLE |
| 1.0% DC255 | 10 | 0.5 H TUMBLE |
| 1.0% DC255 | 10 | 1 H TUMBLE |
| 1.0% DC255 | 10 | 2 H TUMBLE |
| 1.0% DC255 | 10 | AS IS |
| 1.0% KAPTON | 10 | FILING LINE |
| 0.1 APS 0.1 NOVA800 | 1 | 6 MIN TUMBLE |
| 0.1 APS 0.1 NOVA800 | 1 | 15 MIN TUMBLE |
| 1.0 GAPS/1.0 DC806A | 10 | 6 MIN TUMBLE |
| 1.0 GAPS/1.0 DC806A | 10 | 15 MIN TUMBLE |
| 1.0 GAPS/1.0 DC806A | 10 | AS IS |
| 0.1 APS 0.1 NOVA800 | 1 | AS IS |
| TYPE 1B BARE | 0 | 30N (3), 50N (1) |
| 1.0 GAPS/1.0 DC806A | 10 | 30N SCRATCH 3 |
| 1.0 GAPS/1.0 DC806A | 10 | 50N SCRATCH 1 |
| 0.1 APS 0.1 NOVA800 | 1 | 30N SCRATCH 3 |
| 0.1 APS 0.1 NOVA800 | 1 | 50N SCRATCH 1 |

FIG. 17

BEFORE

| VIALS | Z-LOAD AVG | Z-LOAD MAX | COF AVG | COF ST. DEV. | COF MAX | FX MAX |
|---|---|---|---|---|---|---|
| 1&2 | 34 | 36 | 0.11 | 0.03 | 0.23 | 8 |
| 3&4 | 30 | 32 | 0.14 | 0.02 | 0.18 | 5 |
| 5&6 | 34 | 36 | 0.09 | 0.02 | 0.19 | 6 |
| 7&8 | 31 | 33 | 0.07 | 0.01 | 0.02 | 4 |
| 9&10 | 31 | 33 | 0.08 | 0.01 | 0.14 | 4 |

AFTER

3) APS/NOVA LYOPHILLIZED

| VIALS | Z-LOAD AVG | Z-LOAD MAX | COF AVG | COF ST. DEV. | COF MAX | FX MAX |
|---|---|---|---|---|---|---|
| 1&2 | 37 | 39 | 0.06 | 0.01 | 0.09 | 3 |
| 3&4 | 40 | 43 | 0.06 | 0.01 | 0.14 | 6 |
| 5&6 | 30 | 31 | 0.05 | 0.01 | 0.09 | 3 |
| 7&8 | 30 | 31 | 0.05 | 0.01 | 0.07 | 2 |
| 9&10 | 30 | 32 | 0.05 | 0.01 | 0.16 | 5 |

FIG. 24

| VIALS | Z-LOAD | | COF | | | FX MAX |
|---|---|---|---|---|---|---|
| | AVG | MAX | AVG | ST. DEV. | MAX | |
| 1&2 | 34 | 36 | 0.11 | 0.03 | 0.23 | 8 |
| 3&4 | 30 | 32 | 0.14 | 0.02 | 0.18 | 5 |
| 5&6 | 34 | 36 | 0.09 | 0.02 | 0.19 | 6 |
| 7&8 | 31 | 33 | 0.07 | 0.01 | 0.02 | 4 |
| 9&10 | 31 | 33 | 0.08 | 0.01 | 0.14 | 4 |

2) APS/NOVA AUTOCLAVED

| VIALS | Z-LOAD | | COF | | | FX MAX |
|---|---|---|---|---|---|---|
| | AVG | MAX | AVG | ST. DEV. | MAX | |
| 1&2 | 36 | 39 | 0.08 | 0.02 | 0.18 | 6 |
| 3&4 | 37 | 40 | 0.09 | 0.01 | 0.16 | 5 |
| 5&6 | 30 | 31 | 0.06 | 0.01 | 0.1 | 3 |
| 7&8 | 30 | 31 | 0.07 | 0.01 | 0.1 | 3 |
| 9&10 | 30 | 31 | 0.07 | 0.01 | 0.14 | 4 |

FIG. 26

| 12h DP Sample | Silanes ratio | Coating composition |
|---|---|---|
| 540 #1 | 1:1 | 0.5 GAP/0.5 Aminophenyltrimethoxysilane + 1.0% Nova |
| 540 #2 | 1:0.5 | 0.5 GAP/0.25 Aminophenyltrimethoxysilane + 1.0% Nova |
| 540 #3 | 1:0.2 | 0.5 GAP/0.1 Aminophenyltrimethoxysilane + 1.0% Nova |

| 540 Target Load | Vial Set | Fz (N) Avg | Fz (N) Max | COF Avg | COF Std. Dev. | COF Max | Fx (N) Max |
|---|---|---|---|---|---|---|---|
| 30 | 1 | 30 | 32 | 0.21 | 0.02 | 0.26 | 8 |
|  | 2 | 30 | 32 | 0.21 | 0.04 | 0.41 | 13 |
|  | 3 | 30 | 33 | 0.32 | 0.1 | 0.68 | 19 |
| 20 | 1 | 20 | 22 | 0.21 | 0.02 | 0.24 | 5 |
|  | 2 | 20 | 21 | 0.22 | 0.02 | 0.31 | 6 |
|  | 3 | 21 | 23 | 0.29 | 0.1 | 0.61 | 13 |

FIG. 28

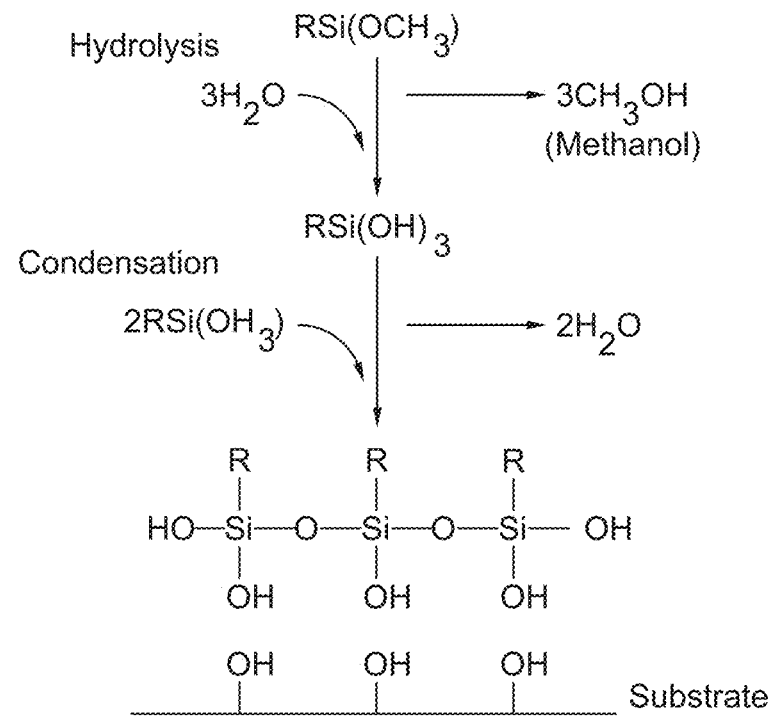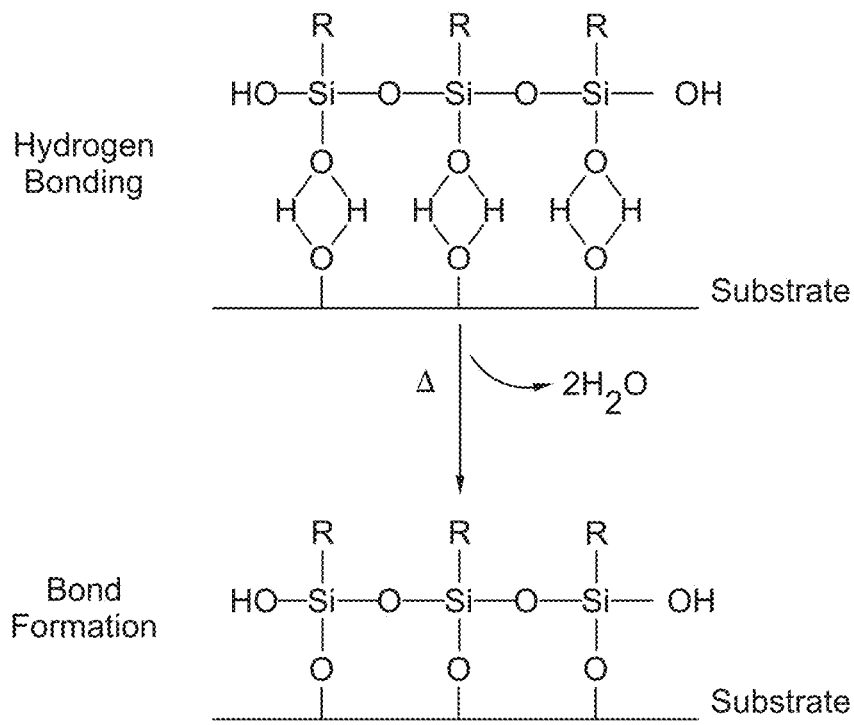
FIG. 31

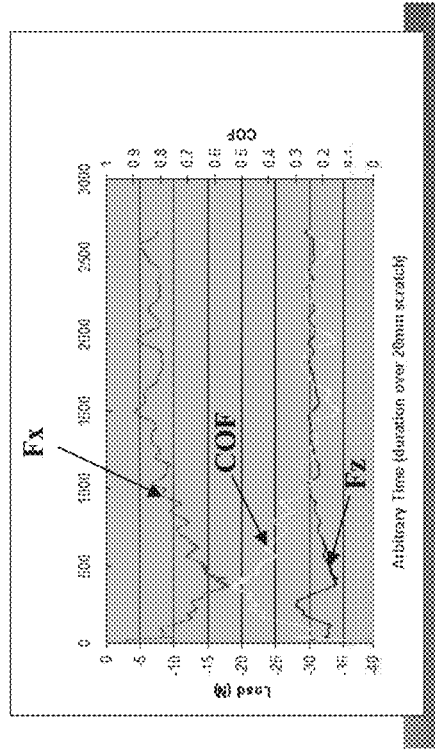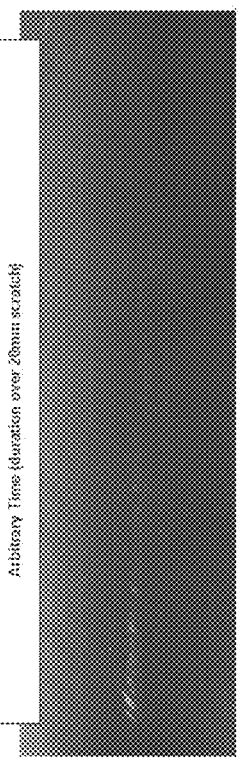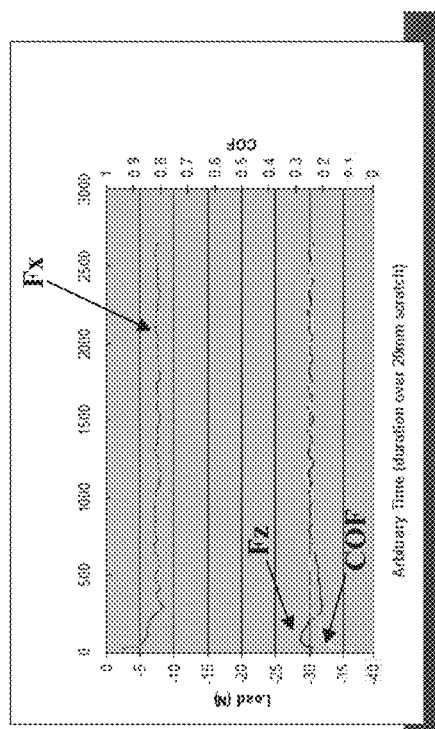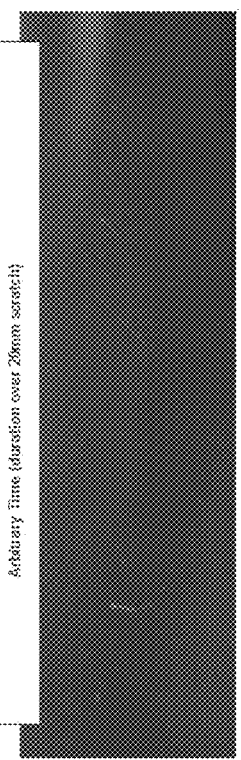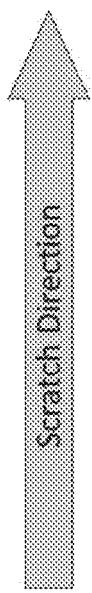
FIG. 37

GLASS ARTICLES WITH LOW-FRICTION COATINGS

CROSS REFERENCE TO RELATED APPLICATIONS

The present application is a continuation of U.S. patent application Ser. No. 16/185,493 filed Nov. 9, 2018 and entitled "Glass Articles with Low-Friction Coatings," which is a continuation of U.S. patent application Ser. No. 16/024,825 filed Jun. 30, 2018 and entitled "Glass Articles with Low-Friction Coatings", which is a continuation of U.S. patent application Ser. No. 15/374,338 filed Dec. 9, 2016 and entitled "Glass Articles with Low-Friction Coatings", which is a continuation of U.S. patent application Ser. No. 13/780,754 filed Feb. 28, 2013 and entitled "Glass Articles with Low-Friction Coatings," and claims priority to U.S. Provisional Patent Application No. 61/604,220 filed Feb. 28, 2012 and entitled "Glass Containers with a Surface Treatment that Enhances Glass Reliability and Methods for Manufacturing the Same," and to U.S. Provisional Patent Application No. 61/665,682 filed Jun. 28, 2012 and entitled "Delamination Resistant Glass Containers with Heat Resistant Coatings," each of which is incorporated by reference herein in their entireties.

BACKGROUND

Field

The present specification generally relates to coatings and, more specifically, to low-friction coatings applied to glass containers such as pharmaceutical packages.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as not to affect the stability of the pharmaceutical compositions contained therein. Glasses having suitable chemical durability include those glass compositions within the ASTM standard 'Type 1B' which have a proven history of chemical durability.

However, use of glass for such applications is limited by the mechanical performance of the glass. In the pharmaceutical industry, glass breakage is a safety concern for the end user, as the broken package and/or the contents of the package may injure the end user. Further, non-catastrophic breakage (i.e., when the glass cracks but does not break) may cause the contents to lose their sterility which, in turn, may result in costly product recalls.

Specifically, the high processing speeds utilized in the manufacture and filling of glass pharmaceutical packages may result in mechanical damage on the surface of the package, such as abrasions, as the packages come into contact with processing equipment, handling equipment, and/or other packages. This mechanical damage significantly decreases the strength of the glass pharmaceutical package resulting in an increased likelihood that cracks will develop in the glass, potentially compromising the sterility of the pharmaceutical contained in the package or causing the complete failure of the package.

One approach to improving the mechanical durability of the glass package is to thermally and/or chemically temper the glass package. Thermal tempering strengthens glass by inducing a surface compressive stress during rapid cooling after forming. This technique works well for glass articles with flat geometries (such as windows), glass articles with thicknesses greater than about 2 mm, and glass compositions with high thermal expansion. However, pharmaceutical glass packages typically have complex geometries (vial, tubular, ampoule, etc.), thin walls (sometimes between about 1-1.5 mm), and are produced from low expansion glasses, making glass pharmaceutical packages unsuitable for strengthening by thermal tempering. Chemical tempering also strengthens glass by the introduction of surface compressive stress. The stress is introduced by submerging the article in a molten salt bath. As ions from the glass are replaced by larger ions from the molten salt, a compressive stress is induced in the surface of the glass. The advantage of chemical tempering is that it can be used on complex geometries, thin samples, and is relatively insensitive to the thermal expansion characteristics of the glass substrate.

However, while the aforementioned tempering techniques improve the ability of the strengthened glass to withstand blunt impacts, these techniques are less effective in improving the resistance of the glass to abrasions, such as scratches, which may occur during manufacturing, shipping and handling.

Accordingly, a need exists for alternative glass articles which have improved resistance to mechanical damage.

SUMMARY

According to one embodiment, a coated glass article may include a glass body comprising a first surface and a low-friction coating positioned on at least a portion of the first surface of the glass body, the low-friction coating comprising a polymer chemical composition. The coated glass article may be thermally stable at a temperature of at least about 260° C. for 30 minutes. A light transmission through the coated glass article may be greater than or equal to about 55% of a light transmission through an uncoated glass article for wavelengths from about 400 nm to about 700 nm. The low-friction coating may have a mass loss of less than about 5% of its mass when heated from a temperature of 150° C. to 350° C. at a ramp rate of about 10° C./minute.

In another embodiment, a coated glass article may include a glass body comprising an exterior surface and a low-friction coating positioned on at least a portion of the exterior surface, the low-friction coating comprising a polymer chemical composition. A coefficient of friction of an abraded area of the portion of the exterior surface with the low-friction coating may be less than 0.7 after exposure to an elevated temperature of 280° C. for 30 minutes and abrasion under a 30 N load and does not have observable damage. A retained strength of the coated glass article in horizontal compression may not decrease by more than about 20% after exposure to an elevated temperature of 280° C. for 30 minutes abrasion under a 30 N load.

In yet another embodiment, a coated glass article may include a glass body having a first surface. A low-friction coating may be positioned on at least a portion of the first surface of the glass body. The low-friction coating may include a polymer chemical composition and a coupling agent comprising at least one of: a first silane chemical composition, a hydrolysate thereof, or an oligomer thereof, wherein the first silane chemical composition is an aromatic silane chemical composition; and a chemical composition formed from the oligomerization of at least the first silane chemical composition and a second silane chemical composition. The first silane chemical composition and the second silane chemical composition may be different chemical compositions. The coated glass article may be thermally stable at a temperature of at least about 260° C. for 30 minutes. A light transmission through the coated glass article is greater than or equal to about 55% of a light transmission through an uncoated glass article for wavelengths from about 400 nm to about 700 nm. The low-friction coating may have a mass loss of less than about 5% of its mass when heated from a temperature of 150° C. to 350° C. at a ramp rate of about 10° C./minute.

In another embodiment, a coated glass article may include a glass body comprising a first surface and a low-friction coating positioned on at least a portion of the first surface of the glass body. The low-friction coating may include a coupling agent comprising an oligomer of one or more silane chemical compositions. The oligomer may be a silsesquioxane chemical composition and at least one of the silane chemical compositions comprises at least one aromatic moiety and at least one amine moiety. The low friction coating may also include a polyimide chemical composition formed from the polymerization of at least a first diamine monomer chemical composition, a second diamine monomer chemical composition, and a dianhydride monomer chemical composition. The first diamine monomer chemical composition may be different than the second diamine monomer chemical composition.

In another embodiment, a coated glass article may include a glass body comprising a first surface and a low-friction coating positioned on at least a portion of the first surface. The low-friction coating may include a polymer chemical composition. The coated glass article may be thermally stable at a temperature of at least about 300° C. for 30 minutes. A light transmission through the coated glass article may be greater than or equal to about 55% of a light transmission through an uncoated glass article for wavelengths from about 400 nm to about 700 nm.

In another embodiment, a coated glass article may include a glass body comprising a first surface and a second surface opposite the first surface. The first surface may be an exterior surface of a glass container. A low-friction coating may be bonded to at least a portion of the first surface of the glass body. The low-friction coating may include a polymer chemical composition. The coated glass article may be thermally stable at a temperature of at least about 280° C. for 30 minutes. A light transmission through the coated glass article may be greater than or equal to about 55% of a light transmission through an uncoated glass article for wavelengths from about 400 nm to about 700 nm.

In another embodiment a coated glass article may include a glass body comprising a first surface and a low-friction coating bonded to at least a portion of the first surface of the glass body. The low-friction coating may include a coupling agent layer positioned on the first surface of the glass body. The coupling agent layer may include a coupling agent comprising at least one of: a first silane chemical composition, a hydrolysate thereof, or an oligomer thereof, wherein the first silane chemical composition is an aromatic silane chemical composition; and a chemical composition formed from the oligomerization of at least the first silane chemical composition and a second silane chemical composition. A polymer layer may be positioned over the coupling agent layer. The polymer layer may include a polyimide chemical composition. The first silane chemical composition and the second silane chemical composition may be different chemical compositions. The coated glass article may be thermally stable at a temperature of at least about 280° C. for 30 minutes. A light transmission through the coated glass article may be greater than or equal to about 55% of a light transmission through an uncoated glass article for wavelengths from about 400 nm to about 700 nm.

In another embodiment, a coated glass article may include a glass body having a first surface and a low-friction coating bonded to at least a portion of the first surface of the glass body. The low-friction coating may include a coupling agent layer comprising a coupling agent comprising an oligomer of one or more silane chemical compositions. The oligomer may be a silsesquioxane chemical composition and at least one of the silane chemical compositions comprises at least one aromatic moiety and at least one amine moiety. The low friction coating may further comprise a polymer layer comprising a polyimide chemical composition formed from the polymerization of at least a first diamine monomer chemical composition, a second diamine monomer chemical composition, and a dianhydride monomer chemical composition. The first diamine monomer chemical composition may be different than the second diamine monomer chemical composition. The low-friction coating may also include an interface layer comprising one or more chemical compositions of the polymer layer bound with one or more of the chemical compositions of the coupling agent layer.

In another embodiment, a low-friction coating for a substrate may include a polyimide chemical composition and a coupling agent. The coupling agent may include at least one of: a mixture of a first silane chemical composition, a hydrolysate thereof, or an oligomer thereof, and a second silane chemical composition, a hydrolysate thereof, or an oligomer thereof, wherein the first silane chemical composition may be an aromatic silane chemical composition and the second silane chemical composition may be an aliphatic silane chemical composition; and a chemical composition formed from the oligomerization of at least the first silane chemical composition and the second silane chemical composition. The coating may be thermally stable at a temperature of at least about 260° C. for 30 minutes. A light transmission through the coating may be greater than or equal to about 55%. The low-friction coating has a mass loss of less than about 5% of its mass when heated from a temperature of 150° C. to 350° C. at a ramp rate of about 10° C./minute.

Additional features and advantages of the coated glass articles and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 13 contains a Table reporting the load and measured coefficient of friction for Schott Type 1B glass vials and vials formed from a Reference Glass Composition that were ion exchanged and coated, according to one or more embodiments shown and described herein;

FIG. 17 contains a Table reporting different low-friction coating compositions which were tested under lyophilization conditions, according to one or more embodiments shown and described herein;

FIG. 24 shows the coefficient of friction for APS/NOVASTRAT® 800 coated vials before and after lyophilization, according to one or more embodiments shown and described herein;

FIG. 26 shows the coefficient of friction for APS/NOVASTRAT® 800 coated vials before and after autoclaving, according to one or more embodiments shown and described herein;

FIG. 28 contains a Table illustrating the change in the coefficient of friction with variations in the composition of the coupling agent of a low-friction coating applied to a glass container as described herein;

FIG. 31 shows a schematic diagram of reaction steps of a silane bonding to a substrate, according to one or more embodiments shown and described herein;

FIG. 37 graphically depicts the coefficient of friction, applied force and frictive force for coated glass containers before and after depyrogenation, according to one or more embodiments shown and described herein;

DETAILED DESCRIPTION

Reference will now be made in detail to various embodiments of low-friction coatings, glass articles with low-friction coatings, and methods for producing the same, examples of which are schematically depicted in the figures. Such coated glass articles may be glass containers suitable for use in various packaging applications including, without limitation, as pharmaceutical packages. These pharmaceutical packages may or may not contain a pharmaceutical composition. Various embodiments of the low-friction coatings, glass articles with low-friction coatings, and methods for forming the same will be described in further detail herein with specific reference to the appended drawings. While embodiments of the low-friction coatings described herein are applied to the outer surface of a glass container, it should be understood that the low-friction coatings described may be used as a coating on a wide variety of materials, including non-glass materials and on substrates other than containers including, without limitation, glass display panels and the like.

Generally, a low-friction coating may be applied to a surface of a glass article, such as a container that may be used as a pharmaceutical package. The low-friction coating may provide advantageous properties to the coated glass article such as a reduced coefficient of friction and increased damage resistance. The reduced coefficient of friction may impart improved strength and durability to the glass article by mitigating frictive damage to the glass. Further, the low-friction coating may maintain the aforementioned improved strength and durability characteristics following exposure to elevated temperatures and other conditions, such as those experienced during packaging and pre-packaging steps utilized in packaging pharmaceuticals, such as, for example, depyrogenation, autoclaving and the like. Accordingly, the low-friction coatings and glass articles with the low-friction coating are thermally stable.

The low-friction coating may generally comprise a coupling agent, such as a silane, and a polymer chemical composition, such as a polyimide. In some embodiments, the coupling agent may be disposed in a coupling agent layer positioned on the surface of the glass article and the polymer chemical composition may be disposed in a polymer layer positioned on the coupling agent layer. In other embodiments, the coupling agent and the polymer chemical composition may be mixed in a single layer.

Figure 1:
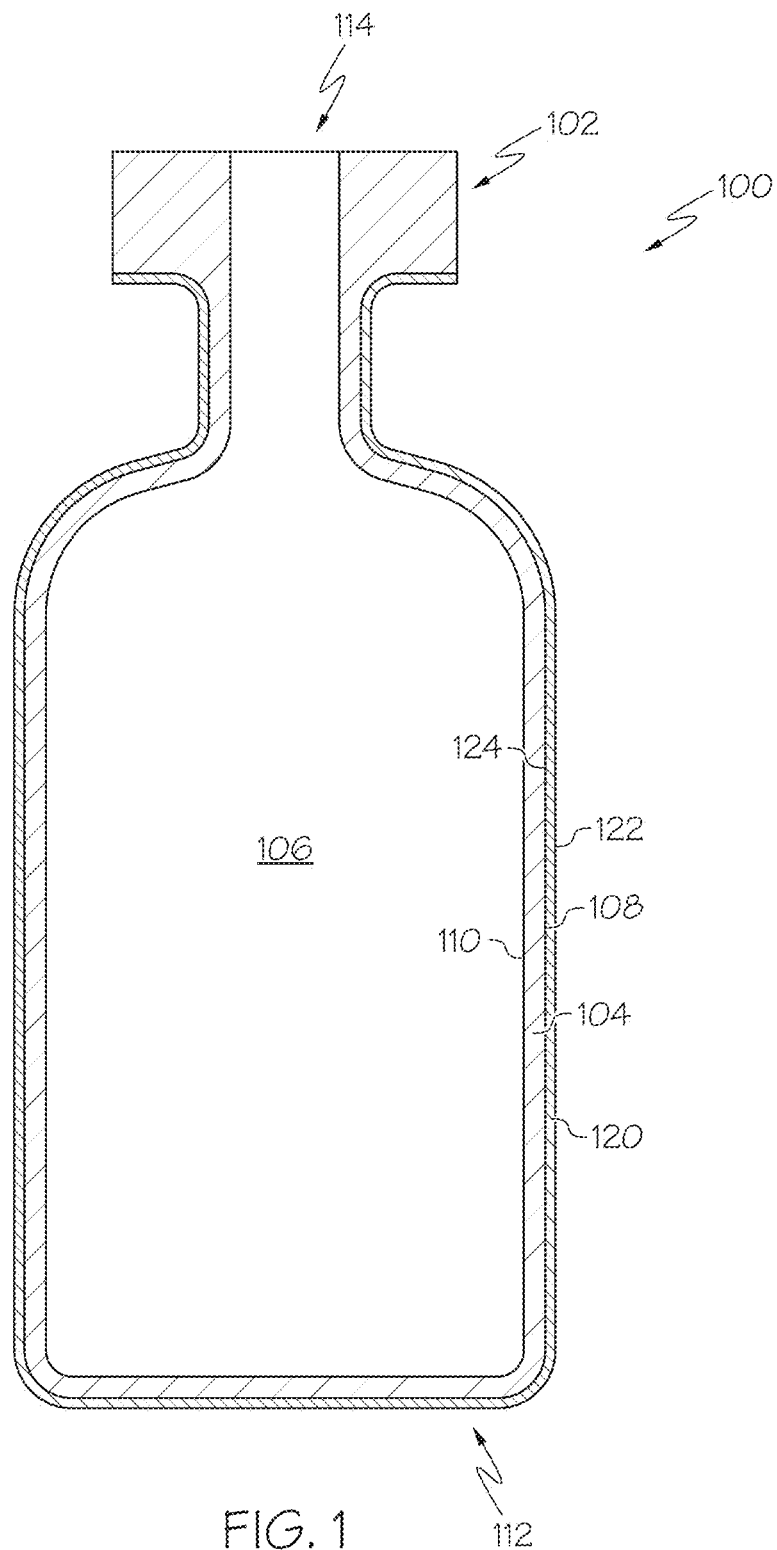
FIG. 1 schematically depicts a cross section of a glass container with a low-friction coating, according to one or more embodiments shown and described herein.

FIG. 1 schematically depicts a cross section of a coated glass article, specifically a coated glass container 100. The coated glass container 100 comprises a glass body 102 and a low-friction coating 120. The glass body 102 has a glass container wall 104 extending between an exterior surface 108 (i.e., a first surface) and an interior surface 110 (i.e., a second surface). The interior surface 110 of the glass container wall 104 defines an interior volume 106 of the coated glass container 100. A low-friction coating 120 is positioned on at least a portion of the exterior surface 108 of the glass body 102. In some embodiments, the low-friction coating 120 may be positioned on substantially the entire exterior surface 108 of the glass body 102. The low-friction coating 120 has an outer surface 122 and a glass body contacting surface 124 at the interface of the glass body 102 and the low-friction coating 120. The low-friction coating 120 may be bonded to the glass body 102 at the exterior surface 108.

In one embodiment, the coated glass container 100 is a pharmaceutical package. For example, the glass body 102 may be in the shape of a vial, ampoule, ampul, bottle, flask, phial, beaker, bucket, carafe, vat, syringe body, or the like. The coated glass container 100 may be used for containing any composition, and in one embodiment, may be used for containing a pharmaceutical composition. A pharmaceutical composition may include any chemical substance intended for use in the medical diagnosis, cure, treatment, or prevention of disease. Examples of pharmaceutical compositions include, but are not limited to, medicines, drugs, medications, medicaments, remedies, and the like. The pharmaceutical composition may be in the form of a liquid, solid, gel, suspension, powder, or the like.

Figure 2:
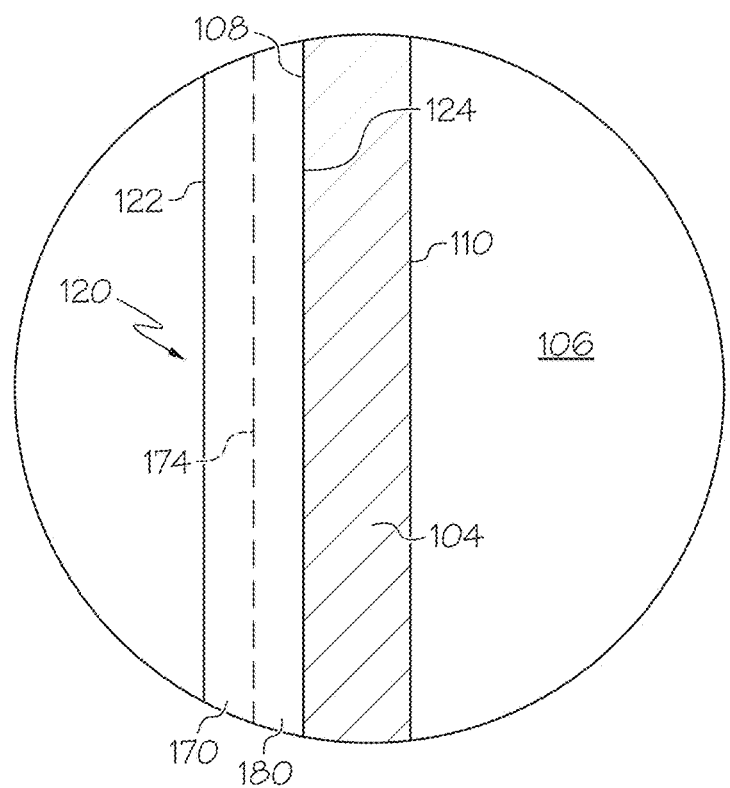
FIG. 2 schematically depicts a cross section of a glass container with a low-friction coating comprising a polymer layer and a coupling agent layer, according to one or more embodiments shown and described herein.

Now referring to FIGS. 1 and 2, in one embodiment, the low-friction coating 120 comprises a bi-layered structure. FIG. 2 shows a cross section of a coated glass container 100, where the low-friction coating comprises a polymer layer 170 and a coupling agent layer 180. A polymer chemical composition may be contained in polymer layer 170 and a coupling agent may be contained in a coupling agent layer 180. The coupling agent layer 180 may be in direct contact with the exterior surface 108 of the glass container wall 104. The polymer layer 170 may be in direct contact with the coupling agent layer 180 and may form the outer surface 122 of the low-friction coating 120. In some embodiments the coupling agent layer 180 is bonded to the glass container wall 104 and the polymer layer 170 is bonded to the coupling agent layer 180 at an interface 174. However, it should be understood that, in some embodiments, the low-friction coating 120 may not include a coupling agent, and the polymer chemical composition may be disposed in a polymer layer 170 in direct contact with the exterior surface 108 of the of the glass container wall 104. In another embodiment, the polymer chemical composition and coupling agent may be substantially mixed in a single layer. In some other embodiments, the polymer layer may be positioned over the coupling agent layer, meaning that the polymer layer 170 is in an outer layer relative to the coupling agent layer 180, and the glass container wall 104. As used herein, a first layer positioned "over" a second layer means that the first layer could be in direct contact with the second layer or separated from the second layer, such as with a third layer disposed between the first and second layers.

Figure 3:
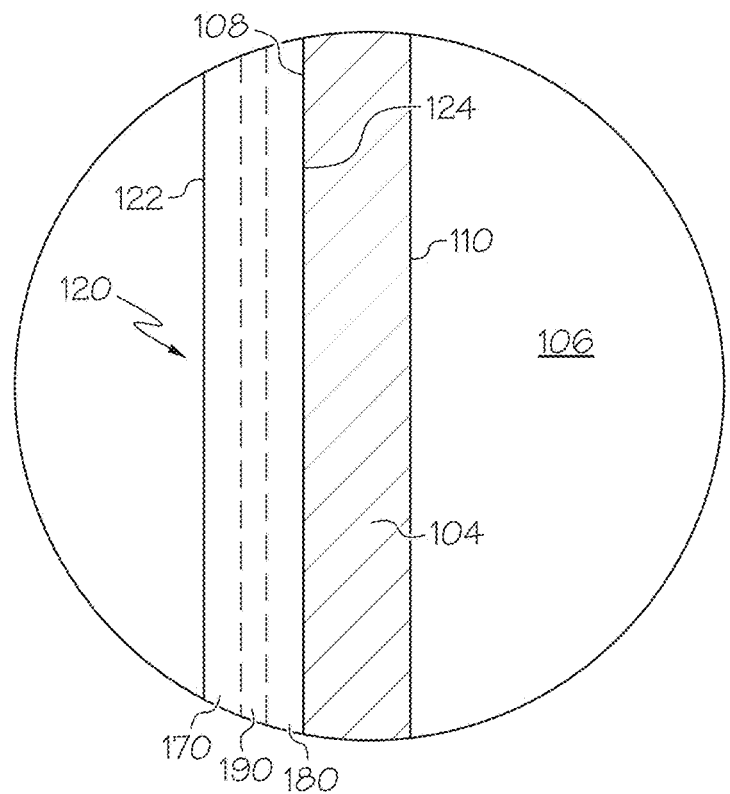
FIG. 3 schematically depicts a cross section of a glass container with a low-friction coating comprising a polymer layer, a coupling agent layer, and an interface layer, according to one or more embodiments shown and described herein.

Referring now to FIG. 3, in one embodiment, the low-friction coating 120 may further comprise an interface layer 190 positioned between the coupling agent layer 180 and the polymer layer 170. The interface layer 190 may comprise one or more chemical compositions of the polymer layer 170 bound with one or more of the chemical compositions of the coupling agent layer 180. In this embodiment, the interface of the coupling agent layer and polymer layer forms an interface layer 190 where bonding occurs between the polymer chemical composition and the coupling agent. However, it should be understood that in some embodiments, there may be no appreciable layer at the interface of the coupling agent layer 180 and polymer layer 170 where the polymer and coupling agent are chemically bound to one another as described above with reference to FIG. 2.

The low-friction coating 120 applied to the glass body 102 may have a thickness of less than about 100 μm or even less than or equal to about 1 μm. In some embodiments, the thickness of the low-friction coating 120 may be less than or equal to about 100 nm thick. In other embodiments, the low-friction coating 120 may be less than about 90 nm thick, less than about 80 nm thick, less than about 70 nm thick, less than about 60 nm thick, less than about 50 nm, or even less than about 25 nm thick. In some embodiments, the low-friction coating 120 may not be of uniform thickness over the entirety of the glass body 102. For example, the coated glass container 100 may have a thicker low-friction coating 120 in some areas, due to the process of contacting the glass body 102 with one or more coating solutions that form the low-friction coating 120. In some embodiments, the low-friction coating 120 may have a non-uniform thickness. For example, the coating thickness may be varied over different regions of a coated glass container 100, which may promote protection in a selected region.

In embodiments which include at least two layers, such as the polymer layer 170, interface layer 190, and/or coupling agent layer 180, each layer may have a thickness of less than about 100 μm or even less than or equal to about 1 μm. In some embodiments, the thickness of each layer may be less than or equal to about 100 nm. In other embodiments, each layer may be less than about 90 nm thick, less than about 80 nm thick, less than about 70 nm thick, less than about 60 nm thick, less than about 50 nm, or even less than about 25 nm thick.

As noted herein, in some embodiments, the low-friction coating 120 comprises a coupling agent. The coupling agent may improve the adherence or bonding of the polymer chemical composition to the glass body 102, and is generally disposed between the glass body 102 and the polymer chemical composition or mixed with the polymer chemical composition. Adhesion, as used herein, refers to the strength of adherence or bonding of the low friction coating prior to and following a treatment applied to the coated glass container, such as a thermal treatment. Thermal treatments include, without limitation, autoclaving, depyrogenation, lyophilization, or the like.

In one embodiment, the coupling agent may comprise at least one silane chemical composition. As used herein, a "silane" chemical composition is any chemical composition comprising a silane moiety, including functional organosilanes, as well as silanols formed from silanes in aqueous solutions. The silane chemical compositions of the coupling agent may be aromatic or aliphatic. In some embodiments, the at least one silane chemical composition may comprise an amine moiety, such as a primary amine moiety or a secondary amine moiety. Furthermore, the coupling agent may comprise hydrolysates and/or oligomers of such silanes, such as one or more silsesquioxane chemical compositions that are formed from the one or more silane chemical compositions. The silsesquioxane chemical compositions may comprise a full cage structure, partial cage structure, or no cage structure.

The coupling agent may comprise any number of different chemical compositions, such as one chemical composition, two different chemical compositions, or more than two different chemical compositions including oligomers formed from more than one monomeric chemical composition. In one embodiment, the coupling agent may comprise at least one of (1) a first silane chemical composition, hydrolysate thereof, or oligomer thereof, and (2) a chemical composition formed from the oligomerization of at least the first silane chemical composition and a second silane chemical composition. In another embodiment, the coupling agent comprises a first and second silane. As used herein, a "first" silane chemical composition and a "second" silane chemical composition are silanes having different chemical compositions. The first silane chemical composition may be an aromatic or an aliphatic chemical composition, may optionally comprise an amine moiety, and may optionally be an alkoxysilane. Similarly, the second silane chemical composition may be an aromatic or an aliphatic chemical composition, may optionally comprise an amine moiety, and may optionally be an alkoxysilane.

For example, in one embodiment, only one silane chemical composition is applied as the coupling agent. In such an embodiment, the coupling agent may comprise a silane chemical composition, hydrolysate thereof, or oligomer thereof.

In another embodiment, multiple silane chemical compositions may be applied as the coupling agent. In such an embodiment, the coupling agent may comprise at least one of (1) a mixture of the first silane chemical composition and a second silane chemical composition, and (2) a chemical composition formed from the oligomerization of at least the first silane chemical composition and the second silane chemical composition.

Referring to the embodiments described above, the first silane chemical composition, second silane chemical composition, or both, may be aromatic chemical compositions. As used herein, an aromatic chemical composition contains one or more six-carbon rings characteristic of the benzene series and related organic moieties. The aromatic silane chemical composition may be an alkoxysilane such as, but not limited to, a dialkoxysilane chemical composition, hydrolysate thereof, or oligomer thereof, or a trialkoxysilane chemical composition, hydrolysate thereof, or oligomer thereof. In some embodiments, the aromatic silane may comprise an amine moiety, and may be an alkoxysilane comprising an amine moiety. In another embodiment, the aromatic silane chemical composition may be an aromatic alkoxysilane chemical composition, an aromatic acyloxysilane chemical composition, an aromatic halogen silane chemical composition, or an aromatic aminosilane chemical composition. In another embodiment, the aromatic silane chemical composition may be selected from the group consisting of aminophenyl, 3-(m-aminophenoxy) propyl, N-phenylaminopropyl, or (chloromethyl) phenyl substituted alkoxy, acyloxy, halogen, or amino silanes. For example, the aromatic alkoxysilane may be, but is not limited to, aminophenyltrimethoxy silane (sometimes referred to herein as "APhTMS"), aminophenyldimethoxy silane, aminophenyltriethoxy silane, aminophenyldiethoxy silane, 3-(m-aminophenoxy) propyltrimethoxy silane, 3-(m-aminophenoxy) propyldimethoxy silane, 3-(m-aminophenoxy) propyltriethoxy silane, 3-(m-aminophenoxy) propyldiethoxy silane, N-phenylaminopropyltrimethoxysilane, N-phenylaminopropyldimethoxysilane, N-phenylaminopropyltriethoxysilane, N-phenylaminopropyldiethoxysilane, hydrolysates thereof, or oligomerized chemical composition thereof. In an exemplary embodiment, the aromatic silane chemical composition may be aminophenyltrimethoxy silane.

Referring again to the embodiments described above, the first silane chemical composition, second silane chemical composition, or both, may be aliphatic chemical compositions. As used herein, an aliphatic chemical composition is non-aromatic, such as a chemical composition having an open chain structure, such as, but not limited to, alkanes, alkenes, and alkynes. For example, in some embodiments, the coupling agent may comprise a chemical composition that is an alkoxysilane and may be an aliphatic alkoxysilane such as, but not limited to, a dialkoxysilane chemical composition, a hydrolysate thereof, or an oligomer thereof, or a trialkoxysilane chemical composition, a hydrolysate thereof, or an oligomer thereof. In some embodiments, the aliphatic silane may comprise an amine moiety, and may be an alkoxysilane comprising an amine moiety, such as an aminoalkyltrialkoxysilane. In one embodiment, an aliphatic silane chemical composition may be selected from the group consisting of 3-aminopropyl, N-(2-aminoethyl)-3-aminopropyl, vinyl, methyl, N-phenylaminopropyl, (N-phenylamino)methyl, N-(2-Vinylbenzylaminoethyl)-3-aminopropyl substituted alkoxy, acyloxy, halogen, or amino silanes, hydrolysates thereof, or oligomers thereof. Aminoalkyltrialkoxysilanes, include, but are not limited to, 3-aminopropyltrimethoxy silane (sometimes referred to herein as "GAPS"), 3-aminopropyldimethoxy silane, 3-aminopropyltriethoxy silane, 3-aminopropyldiethoxy silane, N-(2-aminoethyl)-3-aminopropyltrimethoxysilane, N-(2-aminoethyl)-3-aminopropyldimethoxysilane, N-(2-aminoethyl)-3-aminopropyltriethoxysilane, N-(2-aminoethyl)-3-aminopropyldiethoxysilane, hydrolysates thereof, and oligomerized chemical composition thereof. In other embodiments, the aliphatic alkoxysilane chemical composition may not contain an amine moiety, such as an alkyltrialkoxysilane or alkylbialkoxysilane. Such alkyltrialkoxysilanes or alkylbialkoxysilanes include, but are not limited to, vinyltrimethoxy silane, vinyldimethoxy silane, vinyltriethoxy silane, vinyldiethoxy silane, methyltrimethoxysilane, methyltdimethoxysilane, methyltriethoxysilane, methyldiethoxysilane, hydrolysates thereof, or oligomerized chemical composition thereof. In an exemplary embodiment, the aliphatic silane chemical composition is 3-aminopropyltrimethoxy silane.

It has been found that forming the coupling agent from combinations of different chemical compositions, particularly combinations of silane chemical compositions, may improve the thermal stability of the low-friction coating 120. For example, it has been found that combinations of aromatic silanes and aliphatic silanes, such as those described above, improve the thermal stability of the low-friction coating, thereby producing a coating which retains its the mechanical properties, such as coefficient of friction and adhesion performance following a heat treatment at elevated temperatures. Accordingly, in one embodiment the coupling agent comprises a combination of aromatic and aliphatic silanes. In these embodiments, the ratio of aliphatic silanes to aromatic silanes (aliphatic:aromatic) may be from about 1:3 to about 1:0.2. If the coupling agent comprises two or more chemical composition, such as at least an aliphatic silane and an aromatic silane, the ratio by weight of the two chemical compositions may be any ratio, such as a weight ratio of a first silane chemical composition to a second silane chemical composition (first silane:second silane) of about 0.1:1 to about 10:1. For example, in some embodiments the ration may be from 0.5:1 to about 2:1, such as 2:1, 1:1, 0.5:1. In some embodiments, the coupling agent may comprise combinations of multiple aliphatic silanes and/or multiple aromatic silanes, which could be applied to the glass container in one or multiple steps with or without organic or inorganic fillers. In some embodiments, the coupling agent comprises oligomers, such as silsesquioxanes, formed from both the aliphatic and aromatic silanes.

In an exemplary embodiment, the first silane chemical composition is an aromatic silane chemical composition and the second silane chemical composition is an aliphatic silane chemical composition. In one exemplary embodiment, the first silane chemical composition is an aromatic alkoxysilane chemical composition comprising at least one amine moiety and the second silane chemical composition is an aliphatic alkoxysilane chemical composition comprising at least one amine moiety. In another exemplary embodiment, the coupling agent comprises an oligomer of one or more silane chemical compositions, wherein the oligomer is a silsesquioxane chemical composition and at least one of the silane chemical compositions comprises at least one aromatic moiety and at least one amine moiety. In one particular exemplary embodiment, the first silane chemical composition is aminophenyltrimethoxy silane and the second silane chemical composition is 3-aminopropyltrimethoxy silane. The ratio of aromatic silane to aliphatic silane may be about 1:1. In another particular exemplary embodiment, the coupling agent comprises an oligomer formed from aminophenyltrimethoxy and 3-aminopropyltrimethoxy. In another embodiment, the coupling agent may comprise both a mixture of aminophenyltrimethoxy and 3-aminopropyltrimethoxy and oligomers formed from the two.

In another embodiment, the coupling agent may comprise a chemical composition that is an aminoalkylsilsesquioxane. In one embodiment the coupling agent comprises aminopropylsilsesquioxane (APS) oligomer (commercially available as an aqueous solution from Gelest).

In one embodiment, the aromatic silane chemical composition is a chlorosilane chemical composition.

In another embodiment, the coupling agent may comprise chemical composition that are hydrolyzed analogs of aminoalkoxysilanes such as, but not limited to, (3-Aminopropyl)silantriol, N-(2-Aminoethyl)-3-aminopropyl-silantriol and/or mixtures thereof.

In another embodiment, the coupling agent may be an inorganic material, such as metal and/or a ceramic film. Non-limiting examples of suitable inorganic materials used as the coupling agent include titanates, zirconates, tin, titanium, and/or oxides thereof.

In one embodiment, the coupling agent is applied to the exterior surface 108 of the glass body 102 by contacting with the diluted coupling agent by a submersion process. The coupling agent may be mixed in a solvent when applied to the glass body 102. In another embodiment, the coupling agent may be applied to the glass body 102 by a spray or other suitable means. The glass body 102 with coupling agent may then be dried at around 120° C. for about 15 min, or any time and temperature sufficient to adequately liberate the water and/or other organic solvents present on the exterior surface 108 of the glass container wall 104.

Referring to FIG. 2, in one embodiment, the coupling agent is positioned on the glass container as a coupling agent layer 180 and is applied as a solution comprising about 0.5 wt % of a first silane and about 0.5 wt % of a second silane (total 1 wt % silane) mixed with at least one of water and an organic solvent, such as, but not limited to, methanol. However, it should be understood that the total silane concentration in the solution may be more or less than about 1 wt %, such as from about 0.1 wt % to about 10 wt %, from about 0.3 wt % to about 5.0 wt %, or from about 0.5 wt % to about 2.0 wt %. For example, in one embodiment, the weight ratio of organic solvent to water (organic solvent: water) may be from about 90:10 to about 10:90, and, in one embodiment, may be about 75:25. The weight ratio of silane to solvent may affect the thickness of the coupling agent layer, where increased percentages of silane chemical composition in the coupling agent solution may increase the thickness of the coupling agent layer 180. However, it should be understood that other variables may affect the thickness of the coupling agent layer 180 such as, but not limited, the specifics of the dip coating process, such as the withdraw speed from the bath. For example, a faster withdraw speed may form a thinner coupling agent layer 180.

In another embodiment, the coupling agent layer 180 may be applied as a solution comprising 0.1 vol % of a commercially available aminopropylsilsesquioxane oligomer. Coupling agent layer solutions of other concentrations may be used, including but not limited to, 0.01-10.0 vol % aminopropylsilsesquioxane oligomer solutions.

As noted herein, the low friction coating also includes a polymer chemical composition. The polymer chemical composition may be a thermally stable polymer or mixture of polymers, such as but not limited to, polyimides, polybenzimidazoles, polysulfones, polyetheretherketones, polyetherimides, polyamides, polyphenyls, polybenzothiazoles, polybenzoxazoles, polybisthiazoles, and polyaromatic heterocyclic polymers with and without organic or inorganic fillers. The polymer chemical composition may be formed from other thermally stable polymers, such as polymers that do not degrade at temperatures in the range of from 200° C. to 400° C., including 250° C., 300° C., and 350° C. These polymers may be applied with or without a coupling agent.

In one embodiment, the polymer chemical composition is a polyimide chemical composition. If the low-friction coating 120 comprises a polyimide, the polyimide composition may be derived from a polyamic acid, which is formed in a solution by the polymerization of monomers. One such polyamic acid is NOVASTRAT® 800 (commercially available from NeXolve). A curing step imidizes the polyamic acid to form the polyimide. The polyamic acid may be formed from the reaction of a diamine monomer, such as a diamine, and an anhydride monomer, such as a dianhydride. As used herein, polyimide monomers are described as diamine monomers and dianhydride monomers. However, it should be understood that while a diamine monomer comprises two amine moieties, in the description that follows, any monomer comprising at least two amine moieties may be suitable as a diamine monomer. Similarly, it should be understood that while a dianhydride monomer comprises two anhydride moieties, in the description that follows any monomer comprising at least two anhydride moieties may be suitable as a dianhydride monomer. The reaction between the anhydride moieties of the anhydride monomer and amine moieties of the diamine monomer forms the polyamic acid. Therefore, as used herein, a polyimide chemical composition that is formed from the polymerization of specified monomers refers to the polyimide that is formed following the imidization of a polyamic acid that is formed from those specified monomers. Generally, the molar ratio of the total anhydride monomers and diamine monomers may be about 1:1. While the polyimide may be formed from only two distinct chemical compositions (one anhydride monomer and one diamine monomer), at least one anhydride monomer may be polymerized and at least one diamine monomer may be polymerized to from the polyimide. For example, one anhydride monomer may be polymerized with two different diamine monomers. Any number of monomer specie combinations may be used. Furthermore, the ratio of one anhydride monomer to a different anhydride monomer, or one or more diamine monomer to a different diamine monomer may be any ratio, such as between about 1:0.1 to 0.1:1, such as about 1:9, 1:4, 3:7, 2:3:, 1:1, 3:2, 7:3, 4:1 or 1:9.

The anhydride monomer from which, along with the diamine monomer, the polyimide is formed may comprise any anhydride monomer. In one embodiment, the anhydride monomer comprises a benzophenone structure. In an exemplary embodiment, benzophenone-3,3',4,4'-tetracarboxylic dianhydride may be at least one of the anhydride monomer from which the polyimide is formed. In other embodiments, the diamine monomer may have an anthracene structure, a phenanthrene structure, a pyrene structure, or a pentacene structure, including substituted versions of the above mentioned dianhydrides.

Figure 4:
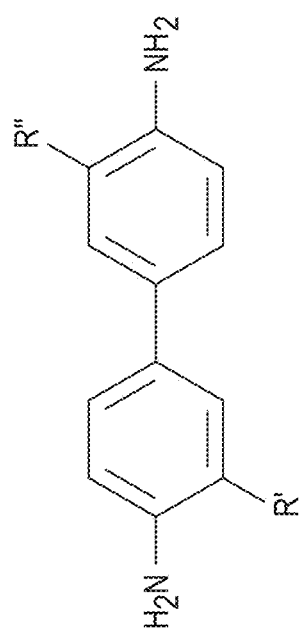
FIG. 4 shows an example of a diamine monomer chemical composition, according to one or more embodiments shown and described herein.
Figure 5:
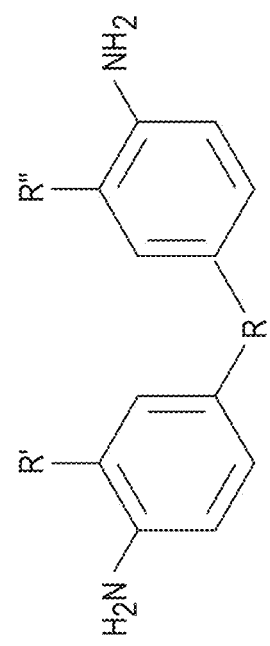
FIG. 5 shows an example of a diamine monomer chemical composition, according to one or more embodiments shown and described herein.

The diamine monomer from which, along with the anhydride monomer, the polyimide is formed may comprise any diamine monomer. In one embodiment, the diamine monomer comprises at least one aromatic ring moiety. FIGS. 4 and 5 show examples of diamine monomers that, along with one or more selected anhydride monomer, may form the polyimide comprising the polymer chemical composition. The diamine monomer may have one or more carbon molecules connecting two aromatic ring moieties together, as shown in FIG. 5, wherein R of FIG. 5 corresponds to an alkyl moiety comprising one or more carbon atoms. Alternatively, the diamine monomer may have two aromatic ring moieties that are directly connected and not separated by at least one carbon molecule, as shown in FIG. 4. The diamine monomer may have one or more alkyl moieties, as represented by R' and R" in FIGS. 4 and 5. For example, in FIGS. 4 and 5, R' and R" may represent an alkyl moiety such as methyl, ethyl, propyl, or butyl moieties, connected to one or more aromatic ring moieties. For example, the diamine monomer may have two aromatic ring moieties wherein each aromatic ring moiety has an alkyl moiety connected thereto and adjacent an amine moiety connected to the aromatic ring moiety. It should be understood that R' and R", in both FIGS. 4 and 5, may be the same chemical moiety or may be different chemical moieties. Alternatively, R' and/or R", in both FIGS. 4 and 5, may represent no atoms at all.

Two different chemical compositions of diamine monomers may form the polyimide. In one embodiment, a first diamine monomer comprises two aromatic ring moieties that are directly connected and not separated by a linking carbon molecule, and a second diamine monomer comprises two aromatic ring moieties that are connected with at least one carbon molecule connecting the two aromatic ring moieties. In one exemplary embodiment, the first diamine monomer, the second diamine monomer, and the anhydride monomer have a molar ratio (first diamine monomer:second diamine monomer:anhydride monomer) of about 0.465:0.035:0.5. However, the ratio of the first diamine monomer and the second diamine monomer may vary in a range of about 0.01:0.49 to about 0.40:0.10, while the anhydride monomer ratio remains at about 0.5.

In one embodiment, the polyimide composition is formed from the polymerization of at least a first diamine monomer, a second diamine monomer, and an anhydride monomer, wherein the first and second diamine monomers are different chemical compositions. In one embodiment, the anhydride monomer is a benzophenone, the first diamine monomer comprises two aromatic rings directly bonded together, and the second diamine monomer comprises two aromatic rings bonded together with at least one carbon molecule connecting the first and second aromatic rings. The first diamine monomer, the second diamine monomer, and the anhydride monomer may have a molar ratio (first diamine monomer: second diamine monomer:anhydride monomer) of about 0.465:0.035:0.5.

In an exemplary embodiment, the first diamine monomer is ortho-Tolidine, the second diamine monomer is 4,4'-methylene-bis(2-methylaniline), and the anhydride monomer is benzophenone-3,3',4,4'-tetracarboxylic dianhydride. The first diamine monomer, the second diamine monomer, and the anhydride monomer may have a molar ratio (first diamine monomer:second diamine monomer:anhydride monomer) of about 0.465:0.035:0.5.

Figure 6:
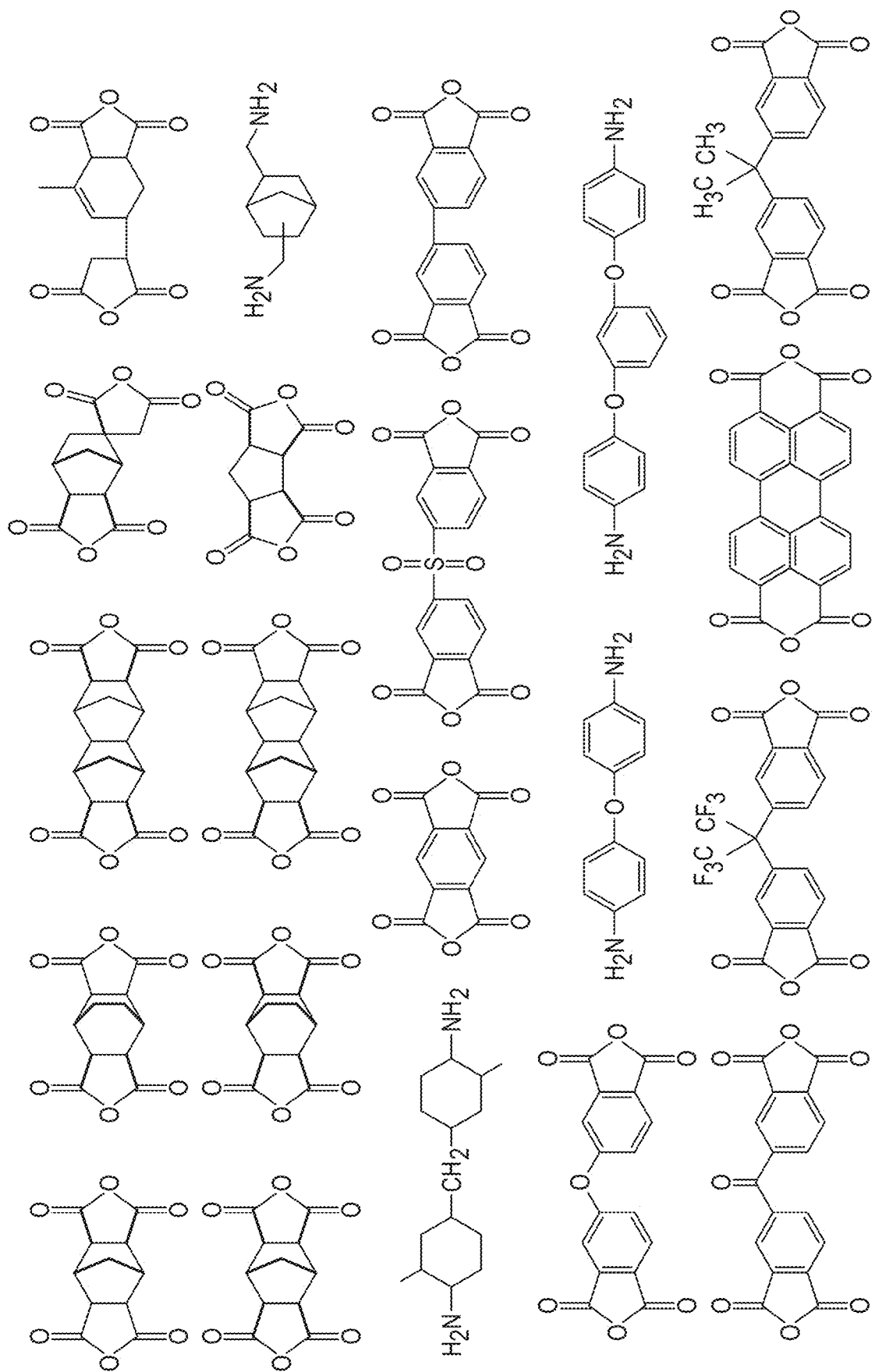
FIG. 6 depicts the chemical structures of monomers that may be used as polyimide coatings applied to glass containers, according to one or more embodiments shown and described herein.

In some embodiments, the polyimide may be formed from the polymerization of one or more of: bicyclo[2.2.1]heptane-2,3,5,6-tetracarboxylic dianhydride, cyclopentane-1,2,3,4-tetracarboxylic 1,2;3,4-dianhydride, bicyclo[2.2.2]octane-2,3,5,6-tetracarboxylic dianhydride, 4arH,8acH)-decahydro-1t,4t:5c,8c-dimethanonaphthalene-2t,3t,6c,7c-tetracarboxylic 2,3:6,7-dianhydride, 2c,3c,6c,7c-tetracarboxylic 2,3:6,7-dianhydride, 5-endo-carboxymethylbicyclo[2.2.1]-heptane-2-exo,3-exo,5-exo-tricarboxylic acid 2,3:5,5-dianhydride, 5-(2,5-Dioxotetrahydro-3-furanyl)-3-methyl-3-cyclohexene-1,2-dicarboxylic anhydride, isomers of Bis(aminomethyl) bicyclo[2.2.1]heptane, or 4,4'-Methylenebis(2-methylcyclohexylamine), Pyromellitic dianhydride (PMDA) 3,3',4,4'-Biphenyl dianhydride (4,4'-BPDA), 3,3',4,4'-Benzophenone dianhydride (4,4'-BTDA), 3,3',4,4'-Oxy-diphthalic anhydride (4,4'-ODPA), 1,4-Bis(3,4-dicarboxyl-phenoxy)benzene dianhydride (4,4'-HQDPA), 1,3-Bis(2,3-dicarboxyl-phenoxy)benzene dianhydride (3,3'-HQDPA), 4,4'-Bis(3,4-dicarboxyl phenoxyphenyl)-isopropylidene dianhydride (4,4'-BPADA), 4,4'-(2,2,2-Trifluoro-1-pentafluorophenylethylidene) diphthalic dianhydride (3FDA), 4,4'-Oxydianiline (ODA), m-Phenylenediamine (MPD), p-Phenylenediamine (PPD), m-Toluenediamine (TDA), 1,4-Bis(4-aminophenoxy)benzene (1,4,4-APB), 3,3'-(m-Phenylenebis(oxy))dianiline (APB), 4,4'-Diamino-3,3'-dimethyldiphenylmethane (DMMDA), 2,2'-Bis(4-(4-aminophenoxy)phenyl)propane (BAPP), 1,4-Cyclohexanediamine 2,2'-Bis[4-(4-amino-phenoxy) phenyl] hexafluoroisopropylidene (4-BDAF), 6-Amino-1-(4'-aminophenyl)-1,3,3-trimethylindane (DAPI), Maleic anhydride (MA), Citraconic anhydride (CA), Nadic anhydride (NA), 4-(Phenylethynyl)-1,2-benzenedicarboxylic acid anhydride (PEPA), 4,4'-diaminobenzanilide (DABA), 4,4'-(hexafluoroisopropylidene)di-phthalicanhydride (6-FDA), Pyromellitic dianhydride, benzophenone-3,3',4,4'-tetracarboxylic dianhydride, 3,3',4,4'-biphenyltetracarboxylic dianhydride, 4,4'-(hexafluoroisopropylidene)diphthalic anhydride, perylene-3,4,9,10-tetracarboxylic dianhydride, 4,4'-oxydiphthalic anhydride, 4,4'-(hexafluoroisopropylidene)diphthalic anhydride, 4,4'-(4,4'-Isopropylidenediphenoxy)bis (phthalic anhydride), 1,4,5,8-Naphthalenetetracarboxylic dianhydride, 2,3,6,7-Naphthalenetetracarboxylic dianhydride, as well as those materials described in U.S. Pat. Nos. 7,619,042, 8,053,492, 4,880,895, 6,232,428, 4,595,548, WO Pub. No. 2007/016516, U.S. Pat. Pub. No. 2008/0214777, U.S. Pat. Nos. 6,444,783, 6,277,950, and 4,680,373. FIG. 6 depicts the chemical structure of some suitable monomers that may be used to form a polyimide coating applied to the glass body 102. In another embodiment, the polyamic acid solution from which the polyimide is formed may comprise poly (pyromellitic dianhydride-co-4,4'-oxydianiline) amic acid (commercially available from Aldrich).

In another embodiment, the polymer chemical composition may comprise a fluoropolymer. The fluoropolymer may be a copolymer wherein both monomers are highly fluorinated. Some of the monomers of the fluoropolymer may be fluoroethylene. In one embodiment, the polymer chemical composition comprises an amorphous fluoropolymer, such as, but not limited to, Teflon AF (commercially available from DuPont). In another embodiment, the polymer chemical composition comprises perfluoroalkoxy (PFA) resin particles, such as, but not limited to, Teflon PFA TE-7224 (commercially available from DuPont).

In another embodiment, the polymer chemical composition may comprise a silicone resin. The silicone resin may be a highly branched 3-dimensional polymer which is formed by branched, cage-like oligosiloxanes with the general formula of $R_nSi(X)_mO_y$, where R is a non reactive substituent, usually methyl or phenyl, and X is OH or H. While not wishing to be bound by theory, it is believed that curing of the resin occurs through a condensation reaction of Si—OH moieties with a formation of Si—O—Si bonds. The silicone resin may have at least one of four possible functional siloxane monomeric units, which include M-resins, D-resins, T-resins, and Q-resins, wherein M-resins refer to resins with the general formula $R_3SiO$, D-resins refer to resins with the general formula $R_2SiO_2$, T-resins refer to resins with the general formula $RSiO_3$, and Q-resins refer to resins with the general formula $SiO_4$ (a fused quartz). In some embodiments resins are made of D and T units (DT resins) or from M and Q units (MQ resins). In other embodiments, other combinations (MDT, MTQ, QDT) are also used.

In one embodiment, the polymer chemical composition comprises phenylmethyl silicone resins due to their higher thermal stability compared to methyl or phenyl silicone resins. The ratio of phenyl to methyl moieties in the silicone resins may be varied in the polymer chemical composition. In one embodiment, the ratio of phenyl to methyl is about 1.2. In another embodiment, the ratio of phenyl to methyl is about 0.84. In other embodiments, the ratio of phenyl to methyl moieties may be about 0.5, 0.6, 0.7, 0.8, 0.9, 1.0, 1.1, 1.3, 1.4, or 1.5. In one embodiment, the silicone resin is DC 255 (commercially available from Dow Corning). In another embodiment, the silicone resin is DC806A (commercially available from Dow Corning). In other embodiments, the polymer chemical composition may comprise any of the DC series resins (commercially available for Dow Corning), and/or Hardsil Series AP and AR resins (commercially available from Gelest). The silicone resins can be used without coupling agent or with coupling agent.

In another embodiment, the polymer chemical composition may comprise silsesquioxane-based polymers, such as but not limited to T-214 (commercially available from Honeywell), SST-3M01 (commercially available from Gelest), POSS Imiclear (commercially available from Hybrid Plastics), and FOX-25 (commercially available from Dow Corning). In one embodiment, the polymer chemical composition may comprise a silanol moiety.

Referring again to FIGS. 1 and 2, the low-friction coating 120 may be applied in a multi stage process, wherein the glass body 102 is contacted with the coupling agent solution to form the coupling agent layer 180 (as described above), and dried, and then contacted with a polymer chemical composition solution, such as a polymer or polymer precursor solution, such as by a submersion process, or alternatively, the polymer layer 170 may be applied by a spray or other suitable means, and dried, and then cured at high temperatures. Alternatively, if a coupling agent layer 180 is not used, the polymer chemical composition of the polymer layer 170 may be directly applied to the exterior surface 108 of the glass body 102. In another embodiment, the polymer chemical composition and the coupling agent may be mixed in the low-friction coating 120, and a solution comprising the polymer chemical composition and the coupling agent may be applied to the glass body 102 in a single coating step.

In one embodiment, the polymer chemical composition comprises a polyimide wherein a polyamic acid solution is applied over the coupling agent layer 180. In other embodiments, a polyamic acid derivative may be used, such as, for example, a polyamic acid salt, a polyamic acid ester, or the like. In one embodiment, the polyamic acid solution may comprise a mixture of 1 vol % polyamic acid and 99 vol % organic solvent. The organic solvent may comprise a mixture of toluene and at least one of N,N-Dimethylacetamide (DMAc), N,N-Dimethylformamide (DMF), and 1-Methyl-2-pyrrolidinone (NMP) solvents, or a mixture thereof. In one embodiment the organic solvent solution comprises about 85 vol % of at least one of DMAc, DMF, and NMP, and about 15 vol % toluene. However, other suitable organic solvents may be used. The coated glass container 100 may then be dried at around 150° C. for about 20 minutes, or any time and temperature sufficient to adequately liberate the organic solvent present in the low-friction coating 120.

In the layered low-friction coating embodiment, after the glass body 102 is contacted with the coupling agent to form the coupling agent layer 180 and polyamic acid solution to form the polymer layer 170, the coated glass container 100 may be cured at high temperatures. The coated glass container 100 may be cured at 300° C. for about 30 minutes or less, or may be cured at a temperature higher than 300° C., such as at least 320° C., 340° C., 360° C., 380° C., or 400° C. for a shorter time. It is believed, without being bound by theory, that the curing step imidizes the polyamic acid in the polymer layer 170 by reaction of carboxylic acid moieties and amide moieties to create a polymer layer 170 comprising a polyimide. The curing may also promote bonds between the polyimide and the coupling agent. The coated glass container 100 is then cooled to room temperature.

Furthermore, without being bound by limitation, it is believed that the curing of the coupling agent, polymer chemical composition, or both, drives off volatile materials, such as water and other organic molecules. As such, these volatile materials that are liberated during curing are not present when the article, if used as a container, is thermally treated (such as for depyrogenation) or contacted by the material in which it is a package for, such as a pharmaceutical. It should be understood that the curing processes described herein are separate heating treatments than other heating treatments described herein, such as those heating treatments similar or identical to processes in the pharmaceutical packaging industry, such as depyrogenation or the heating treatments used to define thermal stability, as described herein.

The glass containers to which the low-friction coating 120 may be applied may be formed from a variety of different glass compositions. The specific composition of the glass article may be selected according to the specific application such that the glass has a desired set of physical properties.

The glass containers may be formed from a glass composition which has a coefficient of thermal expansion in the range from about $25 \times 10^{-7}/°$ C. to $80 \times 10^{-7}/°$ C. For example, in some embodiments described herein, the glass body 102 is formed from alkali aluminosilicate glass compositions which are amenable to strengthening by ion exchange. Such compositions generally include a combination of $SiO_2$, $Al_2O_3$, at least one alkaline earth oxide, and one or more alkali oxides, such as $Na_2O$ and/or $K_2O$. In some of these embodiments, the glass composition may be free from boron and compounds containing boron. In some other embodiments the glass compositions may further comprise minor amounts of one or more additional oxides such as, for example, $SnO_2$, $ZrO_2$, $ZnO$, $TiO_2$, $As_2O_3$, or the like. These components may be added as fining agents and/or to further enhance the chemical durability of the glass composition. In another embodiment, the glass surface may comprise a metal oxide coating comprising $SnO_2$, $ZrO_2$, $ZnO$, $TiO_2$, $As_2O_3$, or the like In some embodiments described herein, the glass body 102 is strengthened such as by ion-exchange strengthening, herein referred to as "ion-exchanged glass". For example, the glass body 102 may have a compressive stress of greater than or equal to about 300 MPa or even greater than or equal to about 350 MPa. In some embodiments, the compressive stress may be in a range from about 300 MPa to about 900 MPa. However, it should be understood that, in some embodiments, the compressive stress in the glass may be less than 300 MPa or greater than 900 MPa. In some embodiments, the glass body 102 may have a depth of layer greater than or equal to 20 µm. In some of these embodiments, the depth of layer may be greater than 50 µm or even greater than or equal to 75 µm. In still other embodiments, the depth of the layer may be up to or greater than 100 µm. The ion-exchange strengthening may be performed in a molten salt bath maintained at temperatures from about 350° C. to about 500° C. To achieve the desired compressive stress, the glass container (uncoated) may be immersed in the salt bath for less than about 30 hours or even less than about 20 hours. For example, in one embodiment the glass container is immersed in a 100% $KNO_3$ salt bath at 450° C. for about 8 hours.

In one particularly exemplary embodiment, the glass body 102 may be formed from an ion exchangeable glass composition described in pending U.S. patent application Ser. No. 13/660,394 filed Oct. 25, 2012 and entitled "Glass Compositions with Improved Chemical and Mechanical Durability" assigned to Corning, Incorporated.

However it should be understood that the coated glass containers 100 described herein may be formed from other glass compositions including, without limitation, ion-exchangeable glass compositions and non-ion exchangeable glass compositions. For example, in some embodiments the glass container may be formed from Type 1B glass compositions such as, for example, Schott Type 1B aluminosilicate glass.

In some embodiments described herein, the glass article may be formed from a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but not limited to Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20$-$85 \times 10^{-7}$ °C.$^{-1}$.

When the coated glass articles described herein are glass containers, the glass body 102 of the coated glass containers 100 may take on a variety of different forms. For example, the glass bodies described herein may be used to form coated glass containers 100 such as vials, ampoules, cartridges, syringe bodies and/or any other glass container for storing pharmaceutical compositions. Moreover, the ability to chemically strengthen the glass containers prior to coating can be utilized to further improve the mechanical durability of the glass containers. Accordingly, it should be understood that, in at least one embodiment, the glass containers may be ion exchange strengthened prior to application of the low-friction coating. Alternatively, other strengthening methods such as heat tempering, flame polishing, and laminating, as described in U.S. Pat. No. 7,201,965, could be used to strengthen the glass before coating.

In one embodiment, the coupling agent comprises a silane chemical composition, such as an alkoxysilane, which may improve the adhesion of the polymer chemical composition to the glass body. Without being bound by theory, it is believed that alkoxysilane molecules hydrolyze rapidly in water forming isolated monomers, cyclic oligomers, and large intramolecular cyclics. In various embodiments, the control over which species predominates may be determined by silane type, concentration, pH, temperature, storage condition, and time. For example, at low concentrations in aqueous solution, aminopropyltrialkoxysilane (APS) may be stable and form trisilanol monomers and very low molecular weight oligomeric cyclics.

It is believed, still without being bound by theory, that the reaction of one or more silanes chemical compositions to the glass body may involve several steps. As shown in FIG. 31, in some embodiments, following hydrolysis of the silane chemical composition, a reactive silanol moiety may be formed, which can condense with other silanol moieties, for example, those on the surface of a substrate, such as a glass body. After the first and second hydrolysable moieties are hydrolyzed, a condensation reaction may be initialized. In some embodiments, the tendency toward self condensation can be controlled by using fresh solutions, alcoholic solvents, dilution, and by careful selection of pH ranges. For example, silanetriols are most stable at pH 3-6, but condense rapidly at pH 7-9.3, and partial condensation of silanol monomers may produce silsesquioxanes. As shown in FIG. 31, the silanol moieties of the formed species may form hydrogen bonds with silanol moieties on the substrate, and during drying or curing a covalent bond may be formed with the substrate with elimination of water. For example, a moderate cure cycle (110° C. for 15 min) may leave silanol moieties remaining in free form and, along with any silane organofunctionality, may bond with the subsequent topcoat, providing improved adhesion.

In some embodiments, the one or more silane chemical compositions of the coupling agent may comprise an amine moiety. Still without being bound by theory, it is believed that this amine moiety may act as a base catalyst in the hydrolysis and co-condensation polymerization and enhance the adsorption rate of the silanes having an amine moiety on a glass surface. It may also create a high pH (9.0-10.0) in aqueous solution that conditions the glass surface and increases density of surface silanol moieties. Strong interaction with water and protic solvents maintains solubility and stability of a silane having an amine moiety chemical composition, such as APS.

In an exemplary embodiment, the glass body may comprise ion-exchanged glass and the coupling agent may be a silane. In some embodiments, adhesion of the low-friction coating to an ion-exchanged glass body may stronger than adhesion of the low-friction coating to a non-ion-exchanged glass body. It is believed, without being bound by theory, that any of several aspects of ion-exchanged glass may promote bonding and/or adhesion, as compared with non-ion-exchanged glass. First, ion-exchanged glass may have enhanced chemical/hydrolytic stability that may affect stability of the coupling agent and/or its adhesion to glass surface. Non-ion-exchanged glass typically has inferior hydrolytic stability and under humid and/or elevated temperature conditions, alkali metals could migrate out of the glass body to the interface of the glass surface and coupling agent layer (if present), or even migrate into the coupling agent layer, if present. If alkali metals migrate, as described above, and there is a change in pH, hydrolysis of Si—O—Si bonds at the glass/coupling agent layer interface or in the coupling agent layer itself may weaken either the coupling agent mechanical properties or its adhesion to the glass. Second, when ion-exchanged glasses are exposed to strong oxidant baths, such as potassium nitrite baths, at elevated temperatures, such as 400° C. to 450° C., and removed, organic chemical compositions on the surface of the glass are removed, making it particularly well suited for silane coupling agents without further cleaning. For example, a non-ion-exchanged glass may have to be exposed to an additional surface cleaning treatment, adding time and expense to the process.

Figure 32:
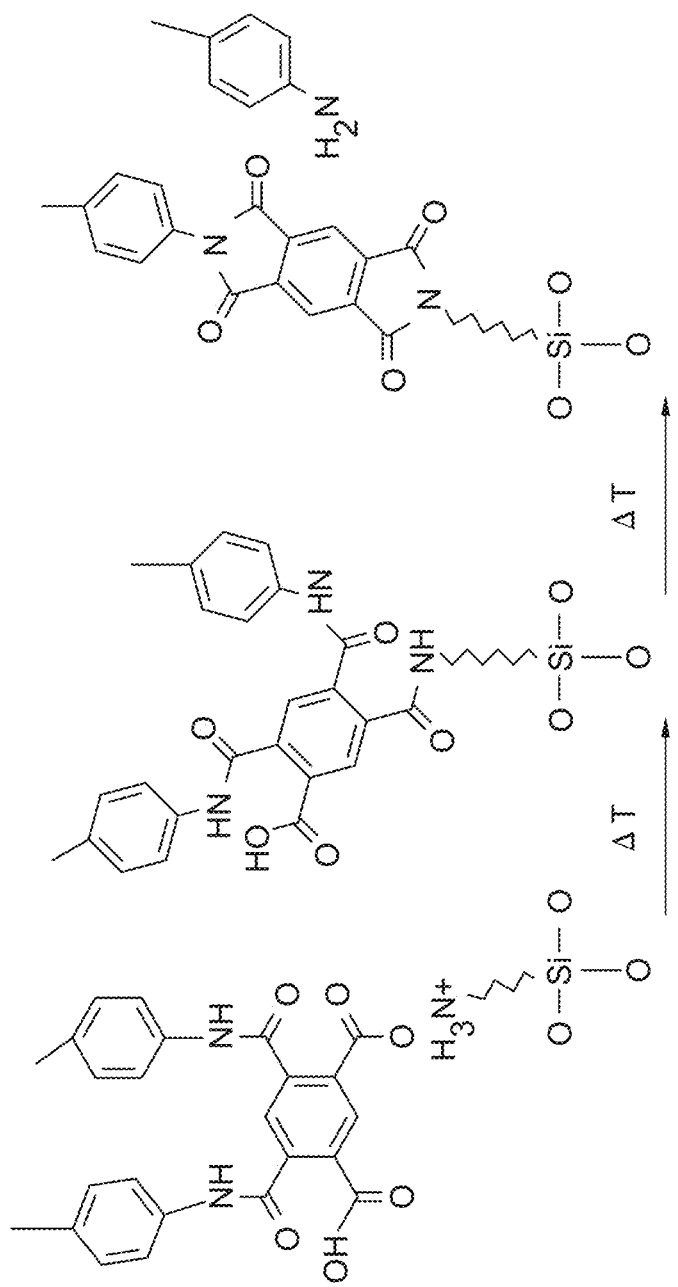
FIG. 32 shows a schematic diagram of reaction steps of a polyimide bonding to a silane, according to one or more embodiments shown and described herein.

In one exemplary embodiment, the coupling agent may comprise at least one silane comprising an amine moiety and the polymer chemical composition may comprise a polyimide chemical composition. Now referring to FIG. 32, without being bound by theory, it is believed that the interaction between this amine moiety interaction and the polyamic acid precursor of the polyimide follows a stepwise process. As shown in FIG. 32, the first step is formation of a polyamic acid salt between a carboxyl moiety of the polyamic acid and the amine moiety. The second step is thermal conversion of the salt into an amide moiety. The thirds step is further conversion of the amide moiety into an imide moiety with scission of the polymer amide bonds. The result is a covalent imide attachment of a shortened polymer chain (polyimide chain) to an amine moiety of the coupling agent, as shown in FIG. 32.

Figure 7:
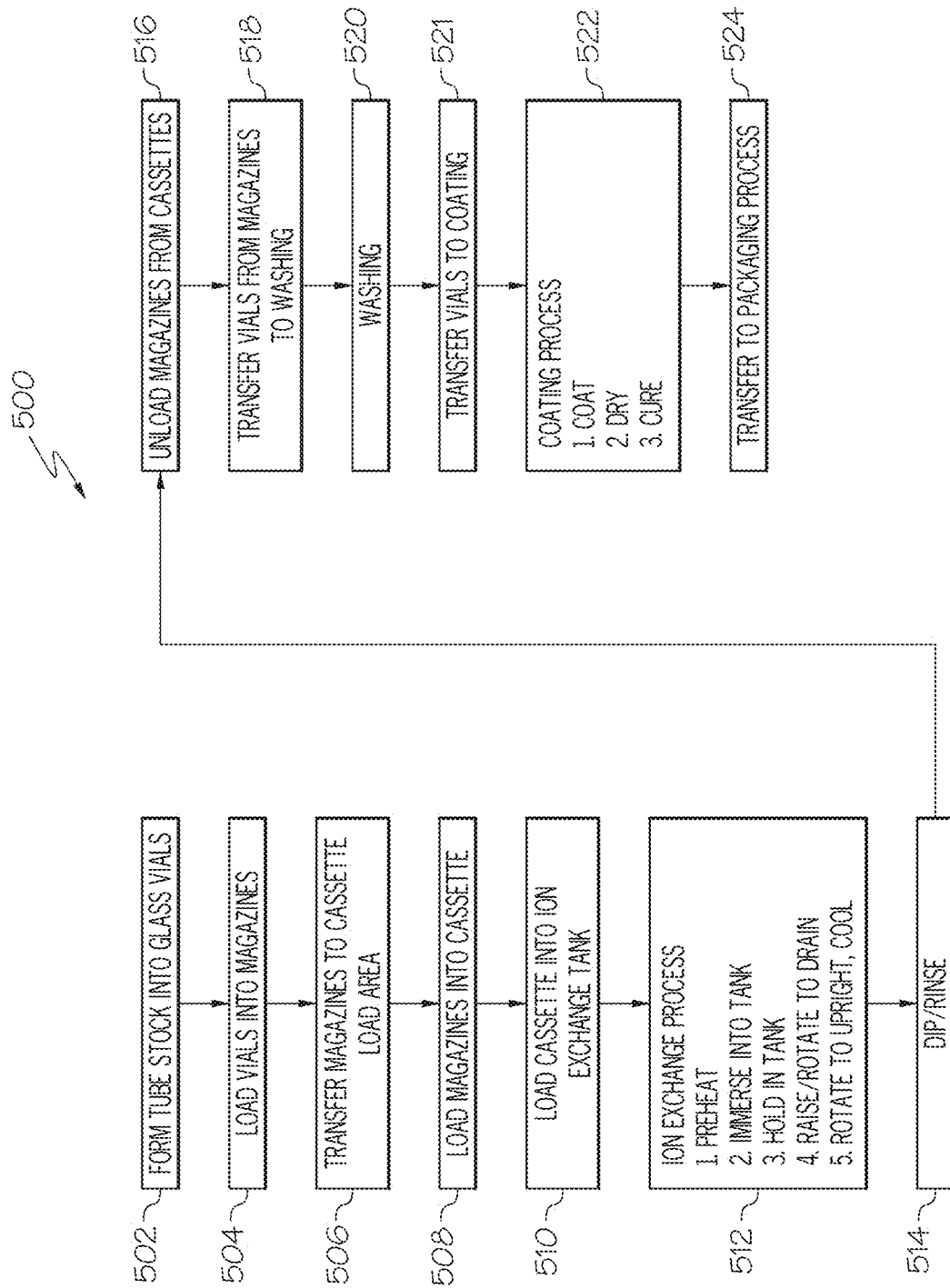
FIG. 7 is a flow diagram of one embodiment of a method for forming a glass container with a low-friction coating, according to one or more embodiments shown and described herein.
Figure 8:
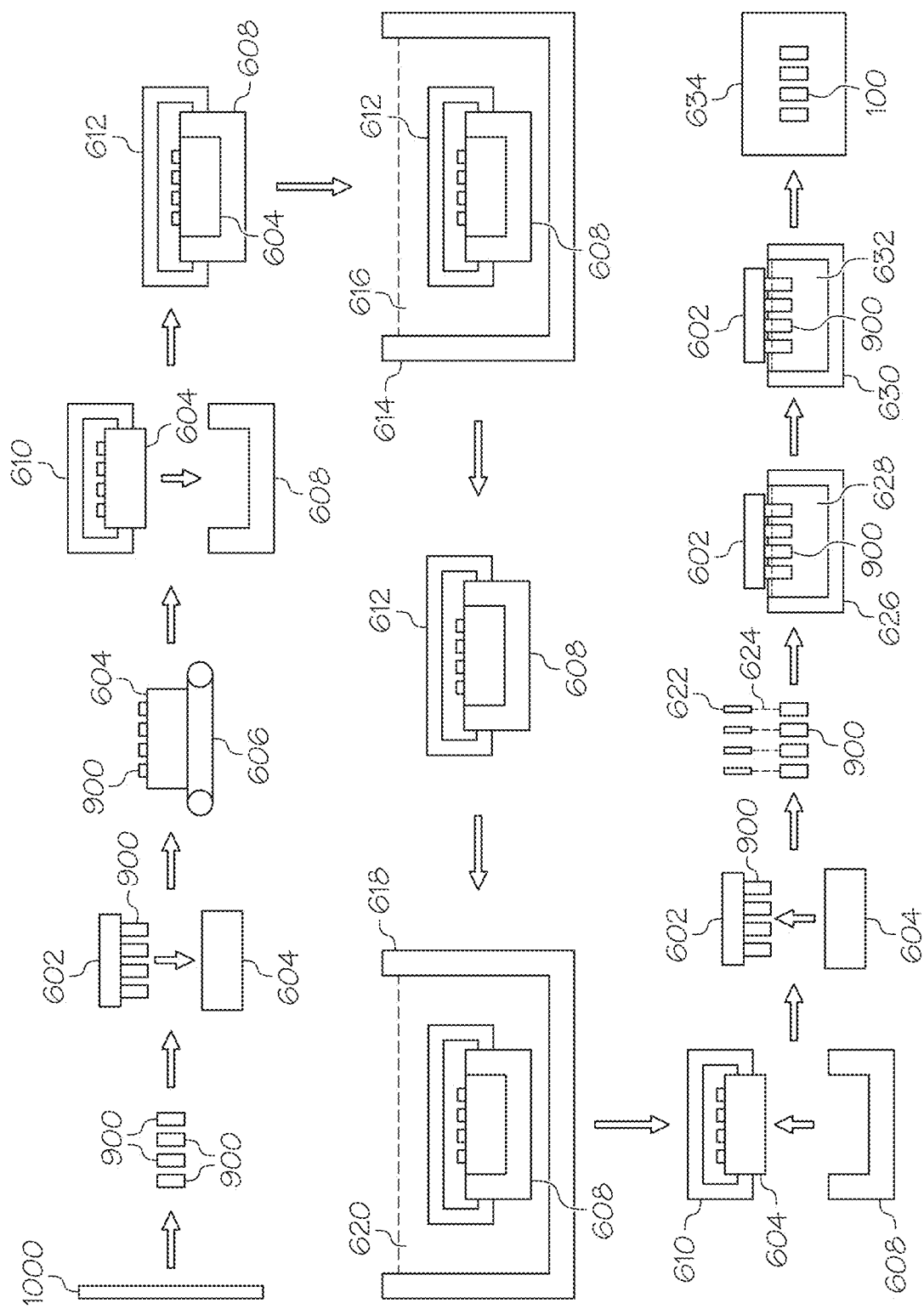
FIG. 8 schematically depicts the steps of the flow diagram of FIG. 7, according to one or more embodiments shown and described herein.

Referring collectively to FIGS. 7 and 8, FIG. 7 contains a process flow diagram 500 of a method for producing a coated glass container 100 having a low-friction coating and FIG. 8 schematically depicts the process described in the flow diagram. In a first step 502, glass tube stock 1000 formed from an ion-exchangeable glass composition is initially shaped into glass containers 900 (specifically glass vials in the embodiment depicted) using conventional shaping and forming techniques. In step 504, the glass containers 900 are loaded into a magazine 604 using a mechanical magazine loader 602. The magazine loader 602 may be a mechanical gripping device, such as a caliper or the like, which is capable of gripping multiple glass containers at one time. Alternatively, the gripping device may utilize a vacuum system to grip the glass containers 900. The magazine loader 602 may be coupled to a robotic arm or other, similar device capable of positioning the magazine loader 602 with respect to the glass containers 900 and the magazine 604.

In a next step 506, the magazine 604 loaded with glass containers 900 is transferred with a mechanical conveyor, such as a conveyor belt 606, overhead crane or the like, to a cassette loading area. Thereafter, in step 508, the magazine 604 is loaded into a cassette 608. The cassette 608 is constructed to hold a plurality of magazines such that a large number of glass containers can be processed simultaneously. Each magazine 604 is positioned in the cassette 608 utilizing a cassette loader 610. The cassette loader 610 may be a mechanical gripping device, such as a caliper or the like, which is capable of gripping one or more magazines at a time. Alternatively, the gripping device may utilize a vacuum system to grip the magazines 604. The cassette loader 610 may be coupled to a robotic arm or other, similar device capable of positioning the cassette loader 610 with respect to the cassette 608 and the magazine 604.

In a next step 510, the cassette 608 containing the magazines 604 and glass containers 900 is transferred to an ion exchange station and loaded into an ion exchange tank 614 to facilitate chemically strengthening the glass containers 900. The cassette 608 is transferred to the ion exchange station with a cassette transfer device 612. The cassette transfer device 612 may be a mechanical gripping device, such as a caliper or the like, which is capable of gripping the cassette 608. Alternatively, the gripping device may utilize a vacuum system to grip the cassette 608. The cassette transfer device 612 and attached cassette 608 may be automatically conveyed from the cassette loading area to the ion exchange station with an overhead rail system, such as a gantry crane or the like. Alternatively, the cassette transfer device 612 and attached cassette 608 may be conveyed from the cassette loading area to the ion exchange station with a robotic arm. In yet another embodiment, the cassette transfer device 612 and attached cassette 608 may be conveyed from the cassette loading area to the ion exchange station with a conveyor and, thereafter, transferred from the conveyor to the ion exchange tank 614 with a robotic arm or an overhead crane.

Once the cassette transfer device 612 and attached cassette are at the ion exchange station, the cassette 608 and the glass containers 900 contained therein may be preheated prior to immersing the cassette 608 and the glass containers 900 in the ion exchange tank 614. The cassette 608 may be preheated to a temperature greater than room temperature and less than or equal to the temperature of the molten salt bath in the ion exchange tank. For example, the glass containers may be preheated to a temperature from about 300° C.-500° C.

The ion exchange tank 614 contains a bath of molten salt 616, such as a molten alkali salt, such as $KNO_3$, $NaNO_3$ and/or combinations thereof. In one embodiment, the bath of molten salt is 100% molten $KNO_3$ which is maintained at a temperature greater than or equal to about 350° C. and less than or equal to about 500° C. However, it should be understood that baths of molten alkali salt having various other compositions and/or temperatures may also be used to facilitate ion exchange of the glass containers.

In step 512, the glass containers 900 are ion exchange strengthened in the ion exchange tank 614. Specifically, the glass containers are immersed in the molten salt and held there for a period of time sufficient to achieve the desired compressive stress and depth of layer in the glass containers 900. For example, in one embodiment, the glass containers 900 may be held in the ion exchange tank 614 for a time period sufficient to achieve a depth of layer of up to about 100 μm with a compressive stress of at least about 300 MPa or even 350 MPa. The holding period may be less than 30 hours or even less than 20 hours. However it should be understood that the time period with which the glass containers are held in the tank 614 may vary depending on the composition of the glass container, the composition of the bath of molten salt 616, the temperature of the bath of molten salt 616, and the desired depth of layer and the desired compressive stress.

After the glass containers 900 are ion exchange strengthened, the cassette 608 and glass containers 900 are removed from the ion exchange tank 614 using the cassette transfer device 612 in conjunction with a robotic arm or overhead crane. During removal from the ion exchange tank 614, the cassette 608 and the glass containers 900 are suspended over the ion exchange tank 614 and the cassette 608 is rotated about a horizontal axis such that any molten salt remaining in the glass containers 900 is emptied back into the ion exchange tank 614. Thereafter, the cassette 608 is rotated back to its initial position and the glass containers are allowed to cool prior to being rinsed.

The cassette 608 and glass containers 900 are then transferred to a rinse station with the cassette transfer device 612. This transfer may be performed with a robotic arm or overhead crane, as described above, or alternatively, with an automatic conveyor such as a conveyor belt or the like. In a next step 514, the cassette 608 and glass containers 900 are lowered into a rinse tank 618 containing a water bath 620 to remove any excess salt from the surfaces of the glass containers 900. The cassette 608 and glass containers 900 may be lowered into the rinse tank 618 with a robotic arm, overhead crane or similar device which couples to the cassette transfer device 612. The cassette 608 and glass containers 900 are then withdrawn from the rinse tank 618, suspended over the rinse tank 618, and the cassette 608 is rotated about a horizontal axis such that any rinse water remaining in the glass containers 900 is emptied back into the rinse tank 618. In some embodiments, the rinsing operation may be performed multiple times before the cassette 608 and glass containers 900 are moved to the next processing station.

In one particular embodiment, the cassette 608 and the glass containers 900 are dipped in a water bath at least twice. For example, the cassette 608 may be dipped in a first water bath and, subsequently, a second, different water bath to ensure that all residual alkali salts are removed from the surface of the glass article. The water from the first water bath may be sent to waste water treatment or to an evaporator.

In a next step 516, the magazines 604 are removed from the cassette 608 with the cassette loader 610. Thereafter, in step 518, the glass containers 900 are unloaded from the magazine 604 with the magazine loader 602 and transferred to a washing station. In step 520, the glass containers are washed with a jet of de-ionized water 624 emitted from a nozzle 622. The jet of de-ionized water 624 may be mixed with compressed air.

Optionally, in step 521 (not depicted in FIG. 8), the glass containers 900 are transferred to an inspection station where the glass containers are inspected for flaws, debris, discoloration and the like.

In step 522, the glass containers 900 are transferred to the coating station with the magazine loader 602 where the low-friction coating is applied to the glass containers 900. In some embodiments, the application of the low-friction coating may include the application of a coupling agent directly to the surface of the glass container and a polymer chemical composition on the coupling agent, as described above. In these embodiments, the glass containers 900 are partially immersed in a first dip tank 626 which contains the coupling agent 628 to coat the exterior surface of the glass containers with the coupling agent. Alternatively, the coupling agent may be spray applied. Thereafter, the glass containers are withdrawn from the first dip tank 626 and the coupling agent is dried. In some embodiments, such as embodiments where the coupling agent comprises one or more silane chemical compositions as described above, the glass containers 900 may be conveyed to an oven where the glass containers 900 are dried at about 120° C. for 15 minutes.

While the process schematically depicted in FIG. 8 includes a step of coating the outside of the glass containers with a coupling agent, it should be understood that this step is only used for those coating compositions in which a coupling agent is needed. In other embodiments of low-friction coatings in which a coupling agent is not needed, the step of applying the coupling agent may be omitted.

Thereafter, the glass containers 900 are conveyed to the coating dip tank 630 with the magazine loader 602. The coating dip tank 630 is filled with the polymer chemical composition coating solution 632 comprising a polymer chemical composition described herein above. The glass containers are at least partially immersed in the polymer chemical composition coating solution 632 to coat the polymer chemical composition onto the glass containers, either directly onto the exterior surface of the glass containers 900 or onto the coupling agent which is already coated on the glass containers 900. Thereafter, the polymer chemical composition solution is dried to remove any solvents. In one embodiment, where the polymer chemical composition coating solution contains NOVASTRAT® 800 as described above, the coating solution may be dried by conveying the glass containers 900 to an oven and heating the glass containers at 150° C. for 20 minutes. Once the polymer chemical composition coatings solution is dried, the glass containers 900 may (optionally) be re-dipped into the polymer chemical composition coating dip tank 630 to apply one or more additional layers of polymer chemical composition. In some embodiments, the polymer chemical composition coating is applied to the entire external surface of the container, while in other embodiments the low-friction coating is only applied to a portion of the external surface of the container. While the coupling agent and polymer chemical composition are described herein, in some embodiments, as being applied in two separate steps, it should be understood that in an alternative embodiment, the coupling agent and low-friction coating are applied in a single step, such as when the coupling agent and the polymer chemical composition are combined in a mixture.

Once the polymer chemical composition coating solution 632 has been applied to the glass containers 900, the polymer chemical composition is cured on the glass containers 900. The curing process depends on the type of polymer chemical composition coating applied to the coating process and may include thermally curing the coating, curing the coating with UV light, and/or a combination thereof. In the embodiments described herein where the polymer chemical composition coating comprises a polyimide such as the polyimide formed by the NOVASTRAT® 800 polyamic acid coating solution described above, the glass containers 900 are conveyed to an oven 634 where they are heated from 150° C. to approximately 350° C. over a period of about 5 to 30 minutes. Upon removal of the glass containers from the oven, the polymer chemical composition coating is cured thereby producing a coated glass container with a low-friction coating.

After the low-friction coating has been applied to the glass container, the coated glass containers 100 are transferred to a packaging process in step 524 where the containers are filled and/or to an additional inspection station.

Various properties of the coated glass containers (i.e., coefficient of friction, horizontal compression strength, 4-point bend strength) may be measured when the coated glass containers are in an as-coated condition (i.e., following application of the coating without any additional treatments) or following one or more processing treatments, such as those similar or identical to treatments performed on a pharmaceutical filling line, including, without limitation, washing, lyophilization, depyrogenation, autoclaving, or the like.

Depyrogenation is a process wherein pyrogens are removed from a substance. Depyrogenation of glass articles, such as pharmaceutical packages, can be performed by a thermal treatment applied to a sample in which the sample is heated to an elevated temperature for a period of time. For example, depyrogenation may include heating a glass container to a temperature of between about 250° C. and about 380° C. for a time period from about 30 seconds to about 72 hours, including, without limitation, 20 minutes, 30 minutes 40 minutes, 1 hour, 2 hours, 4 hours, 8 hours, 12 hours, 24 hours, 48 hours, and 72 hours. Following the thermal treatment, the glass container is cooled to room temperature. One conventional depyrogenation condition commonly employed in the pharmaceutical industry is thermal treatment at a temperature of about 250° C. for about 30 minutes. However, it is contemplated that the time of thermal treatment may be reduced if higher temperatures are utilized. The coated glass containers, as described herein, may be exposed to elevated temperatures for a period of time. The elevated temperatures and time periods of heating described herein may or may not be sufficient to depyrogenate a glass container. However, it should be understood that some of the temperatures and times of heating described herein are sufficient to dehydrogenate a coated glass container, such as the coated glass containers described herein. For example, as described herein, the coated glass containers may be exposed to temperatures of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

As used herein, lyophilization conditions (i.e., freeze drying) refer to a process in which a sample is filled with a liquid that contains protein and then frozen at −100° C., followed by water sublimation for 20 hours at −15° C. under vacuum.

As used herein, autoclave conditions refer to steam purging a sample for 10 minutes at 100° C., followed by a 20 minute dwelling period wherein the sample is exposed to a 121° C. environment, followed by 30 minutes of heat treatment at 121° C.

The coefficient of friction ($\mu$) of the portion of the coated glass container with the low-friction coating may have a lower coefficient of friction than a surface of an uncoated glass container formed from a same glass composition. A coefficient of friction ($\mu$) is a quantitative measurement of the friction between two surfaces and is a function of the mechanical and chemical properties of the first and second surfaces, including surface roughness, as well as environmental conditions such as, but not limited to, temperature and humidity. As used herein, a coefficient of friction measurement for coated glass container 100 is reported as the coefficient of friction between the outer surface of a first glass container (having an outer diameter of between about 16.00 mm and about 17.00 mm) and the outer surface of second glass container which is identical to the first glass container, wherein the first and second glass containers have the same body and the same coating composition (when applied) and have been exposed to the same environments prior to fabrication, during fabrication, and after fabrication. Unless otherwise denoted herein, the coefficient of friction refers to the maximum coefficient of friction measured with a normal load of 30 N measured on a vial-on-vial testing jig, as described herein. However, it should be understood that a coated glass container which exhibits a maximum coefficient of friction at a specific applied load will also exhibit the same or better (i.e., lower) maximum coefficient of friction at a lesser load. For example, if a coated glass container exhibits a maximum coefficient of friction of 0.5 or lower under an applied load of 50 N, the coated glass container will also exhibit a maximum coefficient of friction of 0.5 or lower under an applied load of 25 N.

Figure 9:
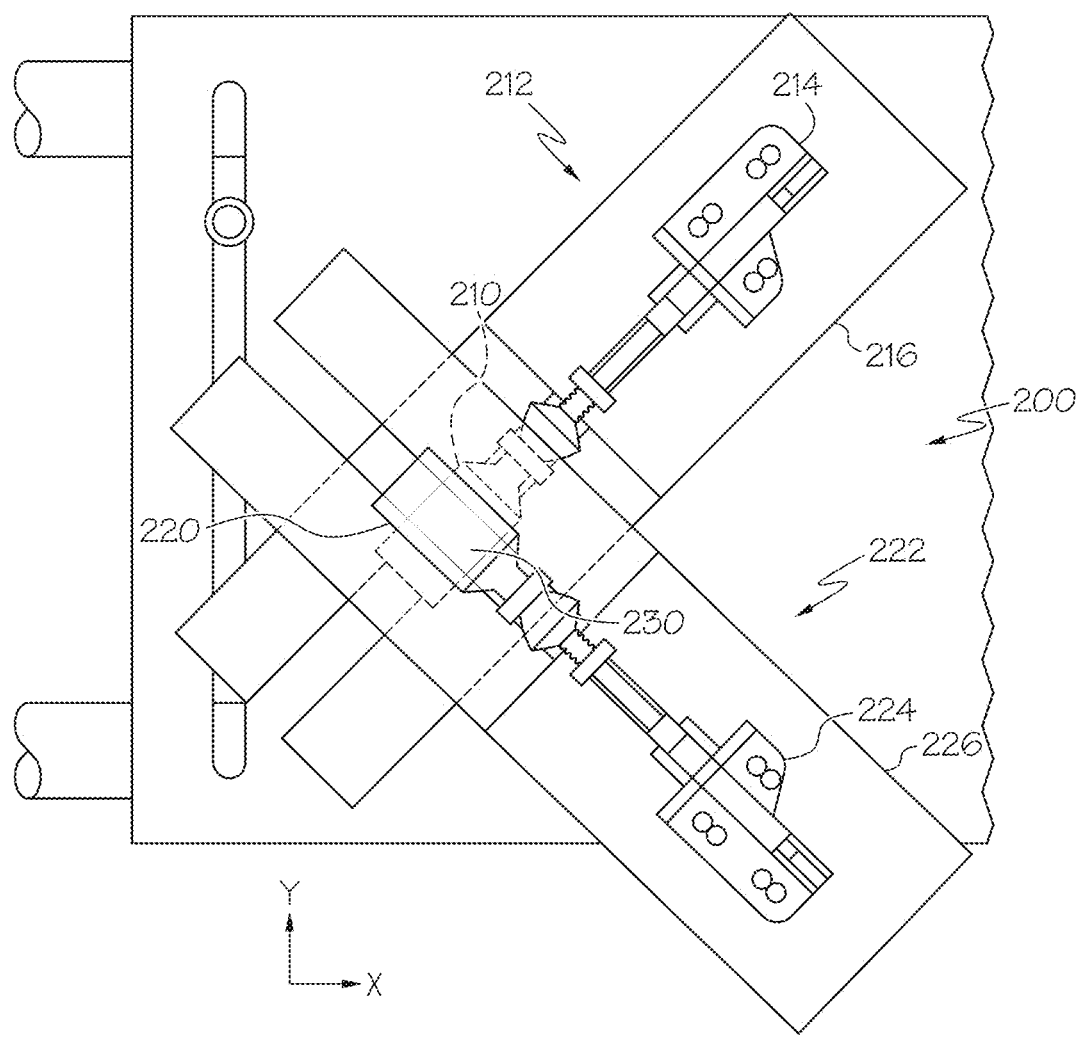
FIG. 9 schematically depicts a testing jig for determining the coefficient of friction between two surfaces, according to one or more embodiments shown and described herein.

In the embodiments described herein, the coefficient of friction of the glass containers (both coated and uncoated) is measured with a vial-on-vial testing jig. The testing jig 200 is schematically depicted in FIG. 9. The same apparatus may also be used to measure the frictive force between two glass containers positioned in the jig. The vial-on-vial testing jig 200 comprises a first clamp 212 and a second clamp 222 arranged in a cross configuration. The first clamp 212 comprises a first securing arm 214 attached to a first base 216. The first securing arm 214 attaches to the first glass container 210 and holds the first glass container 210 stationary relative to the first clamp 212. Similarly, the second clamp 222 comprises a second securing arm 224 attached to a second base 226. The second securing arm 224 attaches to the second glass container 220 and holds it stationary relative to the second clamp 222. The first glass container 210 is positioned on the first clamp 212 and the second glass container 220 is positioned of the second clamp 222 such that the long axis of the first glass container 210 and the long axis of the second glass container 220 are positioned at about a 90° angle relative to one another and on a horizontal plane defined by the x-y axis.

A first glass container 210 is positioned in contact with the second glass container 220 at a contact point 230. A normal force is applied in a direction orthogonal to the horizontal plane defined by the x-y axis. The normal force may be applied by a static weight or other force applied to the second clamp 222 upon a stationary first clamp 212. For example, a weight may be positioned on the second base 226 and the first base 216 may be placed on a stable surface, thus inducing a measurable force between the first glass container 210 and the second glass container 220 at the contact point 230. Alternatively, the force may be applied with a mechanical apparatus, such as a UMT (universal mechanical tester) machine.

The first clamp 212 or second clamp 222 may be moved relative to the other in a direction which is at a 45° angle with the long axis of the first glass container 210 and the second glass container 220. For example, the first clamp 212 may be held stationary and the second clamp 222 may be moved such that the second glass container 220 moves across the first glass container 210 in the direction of the x-axis. A similar setup is described by R. L. De Rosa et al., in "Scratch Resistant Polyimide Coatings for Alumino Silicate Glass surfaces" in The Journal of Adhesion, 78: 113-127, 2002. To measure the coefficient of friction, the force required to move the second clamp 222 and the normal force applied to first and second glass containers 210,220 are measured with load cells and the coefficient of friction is calculated as the quotient of the frictive force and the normal force. The jig is operated in an environment of 25° C. and 50% relative humidity.

In the embodiments described herein, the portion of the coated glass container with the low-friction coating has a coefficient of friction of less than or equal to about 0.7 relative to a like-coated glass container, as determined with the vial-on-vial jig described above. In other embodiments, the coefficient of friction may be less than or equal to about 0.6, or even less than or equal to about 0.5. In some embodiments, the portion of the coated glass container with the low-friction coating has a coefficient of friction of less than or equal to about 0.4 or even less than or equal to about 0.3. Coated glass containers with coefficients of friction less than or equal to about 0.7 generally exhibit improved resistance to frictive damage and, as a result, have improved mechanical properties. For example, conventional glass containers (without a low-friction coating) may have a coefficient of friction of greater than 0.7.

In some embodiments described herein, the coefficient of friction of the portion of the coated glass container with the low-friction coating is at least 20% less than a coefficient of friction of a surface of an uncoated glass container formed from a same glass composition. For example, the coefficient of friction of the portion of the coated glass container with the low-friction coating may be at least 20% less, at least 25% less, at least 30% less, at least 40% less, or even at least 50% less than a coefficient of friction of a surface of an uncoated glass container formed from a same glass composition.

In some embodiments, the portion of the coated glass container with the low-friction coating may have a coefficient of friction of less than or equal to about 0.7 after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the low-friction coating may not increase by more than about 30% after exposure to a temperature of about 260° C. for 30 minutes. In other embodiments, coefficient of friction of the portion of the coated glass container with the low-friction coating may not increase by more than about 30% (i.e., about 25%, about 20%, about 15%, or event about 10%) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, coefficient of friction of the portion of the coated glass container with the low-friction coating may not increase by more than about 0.5 (i.e., about 0.45, about 0.04, about 0.35, about 0.3, about 0.25, about 0.2, about 0.15, about 0.1, or event about 0.5) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the low-friction coating may not increase at all after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

In some embodiments, the portion of the coated glass container with the low-friction coating may have a coefficient of friction of less than or equal to about 0.7 after being submerged in a water bath at a temperature of about 70° C. for 10 minutes. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the low-friction coating may not increase by more than about 30% after being submerged in a water bath at a temperature of about 70° C. for 10 minutes. In other embodiments, coefficient of friction of the portion of the coated glass container with the low-friction coating may not increase by more than about 30% (i.e., about 25%, about 20%, about 15%, or event about 10%) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the low-friction coating may not increase at all after being submerged in a water bath at a temperature of about 70° C. for 5 minutes, 10 minutes, 20 minutes, 30 minutes, 40 minutes, 50 minutes, or even 1 hour.

In some embodiments, the portion of the coated glass container with the low-friction coating may have a coefficient of friction of less than or equal to about 0.7 after exposure to lyophilization conditions. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after exposure to lyophilization conditions. In some embodiments, the coefficient of friction of the portion of the coated glass container with the low-friction coating may not increase by more than about 30% after exposure to lyophilization conditions. In other embodiments, coefficient of friction of the portion of the coated glass container with the low-friction coating may not increase by more than about 30% (i.e., about 25%, about 20%, about 15%, or event about 10%) after exposure to lyophilization conditions. In some embodiments, the coefficient of friction of the portion of the coated glass container with the low-friction coating may not increase at all after exposure to lyophilization conditions.

In some embodiments, the portion of the coated glass container with the low-friction coating may have a coefficient of friction of less than or equal to about 0.7 after exposure to autoclave conditions. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after exposure to autoclave conditions. In some embodiments, the coefficient of friction of the portion of the coated glass container with the low-friction coating may not increase by more than about 30% after exposure to autoclave conditions. In other embodiments, coefficient of friction of the portion of the coated glass container with the low-friction coating may not increase by more than about 30% (i.e., about 25%, about 20%, about 15%, or event about 10%) after exposure to autoclave conditions. In some embodiments, the coefficient of friction of the portion of the coated glass container with the low-friction coating may not increase at all after exposure to autoclave conditions.

The coated glass containers described herein have a horizontal compression strength. Referring to FIG. 1, the horizontal compression strength, as described herein, is measured by positioning the coated glass container 100 horizontally between two parallel platens which are oriented in parallel to the long axis of the glass container. A mechanical load is then applied to the coated glass container 100 with the platens in the direction perpendicular to the long axis of the glass container. The load rate for vial compression is 0.5 in/min, meaning that the platens move towards each other at a rate of 0.5 in/min. The horizontal compression strength is measured at 25° C. and 50% relative humidity. A measurement of the horizontal compression strength can be given as a failure probability at a selected normal compression load. As used herein, failure occurs when the glass container ruptures under a horizontal compression in least 50% of samples. In some embodiments, a coated glass container may have a horizontal compression strength at least 10%, 20%, or 30% greater than an uncoated vial.

Referring now to FIGS. 1 and 9, the horizontal compression strength measurement may also be performed on an abraded glass container. Specifically, operation of the testing jig 200 may create damage on the coated glass container outer surface 122, such as a surface scratch or abrasion that weakens the strength of the coated glass container 100. The glass container is then subjected to the horizontal compression procedure described above, wherein the container is placed between two platens with the scratch pointing outward parallel to the platens. The scratch can be characterized by the selected normal pressure applied by a vial-on-vial jig and the scratch length. Unless identified otherwise, scratches for abraded glass containers for the horizontal compression procedure are characterized by a scratch length of 20 mm created by a normal load of 30 N.

The coated glass containers can be evaluated for horizontal compression strength following a heat treatment. The heat treatment may be exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the horizontal compression strength of the coated glass container is not reduced by more than about 20%, 30%, or even 40% after being exposed to a heat treatment, such as those described above, and then being abraded, as described above. In one embodiment, the horizontal compression strength of the coated glass container is not reduced by more than about 20% after being exposed to a heat treatment of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, and then being abraded.

The coated glass articles described herein may be thermally stable after heating to a temperature of at least 260° C. for a time period of 30 minutes. The phrase "thermally stable," as used herein, means that the low friction coating applied to the glass article remains substantially intact on the surface of the glass article after exposure to the elevated temperatures such that, after exposure, the mechanical properties of the coated glass article, specifically the coefficient of friction and the horizontal compression strength, are only minimally affected, if at all. This indicates that the low friction coating remains adhered to the surface of the glass following elevated temperature exposure and continues to protect the glass article from mechanical insults such as abrasions, impacts and the like.

In the embodiments described herein, a coated glass article is considered to be thermally stable if the coated glass article meets both a coefficient of friction standard and a horizontal compression strength standard after heating to the specified temperature and remaining at that temperature for the specified time. To determine if the coefficient of friction standard is met, the coefficient of friction of a first coated glass article is determined in as-received condition (i.e., prior to any thermal exposure) using the testing jig depicted in FIG. 9 and a 30 N applied load. A second coated glass article (i.e., a glass article having the same glass composition and the same coating composition as the first coated glass article) is thermally exposed under the prescribed conditions and cooled to room temperature. Thereafter, the coefficient of friction of the second glass article is determined using the testing jig depicted in FIG. 9 to abrade the coated glass article with a 30 N applied load resulting in an abraded (i.e., a "scratch") having a length of approximately 20 mm. If the coefficient of friction of the second coated glass article is less than 0.7 and the surface of the glass of the second glass article in the abraded area does not have any observable damage, then the coefficient of friction standard is met for purposes of determining the thermal stability of the low friction coating. The term "observable damage," as used herein means that the surface of the glass in the abraded area of the glass article contains less than six glass checks per 0.5 cm of length of the abraded area when observed with a Nomarski or differential interference contrast (DIC) spectroscopy microscope at a magnification of 100× with LED or halogen light sources. A standard definition of a glass check or glass checking is described in G. D. Quinn, "NIST Recommended Practice Guide: Fractography of Ceramics and Glasses," NIST special publication 960-17 (2006).

To determine if the horizontal compression strength standard is met, a first coated glass article is abraded in the testing jig depicted in FIG. 9 under a 30 N load to form a 20 mm scratch. The first coated glass article is then subjected to a horizontal compression test, as described herein, and the retained strength of the first coated glass article is determined. A second coated glass article (i.e., a glass article having the same glass composition and the same coating composition as the first coated glass article) is thermally exposed under the prescribed conditions and cooled to room temperature. Thereafter, the second coated glass article is abraded in the testing jig depicted in FIG. 9 under a 30 N load. The second coated glass article is then subjected to a horizontal compression test, as described herein, and the retained strength of the second coated glass article is determined. If the retained strength of the second coated glass article does not decrease by more than about 20% relative to the first coated glass article then the horizontal compression strength standard is met for purposes of determining the thermal stability of the low friction coating.

In the embodiments described herein, the coated glass containers are considered to be thermally stable if the coefficient of friction standard and the horizontal compression strength standard are met after exposing the coated glass containers to a temperature of at least about 260° C. for a time period of about 30 minutes (i.e., the coated glass containers are thermally stable at a temperature of at least about 260° C. for a time period of about 30 minutes). The thermal stability may also be assessed at temperatures from about 260° C. up to about 400° C. For example, in some embodiments, the coated glass containers will be considered to be thermally stable if the standards are met at a temperature of at least about 270° C. or even about 280° C. for a time period of about 30 minutes. In still other embodiments, the coated glass containers will be considered to be thermally stable if the standards are met at a temperature of at least about 290° C. or even about 300° C. for a time period of about 30 minutes. In further embodiments, the coated glass containers will be considered to be thermally stable if the standards are met at a temperature of at least about 310° C. or even about 320° C. for a time period of about 30 minutes. In still other embodiments, the coated glass containers will be considered to be thermally stable if the standards are met at a temperature of at least about 330° C. or even about 340° C. for a time period of about 30 minutes. In yet other embodiments, the coated glass containers will be considered to be thermally stable if the standards are met at a temperature of at least about 350° C. or even about 360° C. for a time period of about 30 minutes. In some other embodiments, the coated glass containers will be considered to be thermally stable if the standards are met at a temperature of at least about 370° C. or even about 380° C. for a time period of about 30 minutes. In still other embodiments, the coated glass containers will be considered to be thermally stable if the standards are met at a temperature of at least about 390° C. or even about 400° C. for a time period of about 30 minutes.

The coated glass containers disclosed herein may also be thermally stable over a range of temperatures, meaning that the coated glass containers are thermally stable by meeting the coefficient of friction standard and horizontal compression strength standard at each temperature in the range. For example, in the embodiments described herein, the coated glass containers may be thermally stable from at least about 260° C. to a temperature of less than or equal to about 400° C. In some embodiments, the coated glass containers may be thermally stable in a range from at least about 260° C. to about 350° C. In some other embodiments, the coated glass containers may be thermally stable from at least about 280° C. to a temperature of less than or equal to about 350° C. In still other embodiments, the coated glass containers may be thermally stable from at least about 290° C. to about 340° C. In another embodiment, the coated glass container may be thermally stable at a range of temperatures of about 300° C. to about 380° C. In another embodiment, the coated glass container may be thermally stable at a range of temperatures from about 320° C. to about 360° C.

The coated glass containers described herein have a four point bend strength. To measure the four point bend strength of a glass container, a glass tube that is the precursor to the coated glass container 100 is utilized for the measurement. The glass tube has a diameter that is the same as the glass container but does not include a glass container base or a glass container mouth (i.e., prior to forming the tube into a glass container). The glass tube is then subjected to a four point bend stress test to induce mechanical failure. The test is performed at 50% relative humidity with outer contact members spaced apart by 9" and inner contact members spaced apart by 3" at a loading rate of 10 mm/min.

The four point bend stress measurement may also be performed on a coated and abraded tube. Operation of the testing jig 200 may create an abrasion on the tube surface such as a surface scratch that weakens the strength of the tube, as described in the measurement of the horizontal compression strength of an abraded vial. The glass tube is then subjected to a four point bend stress test to induce mechanical failure. The test is performed at 25° C. and at 50% relative humidity using outer probes spaced apart by 9" and inner contact members spaced apart by 3" at a loading rate of 10 mm/min, while the tube is positioned such that the scratch is put under tension during the test.

In some embodiments, the four point bend strength of a glass tube with a low-friction coating after abrasion shows on average at least 10%, 20%, or even 50% higher mechanical strength than that for an uncoated glass tube abraded under the same conditions.

In some embodiments, after the coated glass container 100 is abraded by an identical glass container with a 30 N normal force, the coefficient of friction of the abraded area of the coated glass container 100 does not increase by more than about 20% following another abrasion by an identical glass container with a 30 N normal force at the same spot, or does not increase at all. In other embodiments, after the coated glass container 100 is abraded by an identical glass container with a 30 N normal force, the coefficient of friction of the abraded area of the coated glass container 100 does not increase by more than about 15% or even 10% following another abrasion by an identical glass container with a 30 N normal force at the same spot, or does not increase at all. However, it is not necessary that all embodiments of the coated glass container 100 display such properties.

Mass loss refers to a measurable property of the coated glass container 100 which relates to the amount of volatiles liberated from the coated glass container 100 when the coated glass container is exposed to a selected elevated temperature for a selected period of time. Mass loss is generally indicative of the mechanical degradation of the coating due to thermal exposure. Since the glass body of the coated glass container does not exhibit measureable mass loss at the temperatures reported, the mass loss test, as described in detail herein, yields mass loss data for only the low-friction coating that is applied to the glass container. Multiple factors may affect mass loss. For example, the amount of organic material that can be removed from the coating may affect mass loss. The breakdown of carbon backbones and side chains in a polymer will result in a theoretical 100% removal of the coating. Organometallic polymer materials typically lose their entire organic component, but the inorganic component remains behind. Thus, mass loss results are normalized based upon how much of the coating is organic and inorganic (e.g., % silica of the coating) upon complete theoretical oxidation.

To determine the mass loss, a coated sample, such as a coated glass vial, is initially heated to 150° C. and held at this temperature for 30 minutes to dry the coating, effectively driving off $H_2O$ from the coating. The sample is then heated from 150° C. to 350° C. at a ramp rate of 10° C./min in an oxidizing environment, such as air. For purposes of mass loss determination, only the data collected from 150° C. to 350° C. is considered. In some embodiments, the low-friction coating has a mass loss of less than about 5% of its mass when heated from a temperature of 150° C. to 350° C. at a ramp rate of about 10° C./minute. In other embodiments, the low-friction coating has a mass loss of less than about 3% or even less than about 2% when heated from a temperature of 150° C. to 350° C. at a ramp rate of about 10° C./minute. In some other embodiments, the low-friction coating has a mass loss of less than about 1.5% when heated from a temperature of 150° C. to 350° C. at a ramp rate of about 10° C./minute. In some other embodiments, the low-friction coating loses substantially none of its mass when heated from a temperature of 150° C. to 350° C. at a ramp rate of about 10° C./minute.

Mass loss results are based on a procedure wherein the weight of a coated glass container is compared before and after a heat treatment, such as a ramping temperature of 10°/minute from 150° C. to 350° C., as described herein. The difference in weight between the pre-heat treatment and post-heat treatment vial is the weight loss of the coating, which can be standardized as a percent weight loss of the coating such that the pre-heat treatment weight of the coating (weight not including the glass body of the container and following the preliminary heating step) is known by comparing the weight on an uncoated glass container with a pre-treatment coated glass container. Alternatively, the total mass of coating may be determined by a total organic carbon test or other like means.

Figure 10:
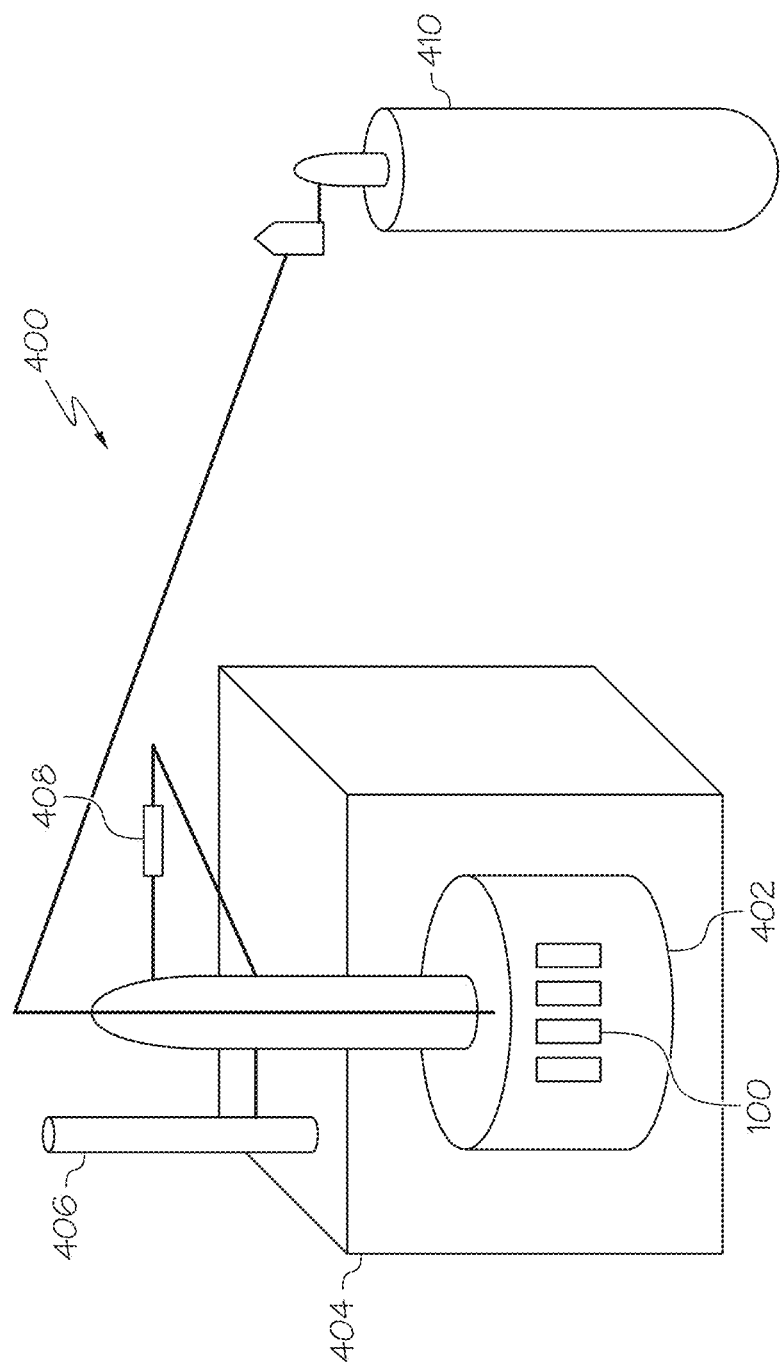
FIG. 10 schematically depicts an apparatus for testing the mass loss of a glass container, according to one or more embodiments shown and described herein.

Outgassing refers to a measurable property of the coated glass container 100 which relates to the amount of volatiles liberated from the coated glass container 100 when the coated glass container is exposed to a selected elevated temperature for a selected period of time. Outgassing measurements are reported herein as an amount by weight of volatiles liberated per the surface area of the glass container having the coating during exposure to the elevated temperature for a time period. Since the glass body of the coated glass container does not exhibit measureable outgassing at the temperatures reported for outgassing, the outgassing test, as described in detail above, yields outgassing data for substantially only the low-friction coating that is applied to the glass container. Outgassing results are based on a procedure wherein a coated glass container 100 is placed in a glass sample chamber 402 of the apparatus 400 depicted in FIG. 10. A background sample of the empty sample chamber is collected prior to each sample run. The sample chamber is held under a constant 100 ml/min air purge as measured by rotometer 406 while the furnace 404 is heated to 350° C. and held at that temperature for 1 hour to collect the chamber background sample. Thereafter, the coated glass container 100 is positioned in the sample chamber 402 and the sample chamber 402 is held under a constant 100 ml/min air purge and heated to an elevated temperature and held at temperature for a period of time to collect a sample from a coated glass container 100. The glass sample chamber is made of Pyrex, limiting the maximum temperature of the analysis to 600° C. A Carbotrap 300 adsorbent trap 408 is assembled on the exhaust port of the sample chamber to adsorb the resulting volatile species as they are released from the sample and are swept over the absorbent resin by the air purge gas 410 where the volatile species are adsorbed. The absorbent resin is then placed directly into a Gerstel Thermal Desorption unit coupled directly to a Hewlett Packard 5890 Series II gas chromatograph/Hewlett Packard 5989 MS engine. Outgassing species are thermally desorbed at 350° C. from the adsorbent resin and cryogenically focused at the head of a non-polar gas chromatographic column (DB-5MS). The temperature within the gas chromatograph is increased at a rate of 10° C./min to a final temperature of 325° C., so as to provide for the separation and purification of volatile and semi-volatile organic species. The mechanism of separation has been demonstrated to be based on the heats of vaporization of different organic species resulting in, essentially, a boiling point or distillation chromatogram. Following separation, purified species are analyzed by traditional electron impact ionization mass spectrometric protocols. By operating under standardized conditions, the resulting mass spectra may be compared with existing mass spectral libraries.

In some embodiments, the coated glass containers described herein exhibit an outgassing of less than or equal to about 54.6 ng/cm$^2$, less than or equal to about 27.3 ng/cm$^2$, or even less than or equal to about 5.5 ng/cm$^2$ during exposure to elevated temperature of about, 250° C., about 275° C., about 300° C., about 320° C., about 360° C., or even about 400° C. for time periods of about 15 minutes, about 30 minutes, about 45 minutes, or about 1 hour. Furthermore, the coated glass containers may be thermally stable in a specified range of temperatures, meaning that the coated containers exhibit a certain outgassing, as described above, at every temperature within the specified range. Prior to outgassing measurements, the coated glass containers may be in as-coated condition (i.e., immediately following application of the low-friction coating) or following any one of depyrogenation, lyophilization, or autoclaving. In some embodiments, the coated glass container 100 may exhibit substantially no outgassing.

In some embodiments, outgassing data may be used to determine mass loss of the low-friction coating. A pre-heat treatment coating mass can be determined by the thickness of the coating (determined by SEM image or other manner), the density of low-friction coating, and the surface area of the coating. Thereafter, the coated glass container can be subjected to the outgassing procedure, and mass loss can be determined by finding the ratio of the mass expelled in outgassing to the pre-heat treatment mass.

Figure 11:
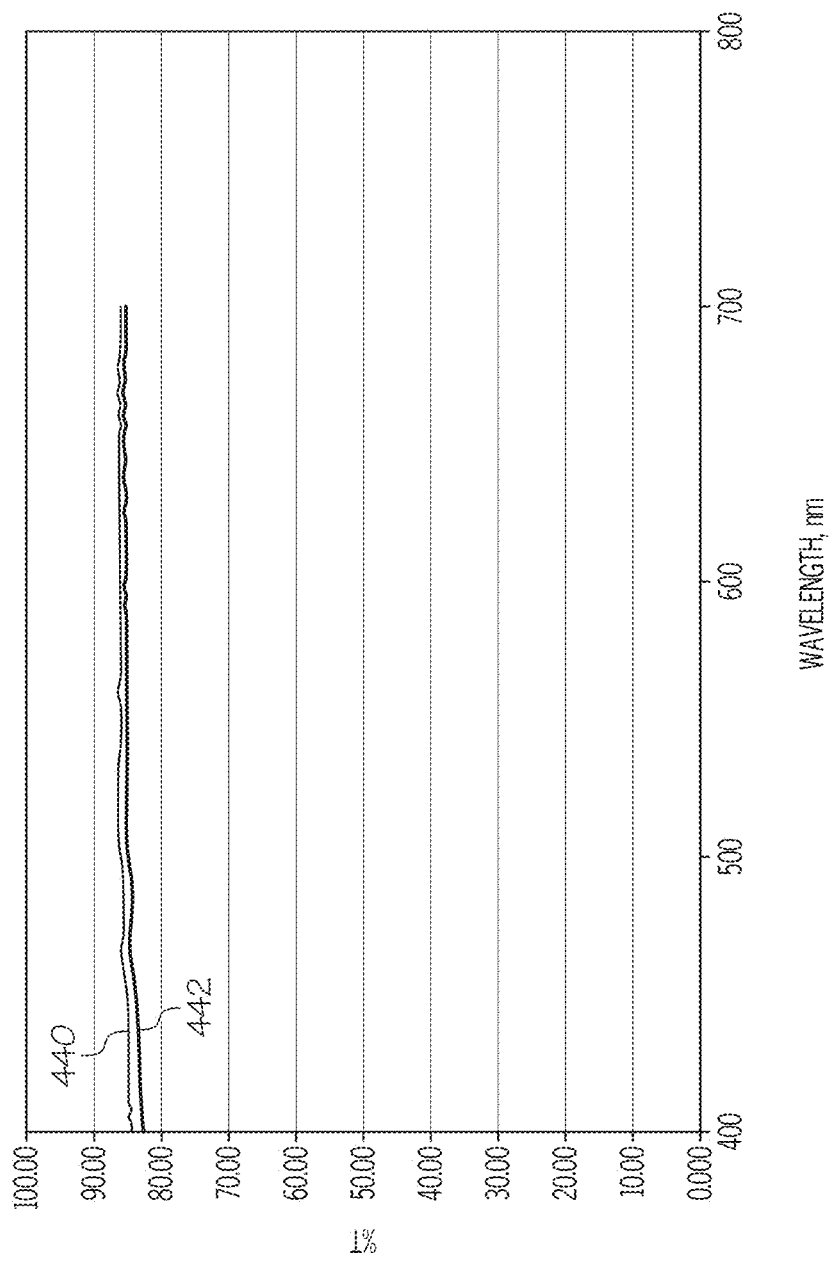
FIG. 11 graphically depicts the light transmittance data for coated and uncoated vials measured in the visible light spectrum from 400-700 nm, according to one or more embodiments shown and described herein.

Referring to FIG. 11, the transparency and color of the coated container may be assessed by measuring the light transmission of the container within a range of wavelengths between 400-700 nm using a spectrophotometer. The measurements are performed such that a light beam is directed normal to the container wall such that the beam passes through the low-friction coating twice, first when entering the container and then when exiting it. In some embodiments, the light transmission through the coated glass container may be greater than or equal to about 55% of a light transmission through an uncoated glass container for wavelengths from about 400 nm to about 700 nm. As described herein, a light transmission can be measured before a thermal treatment or after a thermal treatment, such as the heat treatments described herein. For example, for each wavelength of from about 400 nm to about 700 nm, the light transmission may be greater than or equal to about 55% of a light transmission through an uncoated glass container. In other embodiments, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

As described herein, a light transmission can be measured before an environmental treatment, such as a thermal treatment described herein, or after an environmental treatment. For example, following a heat treatment of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, or after exposure to lyophilization conditions, or after exposure to autoclave conditions, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm In some embodiments, the coated glass container 100 may be perceived as colorless and transparent to the naked human eye when viewed at any angle. In some other embodiments, the low-friction coating 120 may have a perceptible tint, such as when the low-friction coating 120 comprises a polyimide formed from poly(pyromellitic dianhydride-co-4,4'-oxydianiline) amic acid commercially available from Aldrich.

In some embodiments, the coated glass container 100 may have a low-friction coating 120 that is capable of receiving an adhesive label. That is, the coated glass container 100 may receive an adhesive label on the coated surface such that the adhesive label is securely attached. However, the ability of attachment of an adhesive label is not a requirement for all embodiments of the coated glass containers 100 described herein.

EXAMPLES

The various embodiments of glass containers with low-friction coatings will be further clarified by the following examples. The examples are illustrative in nature, and should not be understood to limit the subject matter of the present disclosure.

Example 1

Glass vials were formed from Schott Type 1B glass and the glass composition identified as "Example E" of Table 1 of U.S. patent application Ser. No. 13/660,394 filed Oct. 25, 2012 and entitled "Glass Compositions with Improved Chemical and Mechanical Durability" assigned to Corning, Incorporated (hereinafter "the Reference Glass Composition"). The vials were washed with deionized water, blown dry with nitrogen, and dip coated with a 0.1% solution of APS (aminopropylsilsesquioxane). The APS coating was dried at 100° C. in a convection oven for 15 minutes. The vials were then dipped into a 0.1% solution of NOVASTRAT® 800 polyamic acid in a 15/85 toluene/DMF solution or in a 0.1% to 1% poly(pyromellitic dianhydride-co-4,4'-oxydianiline) amic acid solution (Kapton precursor) in N-Methyl-2-pyrrolidone (NMP). The coated vials were heated to 150° C. and held for 20 minutes to evaporate the solvents. Thereafter, the coatings were cured by placing the coated vials into a preheated furnace at 300° C. for 30 minutes. After curing, the vials coated with the 0.1% solution of NOVASTRAT® 800 had no visible color. However, the vials coated with the solution of poly(pyromellitic dianhydride-co-4,4'oxydianiline) were visibly yellow in color. Both coatings exhibited a low coefficient of friction in vial-to-vial contact tests.

Example 2

Glass vials formed from Schott Type 1B glass vials (as received/uncoated) and vials coated with a low-friction coating were compared to assess the loss of mechanical strength due to abrasion. The coated vials were produced by first ion exchange strengthening glass vials produced from the Reference Glass Composition. The ion exchange strengthening was performed in a 100% $KNO_3$ bath at 450° C. for 8 hours. Thereafter, the vials were washed with deionized water, blown dry with nitrogen, and dip coated with a 0.1% solution of APS (aminopropylsilsesquioxane). The APS coating was dried at 100° C. in a convection oven for 15 minutes. The vials were then dipped into a 0.1% solution of NOVASTRAT® 800 polyamic acid in a 15/85 toluene/DMF solution. The coated vials were heated to 150° C. and held for 20 minutes to evaporate the solvents. Thereafter, the coatings were cured by placing the coated vials into a preheated furnace at 300° C. for 30 minutes. The coated vials were then soaked in 70° C. de-ionized water for 1 hour and heated in air at 320° C. for 2 hours to simulate actual processing conditions.

Figure 12:
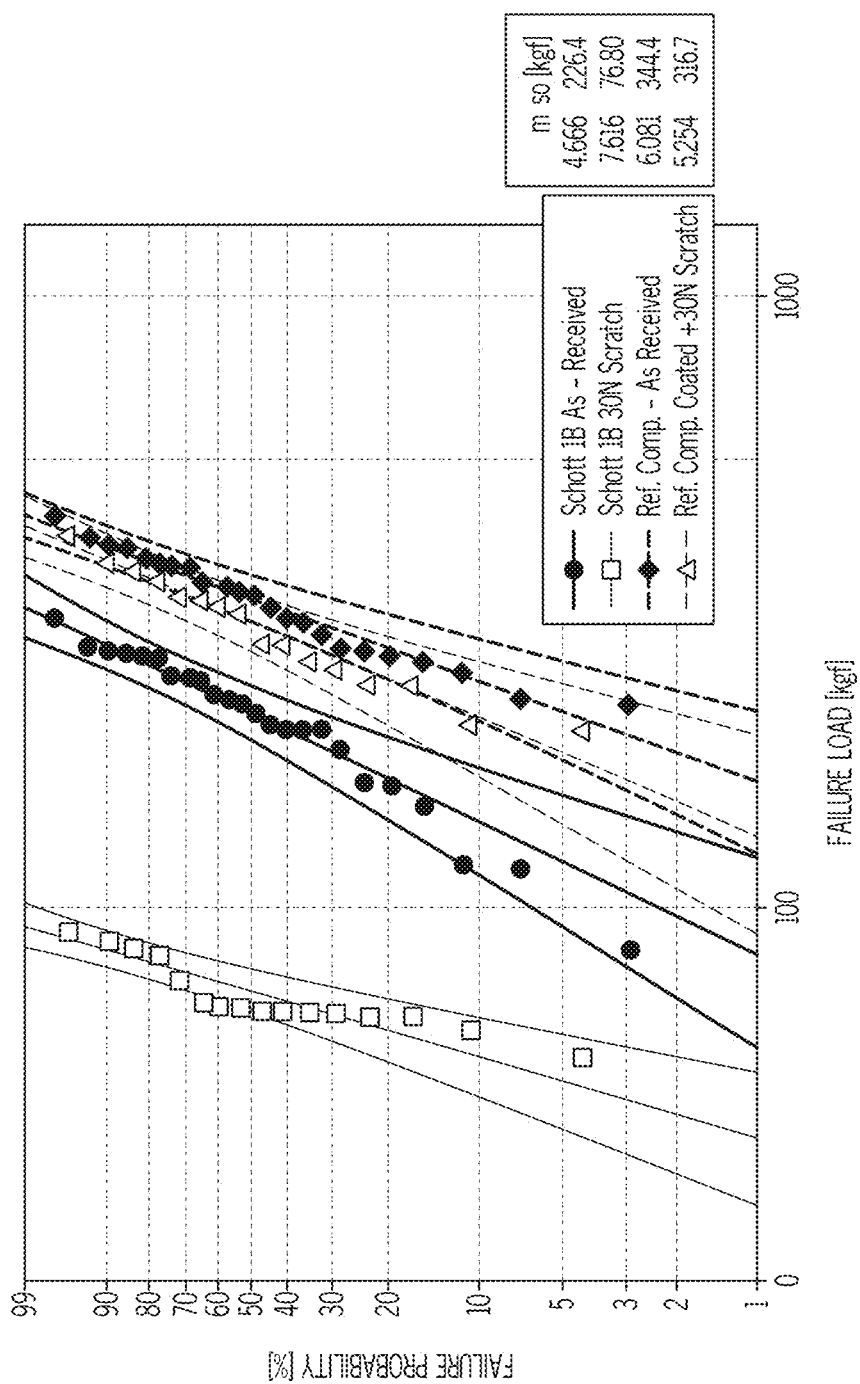
FIG. 12 graphically depicts the failure probability as a function of applied load in a horizontal compression test for vials, according to one or more embodiments shown and described herein.

Unabraded vials formed from the Schott Type 1B glass and unabraded vials formed from the ion-exchange strengthened and coated Reference Glass Composition were tested to failure in a horizontal compression test (i.e., a plate was placed over the top of the vial and a plate was placed under the bottom of the vial and the plates were pressed together and the applied load at failure was determined with a load cell). FIG. 12 graphically depicts the failure probability as a function of applied load in a horizontal compression test for vials formed from a Reference Glass Composition, vials formed from a Reference Glass Composition in a coated and abraded condition, vials formed from Schott Type 1B glass, and vials formed from Schott Type 1B glass in an abraded condition. The failure loads of the unabraded vials are graphically depicted in the Weibull plots. Sample vials formed from the Schott Type 1B glass and unabraded vials formed from the ion-exchange strengthened and coated glass were then placed in the vial-on-vial jig of FIG. 9 to abrade the vials and determine the coefficient of friction between the vials as they were rubbed together over a contact area having a 0.3 mm diameter. The load on the vials during the test was applied with a UMT machine and was varied between 24 N and 44 N. The applied loads and the corresponding maximum coefficient of friction are reported in the Table contained in FIG. 13. For the uncoated vials, the maximum coefficient of friction varied from 0.54 to 0.71 (shown in FIG. 13 as vial samples "3&4" and "7&8", respectively) and while for the coated vials the maximum coefficient of friction varied from 0.19 to 0.41 (shown in FIG. 13 as vial samples "15&16" and "12&14", respectively). Thereafter, the scratched vials were tested in the horizontal compression test to assess the loss of mechanical strength relative to the unabraded vials. The failure loads applied to the unabraded vials are graphically depicted in the Weibull plots of FIG. 12.

As shown in FIG. 12, the uncoated vials had a significant decrease in strength after abrasion whereas the coated vials had a relatively minor decrease in strength after abrasion. Based on these results, it is believed that the coefficient of friction between the vials should be less than 0.7 or 0.5, or even less than 0.45 in order to mitigate the loss of strength following vial-on-vial abrasion.

Example 3

In this example, multiple sets of glass tubes were tested in four point bending to assess their respective strengths. A first set of tubes formed from the Reference Glass Composition was tested in four point bending in as received condition (un-coated, non-ion exchange strengthened). A second set of tubes formed from the Reference Glass Composition was tested in four point bending after being ion exchange strengthened in a 100% $KNO_3$ bath at 450° C. for 8 hours. A third set of tubes formed from the Reference Glass Composition was tested in four point bending after being ion exchange strengthened in a 100% $KNO_3$ bath at 450° C. for 8 hours and coated with 0.1% APS/0.1% NOVASTRAT® 800 as described in Example 2. The coated tubes were also soaked in 70° C. de-ionized water for 1 hour and heated in air at 320° C. for 2 hours to simulate actual processing conditions. These coated tubes were also abraded in the vial-on-vial jig shown in FIG. 9 under a 30 N load prior to bend testing. A fourth set of tubes formed from the Reference Glass Composition was tested in four point bending after being ion exchange strengthened in a 100% $KNO_3$ bath at 450° C. for 1 hour. These uncoated, ion exchange strengthened tubes were also abraded in the vial-on-vial jig shown in FIG. 9 under a 30 N load prior to bend testing. A fifth set of tubes formed from Schott Type 1B glass was tested in four point bending in as received condition (un-coated, non-ion exchange strengthened). A sixth set of tubes formed from Schott Type 1B glass was tested in four point bending after being ion exchange strengthened in a 100% $KNO_3$ bath at 450° C. for 1 hour. The results of testing are graphically depicted in the Weibull plots displayed in FIG. 14.

Figure 14:
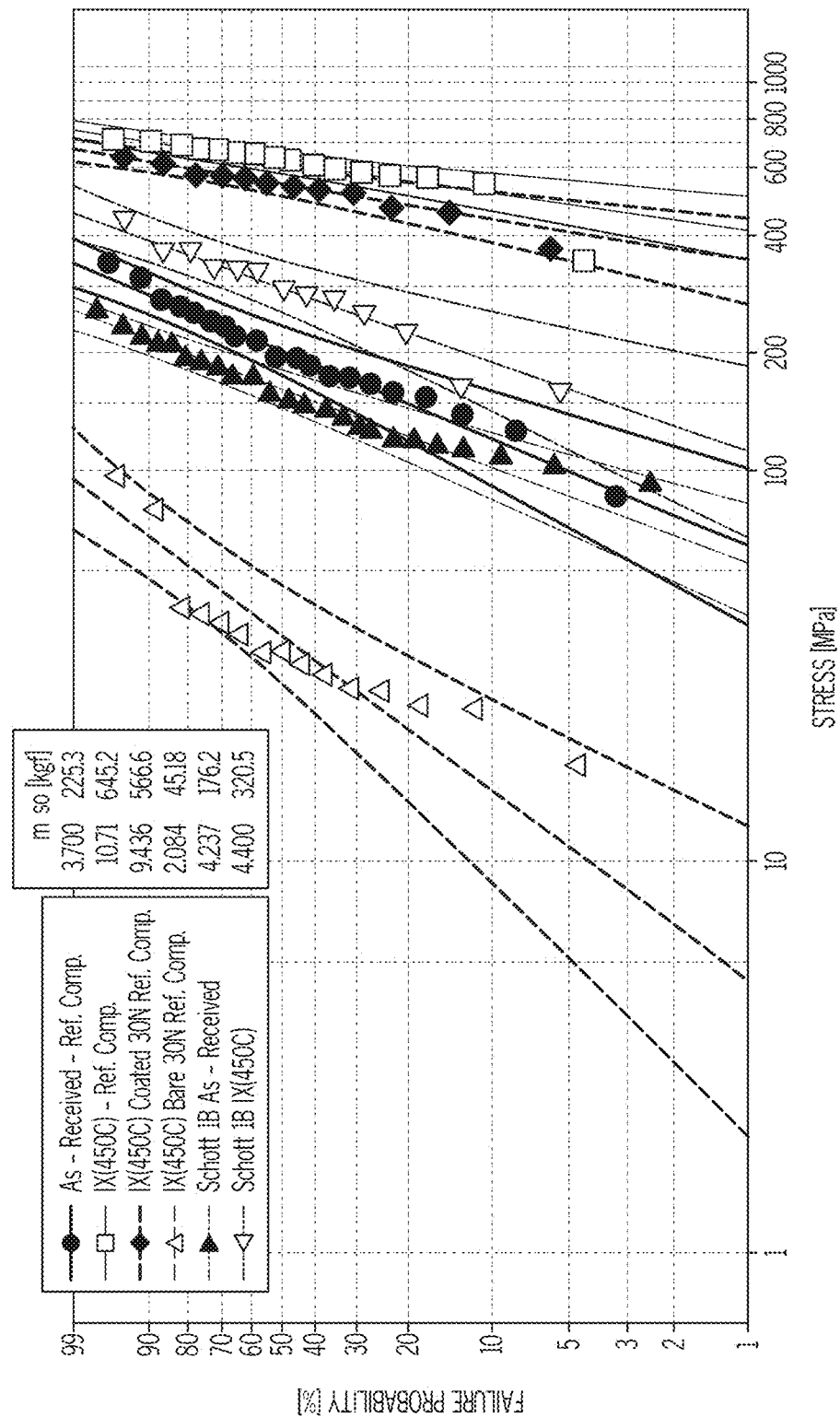
FIG. 14 graphically depicts the failure probability as a function of applied stress in four point bending for tubes formed from a Reference Glass Composition in as received condition, in ion exchanged condition (uncoated), in ion exchanged condition (coated and abraded), in ion exchanged condition (uncoated and abraded) and for tubes formed from Schott Type 1B glass in as received condition and in ion exchanged condition, according to one or more embodiments shown and described herein.

Referring to FIG. 14, the second set of tubes which were non-abraded and formed from the Reference Glass Composition and ion exchange strengthened withstood the highest stress before breaking. The third set of tubes which were coated with the 0.1% APS/0.1% NOVASTRAT® 800 prior to abrading showed a slight reduction in strength relative to their uncoated, non-abraded equivalents (i.e., the second set of tubes). However, the reduction in strength was relatively minor despite being subjected to abrading after coating.

Example 4

Two sets of vials were prepared and run through a pharmaceutical filling line. A pressure sensitive tape (commercially available from FujiFilm) was inserted in between the vials to measure contact/impact forces between the vials and between the vials and the equipment. The first set of vials was formed from the Reference Glass Composition and was not coated. The second set of vials was formed from the Reference Glass Composition and was coated with a low-friction polyimide based coating having a coefficient of friction of about 0.25, as described above. The pressure sensitive tapes were analyzed after the vials were run through the pharmaceutical filling line and demonstrated that the coated vials of the second set exhibited a 2-3 times reduction in stress compared to the un-coated vials of the first set.

Example 5

Figure 15:
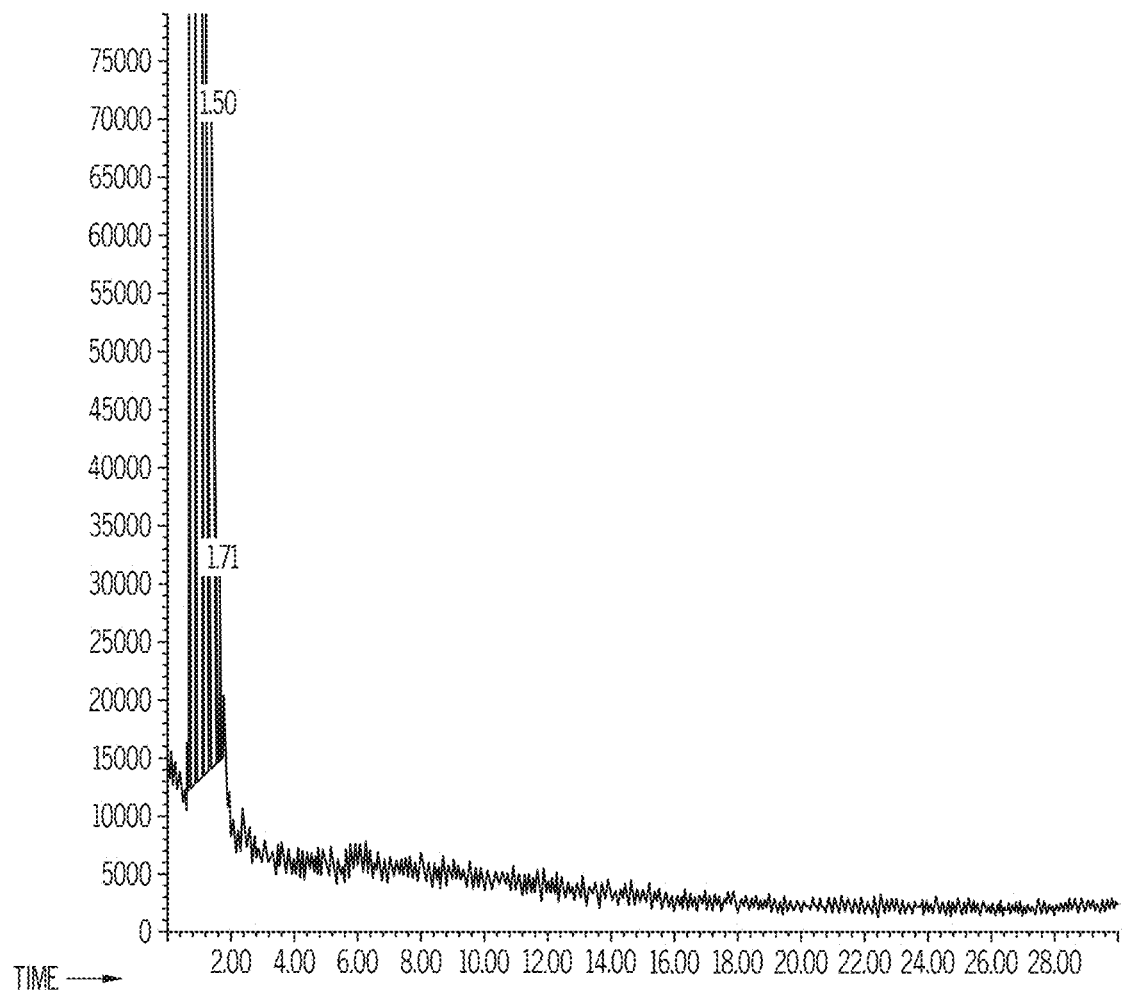
FIG. 15 depicts gas chromatograph-mass spectrometer output data for a APS/NOVASTRAT® 800 coating, according to one or more embodiments shown and described herein.
Figure 16:
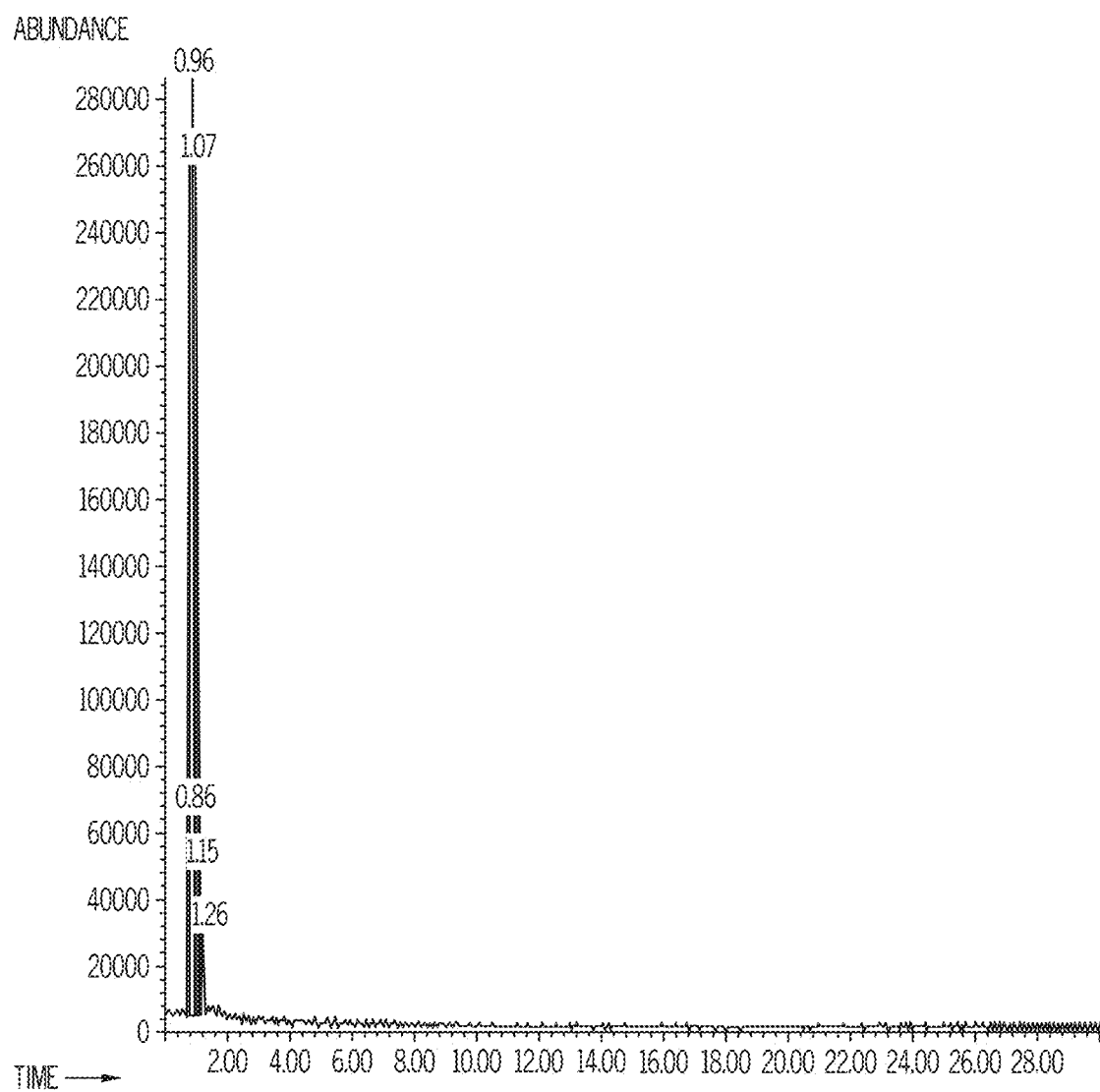
FIG. 16 depicts gas chromatography-mass spectrometer output data for a DC806A coating, according to one or more embodiments shown and described herein.

Three sets of four vials each were prepared. All the vials were formed from the Reference Glass Composition. The first set of vials was coated with the APS/NOVASTRAT® 800 coating as described in Example 2. The second set of vials was dip coated with 0.1% DC806A in toluene. The solvent was evaporated at 50° C. and the coating was cured at 300° C. for 30 min. Each set of vials was placed in a tube and heated to 320° C. for 2.5 hours under an air purge to remove trace contaminants adsorbed into the vials in the lab environment. Each set of samples was then heated in the tube for another 30 minutes and the outgassed volatiles were captured on an activated carbon sorbent trap. The trap was heated to 350° C. over 30 minutes to desorb any captured material which was fed into a gas chromatograph-mass spectrometer. FIG. 15 depicts gas chromatograph-mass spectrometer output data for the APS/NOVASTRAT® 800 coating. FIG. 16 depicts gas chromatography-mass spectrometer output data for the DC806A coating. No outgassing was detected from the 0.1% APS/0.1% NOVASTRAT® 800 coating or the DC806A coating.

A set of four vials was coated with a tie-layer using 0.5%/0.5% GAPS/APhTMS solution in methanol/water mixture. Each vial had a coated surface area of about 18.3 cm². Solvent was allowed to evaporate at 120° C. for 15 min from the coated vials. Then a 0.5% NOVASTRAT® 800 solutions in dimethylacetamide was applied onto the samples. The solvent was evaporated at 150° C. for 20 min. These uncured vials were subjected to an outgassing test described above. The vials were heated to 320° C. in a stream of air (100 mL/min) and upon reaching 320° C. the outgassed volatiles were captured on an activated carbon sorbent traps every 15 min. The traps then were heated to 350° C. over 30 minutes to desorb any captured material which was fed into a gas chromatograph-mass spectrometer. Table 1 shows the amount of captured materials over the segments of time that the samples were held at 320° C. Time zero corresponds with the time that the sample first reached a temperature of 320° C. As seen in Table 1, after 30 min of heating the amount of volatiles decreases below the instrument detection limit of 100 ng. Table 1 also reports the volatiles lost per square cm of coated surface.

TABLE 1

| Volatiles per vial and per area. | | |
|---|---|---|
| Time Period at 320° C. | Amount, ng/vial | Amount ng/cm² |
| 25° C. to 320° C. ramp (t = 0) | 60404 | 3301 |
| t = 0 to 15 min | 9371 | 512 |
| t = 15 to 30 min | 321 | 18 |
| t = 30 to 45 min | <100 | <5 |
| t = 45 to 60 min | <100 | <5 |
| t = 60 to 90 min | <100 | <5 |

Example 6

A plurality of vials was prepared with various coatings based on silicon resin or polyimides with and without coupling agents. When coupling agents were used, the coupling agents included APS and GAPS (3-aminopropyl-trialkoxysilane), which is a precursor for APS. The outer coating layer was prepared from NOVASTRAT® 800, the poly(pyromellitic dianhydride-co-4,4'oxydianiline) described above, or silicone resins such as DC806A and DC255. The APS/Kapton coatings were prepared using a 0.1% solution of APS (aminopropylsilsesquioxane) and 0.1% solution, 0.5% solution or 1.0% solutions of poly (pyromellitic dianhydride-co-4,4'-oxydianiline) amic acid (Kapton precursor) in N-methyl-2-pyrrolidone (NMP). Kapton coatings were also applied without a coupling agent using a 1.0% solution of the poly(pyromellitic dianhydride-co-4,4'oxydianiline) in NMP. The APS/NOVASTRAT® 800 coatings were prepared using a 0.1% solution of APS (aminopropylsilsesquioxane) and a 0.1% solution of NOVASTRAT® 800 polyamic acid in a 15/85 toluene/DMF solution. The DC255 coatings were applied directly to the glass without a coupling agent using a 1.0% solution of DC255 in Toluene. The APS/DC806A coatings were prepared by first applying a 0.1% solution of APS in water and then a 0.1% solution or a 0.5% solution of DC806A in toluene. The GAPS/DC806A coatings were applied using a 1.0% solution of GAPS in 95 wt. % ethanol in water as a coupling agent and then a 1.0% solution of DC806A in toluene. The coupling agents and coatings were applied using dip coating methods as described herein with the coupling agents being heat treated after application and the silicon resin and polyimide coatings being dried and cured after application. The coating thicknesses were estimated based on the concentrations of the solutions used. The Table contained in FIG. 17 lists the various coating compositions, estimated coating thicknesses and testing conditions.

Thereafter, some of the vials were tumbled to simulate coating damage and others were subjected to abrasion under 30 N and 50 N loads in the vial-on-vial jig depicted in FIG. 9. Thereafter, all the vials were subjected to a lyophilization (freeze drying process) in which the vials were filled with 0.5 mL of sodium chloride solution and then frozen at −100° C. Lyophilization was then performed for 20 hours at −15° C. under vacuum. The vials were inspected with optical quality assurance equipment and under microscope. No damage to the coatings was observed due to lyophilization.

Example 7

Figure 18:
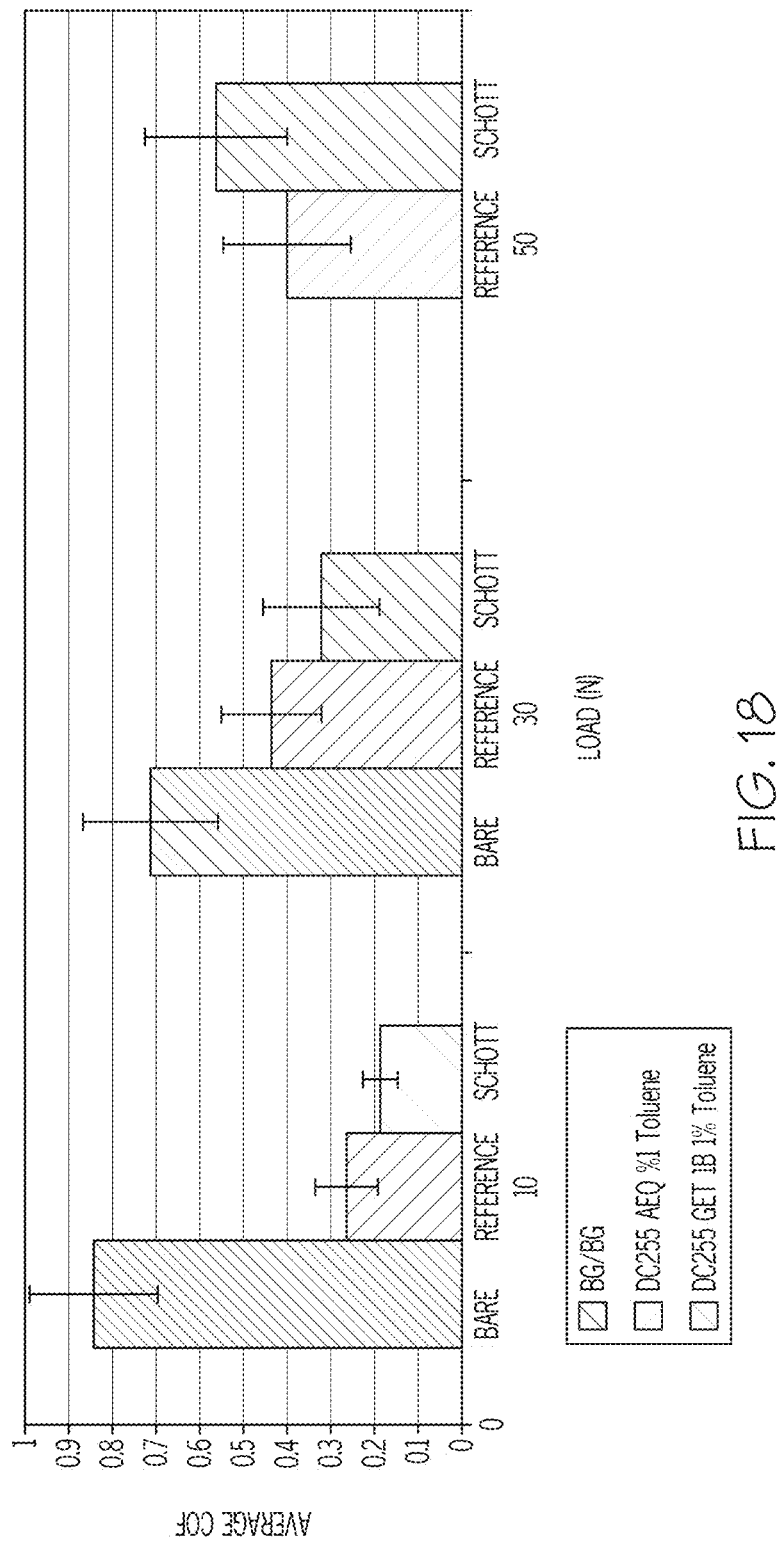
FIG. 18 contains a chart reporting the coefficient of friction for bare glass vials and vials having a silicone resin coating tested in a vial-on-vial jig, according to one or more embodiments shown and described herein.

Three sets of six vials were prepared to assess the effect of increasing load on the coefficient of friction for uncoated vials and vials coated with Dow Corning DC 255 silicone resin. A first set of vials was formed from Type 1B glass and left uncoated. The second set of vials was formed from the Reference Glass Composition and coated with a 1% solution of DC255 in Toluene and cured at 300° C. for 30 min. The third set of vials was formed from Schott Type 1B glass and coated with a 1% solution of DC255 in Toluene. The vials of each set were placed in the vial-on-vial jig depicted in FIG. 9 and the coefficient of friction relative to a similarly coated vial was measured during abrasion under static loads of 10 N, 30 N, and 50 N. The results are graphically reported in FIG. 18. As shown in FIG. 18, coated vials showed appreciably lower coefficients of friction compared to uncoated vials when abraded under the same conditions irrespective of the glass composition.

Example 8

Three sets of two glass vials were prepared with an APS/Kapton coating. First, each of the vials was dip coated in a 0.1% solution of APS (aminopropylsilsesquioxane). The APS coating was dried at 100° C. in a convection oven for 15 minutes. The vials were then dipped into a 0.1% poly (pyromellitic dianhydride-co-4,4'-oxydianiline) amic acid solution (Kapton precursor) in N-methyl-2-pyrrolidone (NMP). Thereafter, the coatings were cured by placing the coated vials into a preheated furnace at 300° C. for 30 minutes.

Figure 19:
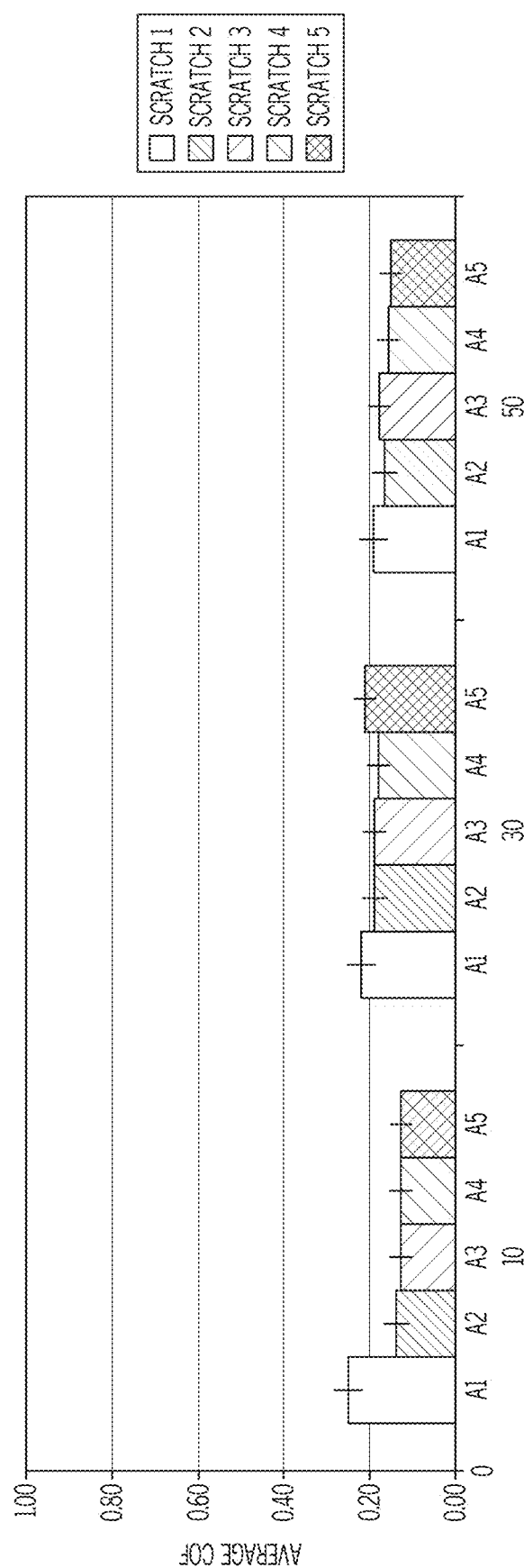
FIG. 19 contains a chart reporting the coefficient of friction for vials coated with an APS/Kapton polyimide coating and abraded multiple times under different applied loads in a vial-on-vial jig, according to one or more embodiments shown and described herein.

Two vials were placed in the vial-on-vial jig depicted in FIG. 9 and abraded under a 10 N loaded. The abrasion procedure was repeated 4 more times over the same area and the coefficient of friction was determined for each abrasion. The vials were wiped between abrasions and the starting point of each abrasion was positioned on a previously non-abraded area. However, each abrasion traveled over the same "track". The same procedure was repeated for loads of 30 N and 50 N. The coefficients of friction of each abrasion (i.e., A1-A5) are graphically depicted in FIG. 19 for each load. As shown in FIG. 19, the coefficient of friction of the APS/Kapton coated vials was generally less than 0.30 for all abrasions at all loads. The examples demonstrate improved resistance to abrasion for polyimide coating when applied over a glass surface treated with a coupling agent.

Example 9

Figure 20:
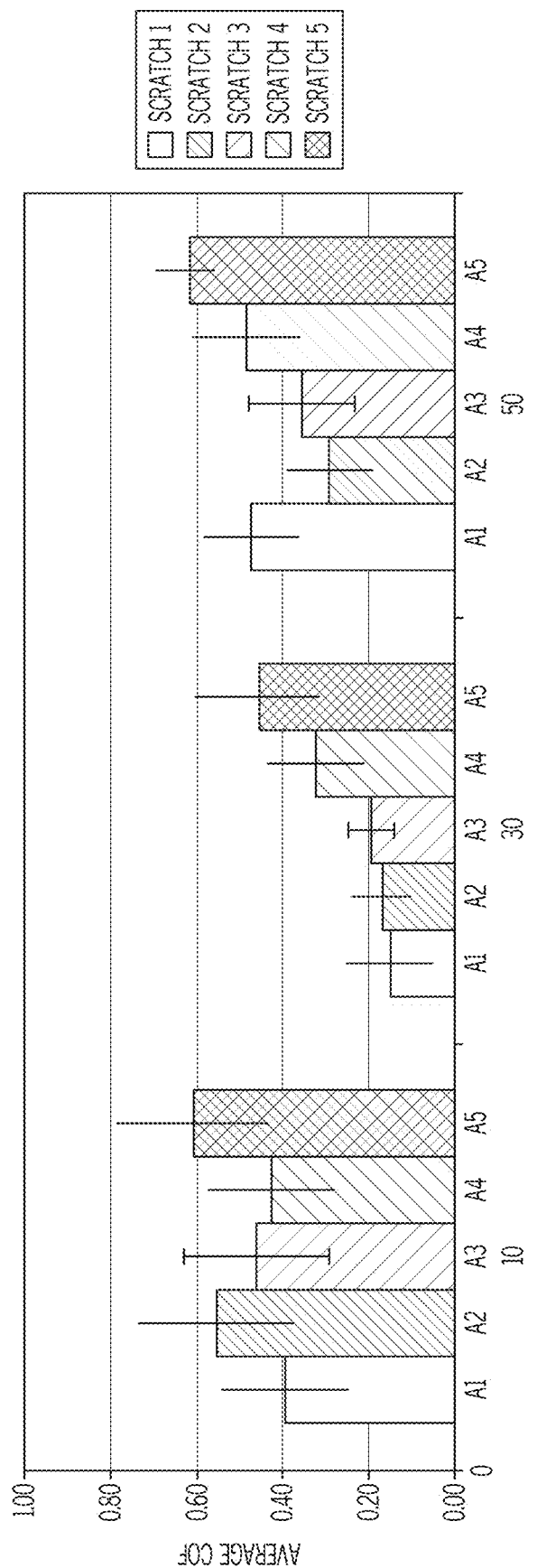
FIG. 20 contains a chart reporting the coefficient of friction for vials coated with an APS coating and abraded multiple times under different applied loads in a vial-on-vial jig, according to one or more embodiments shown and described herein.

Three sets of two glass vials were prepared with an APS coating. Each of the vials were dip coated in a 0.1% solution of APS (aminopropylsilsesquioxane) and heated at 100° C. in a convection oven for 15 minutes. Two vials were placed in the vial-on-vial jig depicted in FIG. 9 and abraded under a 10 N load. The abrasion procedure was repeated 4 more times over the same area and the coefficient of friction was determined for each abrasion. The vials were wiped between abrasions and the starting point of each abrasion was positioned on a previously non-abraded area. However, each abrasion traveled over the same "track". The same procedure was repeated for loads of 30 N and 50 N. The coefficients of friction of each abrasion (i.e., A1-A5) are graphically depicted in FIG. 20 for each load. As shown in FIG. 20, the coefficient of friction of the APS only coated vials is generally higher than 0.3 and often reached 0.6 or even higher.

Example 10

Three sets of two glass vials were prepared with an APS/Kapton coating. Each of the vials was dip coated in a 0.1% solution of APS (aminopropylsilsesquioxane). The APS coating was heated at 100° C. in a convection oven for 15 minutes. The vials were then dipped into a 0.1% poly (pyromellitic dianhydride-co-4,4'-oxydianiline) amic acid solution (Kapton precursor) in N-methyl-2-pyrrolidone (NMP). Thereafter, the coatings were cured by placing the coated vials in into a preheated furnace at 300° C. for 30 minutes. The coated vials were then depyrogenated (heated) at 300° C. for 12 hours.

Figure 21:
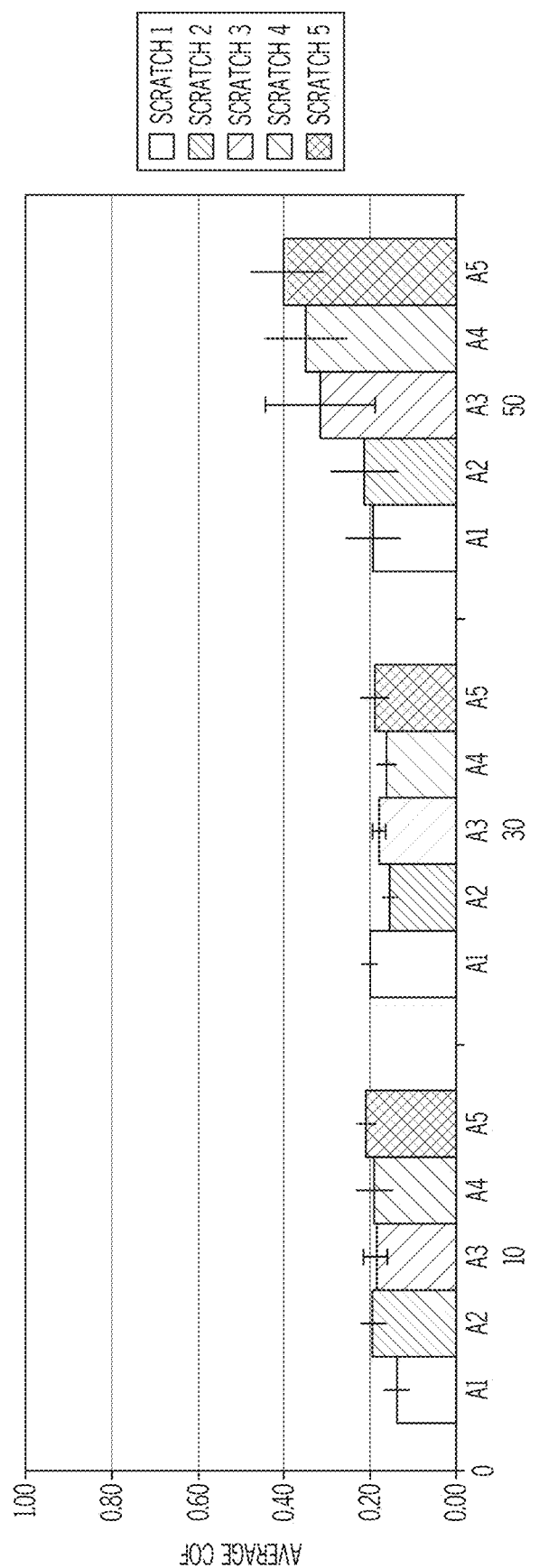
FIG. 21 contains a chart reporting the coefficient of friction for vials coated with an APS/Kapton polyimide coating and abraded multiple times under different applied loads in a vial-on-vial jig after the vials were exposed to 300° C. for 12 hours, according to one or more embodiments shown and described herein.

Two vials were placed in the vial-on-vial jig depicted in FIG. 9 and abraded under a 10 N load. The abrasion procedure was repeated 4 more times over the same area and the coefficient of friction was determined for each abrasion. The vials were wiped between abrasions and the starting point of each abrasion was positioned on a previously abraded area and each abrasion was performed over the same "track". The same procedure was repeated for loads of 30 N and 50 N. The coefficients of friction of each abrasion (i.e., A1-A5) are graphically depicted in FIG. 21 for each load. As shown in FIG. 21, the coefficients of friction of the APS/Kapton coated vials were generally uniform and approximately 0.20 or less for the abrasions introduced at loads of 10 N and 30 N. However, when the applied load was increased to 50 N, the coefficient of friction increased for each successive abrasion, with the fifth abrasion having a coefficient of friction slightly less than 0.40.

Example 11

Figure 22:
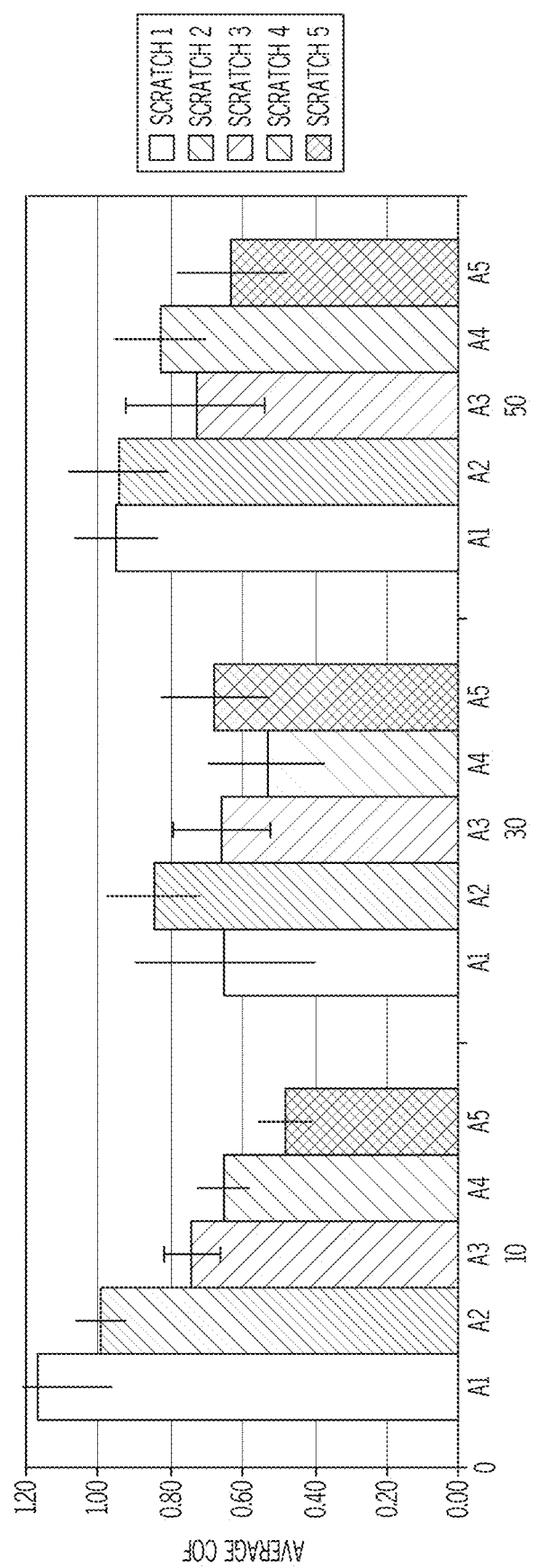
FIG. 22 contains a chart reporting the coefficient of friction for vials coated with an APS coating and abraded multiple times under different applied loads in a vial-on-vial jig after the vials were exposed to 300° C. for 12 hours, according to one or more embodiments shown and described herein.

Three sets of two glass vials were prepared with an APS (aminopropylsilsesquioxane) coating. Each of the vials was dip coated in a 0.1% solution of APS and heated at 100° C. in a convection oven for 15 minutes. The coated vials were then depyrogenated (heated) at 300° C. for 12 hours. Two vials were placed in the vial-on-vial jig depicted in FIG. 9 and abraded under a 10 N loaded. The abrasion procedure was repeated 4 more times over the same area and the coefficient of friction was determined for each abrasion. The vials were wiped between abrasions and the starting point of each abrasion was positioned on a previously abraded area and each abrasion traveled over the same "track". The same procedure was repeated for loads of 30 N and 50 N. The coefficients of friction of each abrasion (i.e., A1-A5) are graphically depicted in FIG. 22 for each load. As shown in FIG. 22, the coefficients of friction of the APS coated vials depyrogenated for 12 hours were significantly higher than the APS coated vials shown in FIG. 20 and were similar to coefficients of friction exhibited by uncoated glass vials, indicating that the vials may have experienced a significant loss of mechanical strength due to the abrasions.

Example 12

Three sets of two glass vials formed from Schott Type 1B glass were prepared with a Kapton coating. The vials were dipped into a 0.1% poly(pyromellitic dianhydride-co-4,4'-oxydianiline) amic acid solution (Kapton precursor) in N-Methyl-2-pyrrolidone (NMP). Thereafter, the coatings were dried at 150° C. for 20 min and then cured by placing the coated vials in into a preheated furnace at 300° C. for 30 minutes.

Figure 23:
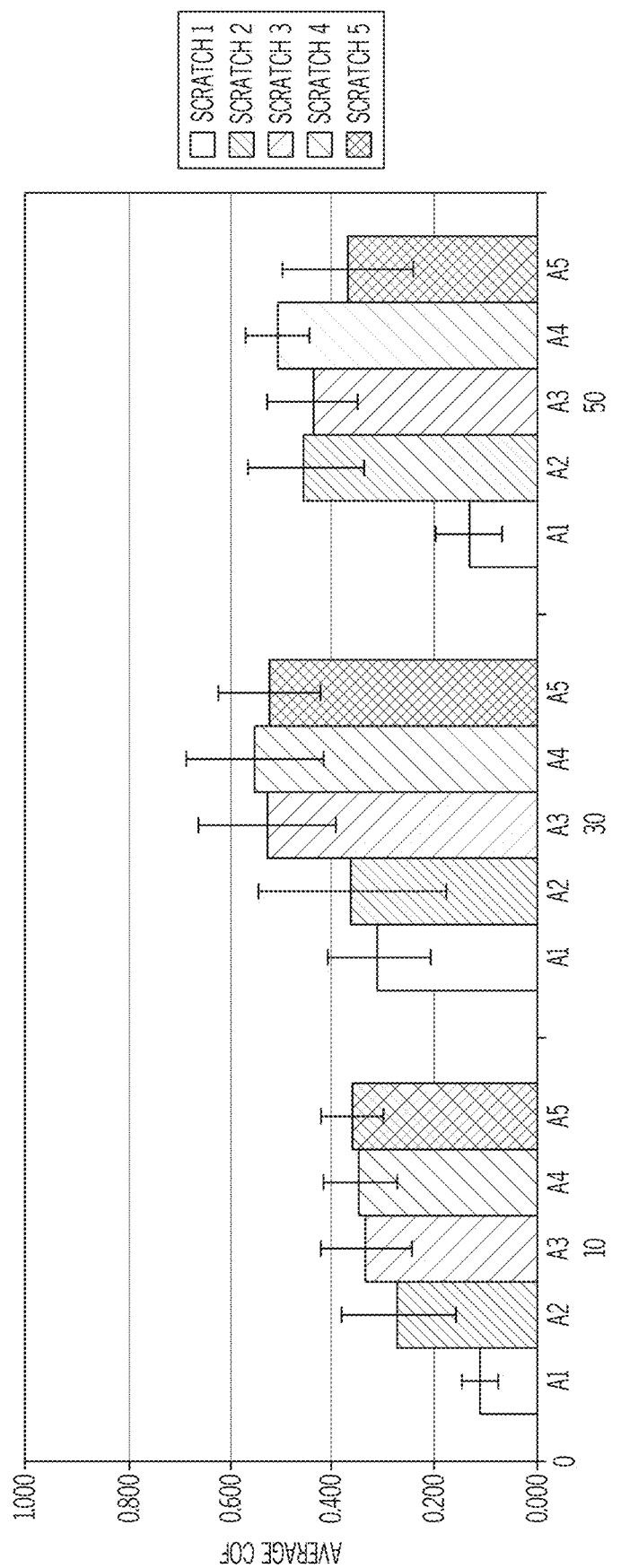
FIG. 23 contains a chart reporting the coefficient of friction for Schott Type 1B vials coated with a Kapton polyimide coating and abraded multiple times under different applied loads in a vial-on-vial jig, according to one or more embodiments shown and described herein.

Two vials were placed in the vial-on-vial jig depicted in FIG. 9 and abraded under a 10 N loaded. The abrasion procedure was repeated 4 more times over the same area and the coefficient of friction was determined for each abrasion. The vials were wiped between abrasions and the starting point of each abrasion was positioned on a previously non-abraded area. However, each abrasion traveled over the same "track". The same procedure was repeated for loads of 30 N and 50 N. The coefficients of friction of each abrasion (i.e., A1-A5) are graphically depicted in FIG. 23 for each load. As shown in FIG. 23, the coefficients of friction of the Kapton coated vials generally increased after the first abrasion demonstrating poor abrasion resistance of a polyimide coating applied onto a glass without a coupling agent.

Example 13

The APS/NOVASTRAT® 800 coated vials of Example 6 were tested for their coefficient of friction after lyophilization using a vial-on-vial jig shown in FIG. 9 with a 30 N load. No increase in coefficient of friction was detected after lyophilization. FIG. 24 contains Tables showing the coefficient of friction for the APS/NOVASTRAT® 800 coated vials before and after lyophilization.

Example 14

The Reference Glass Composition vials were ion exchanged and coated as described in Example 2. The coated vials were autoclaved using the following protocol: 10 minute steam purge at 100° C., followed by a 20 minute dwelling period wherein the coated glass container 100 is exposed to a 121° C. environment, followed by 30 minutes of treatment at 121° C. The coefficient of friction for autoclaved and non-autoclaved vials was measured using a vial-on-vial jig shown in FIG. 9 with 30 N load. FIG. 26 shows the coefficient of friction for APS/NOVASTRAT® 800 coated vials before and after autoclaving. No increase in coefficient of friction was detected after autoclaving.

Example 15

Figure 27:
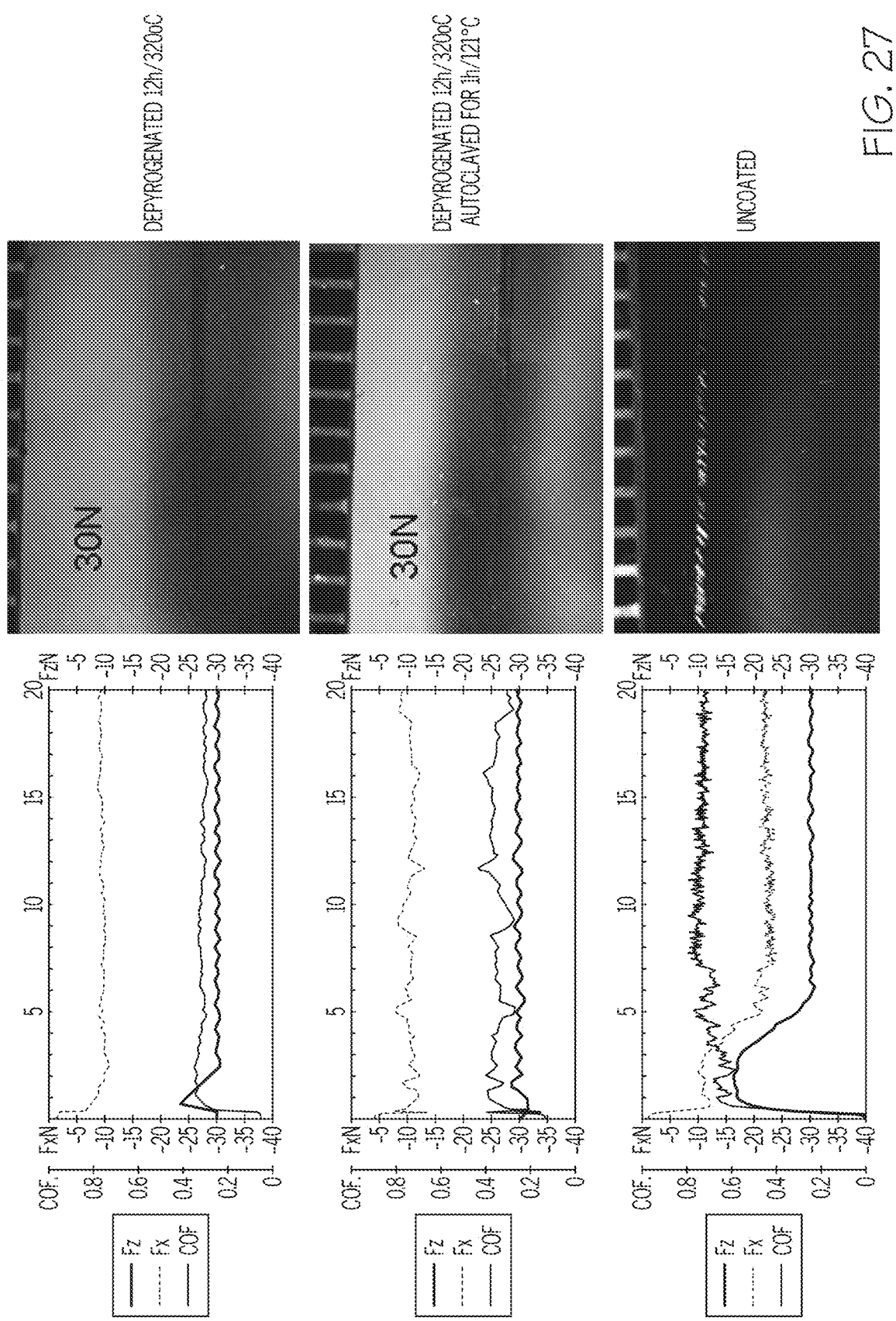
FIG. 27 graphically depicts the coefficient of friction for coated glass containers exposed to different temperature conditions and for an uncoated glass container.

Three sets of vials were prepared to assess the efficacy of coatings on mitigating damage to the vials. A first set of vials was coated with a polyimide outer coating later with an intermediate coupling agent layer. The outer layer consisted of the NOVASTRAT® 800 polyimide, which was applied as a solution of polyamic acid in dimethylacetamide and imidized by heating to 300° C. The coupling agent layer consisted of the APS and aminophenyltrimethoxysilane (APhTMS) in a 1:8 ratio. These vials were depyrogenated for 12 hours at 320° C. As with the first set of vials, the second set of vials was coated with a polyimide outer coating layer with an intermediate coupling agent layer. The second set of vials was depyrogenated for 12 hours at 320° C. and then autoclaved for 1 hour at 121° C. A third set of vials was left uncoated. Each set of vials was then subjected to a vial-on-vial frictive test under a 30 N load. The coefficient of friction for each set of vials is reported in FIG. 27. Photographs of the vial surface showing damage (or the lack of damage) experienced by each vial is also depicted in FIG. 27. As shown in FIG. 27, the uncoated vials generally had a coefficient of friction greater than about 0.7. The uncoated vials also incurred visually perceptible damage as a result of the testing. However, the coated vials had a coefficient of friction of less than 0.45 without any visually perceptible surface damage.

Figure 25:
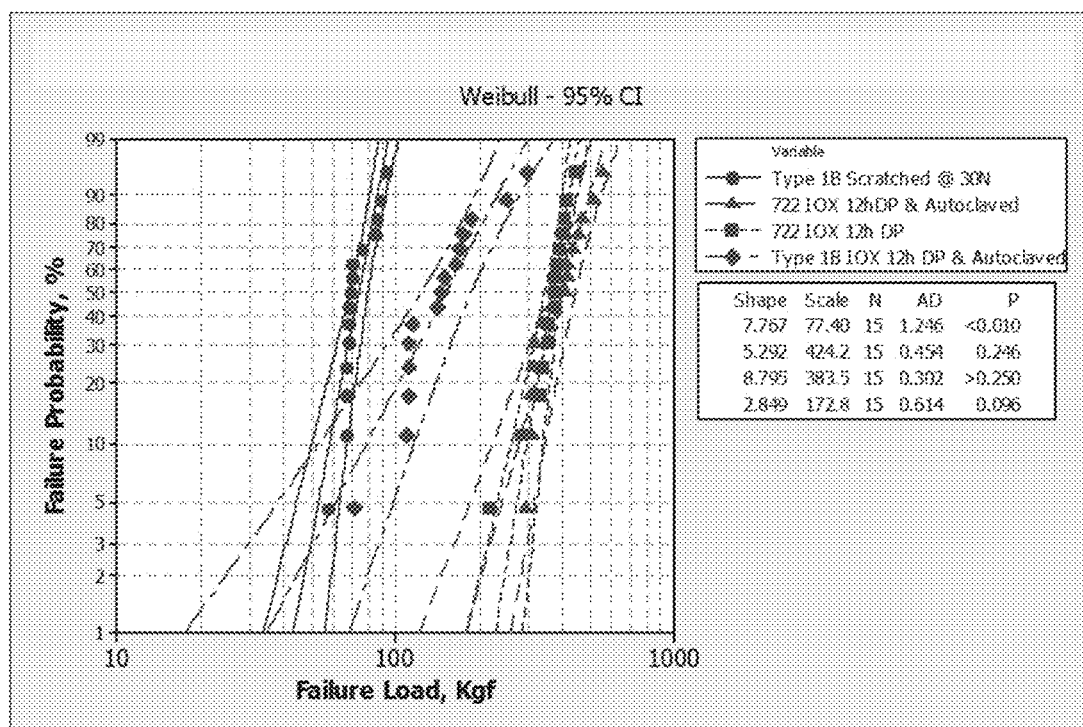
FIG. 25 graphically depicts the failure probability as a function of applied load in a horizontal compression test for vials, according to one or more embodiments shown and described herein.

The coated vials were also subjected to depyrogenation, as described above, autoclave conditions, or both. FIG. 25 graphically depicts the failure probability as a function of applied load in a horizontal compression test for the vials. There was no statistical difference between depyrogenated vials and depyrogenated and autoclaved vials.

Example 16

Referring now to FIG. 28, vials were prepared with three different coating compositions to assess the effect of different ratios of silanes on the coefficient of friction of the applied coating. The first coating composition included a coupling agent layer having a 1:1 ratio of GAPS to aminophenyltrimethyloxysilane and an outer coating layer which consisted of 1.0% NOVASTRAT® 800 polyimide. The second coating composition included a coupling agent layer having a 1:0.5 ratio of GAPS to aminophenyltrimethyloxysilane and an outer coating layer which consisted of 1.0% NOVASTRAT® 800 polyimide. The third coating composition included a coupling agent layer having a 1:0.2 ratio of GAPS to aminophenyltrimethyloxysilane and an outer coating layer which consisted of 1.0% NOVASTRAT® 800 polyimide. All the vials were depyrogenated for 12 hours at 320° C. Thereafter, the vials were subjected to a vial-on-vial frictive test under loads of 20 N and 30 N. The average applied normal force, coefficient of friction, and maximum frictive force (Fx) for each vial is reported in FIG. 28. As shown in FIG. 28, decreasing the amount of aromatic silane (i.e., the aminophenytrimethyloxysilane) increases the coefficient of friction between the vials as well as the frictive force experienced by the vials.

Example 17

Vials formed from type 1B ion-exchanged glass were prepared with low-friction coatings have varying ratios of silanes.

Figure 29:
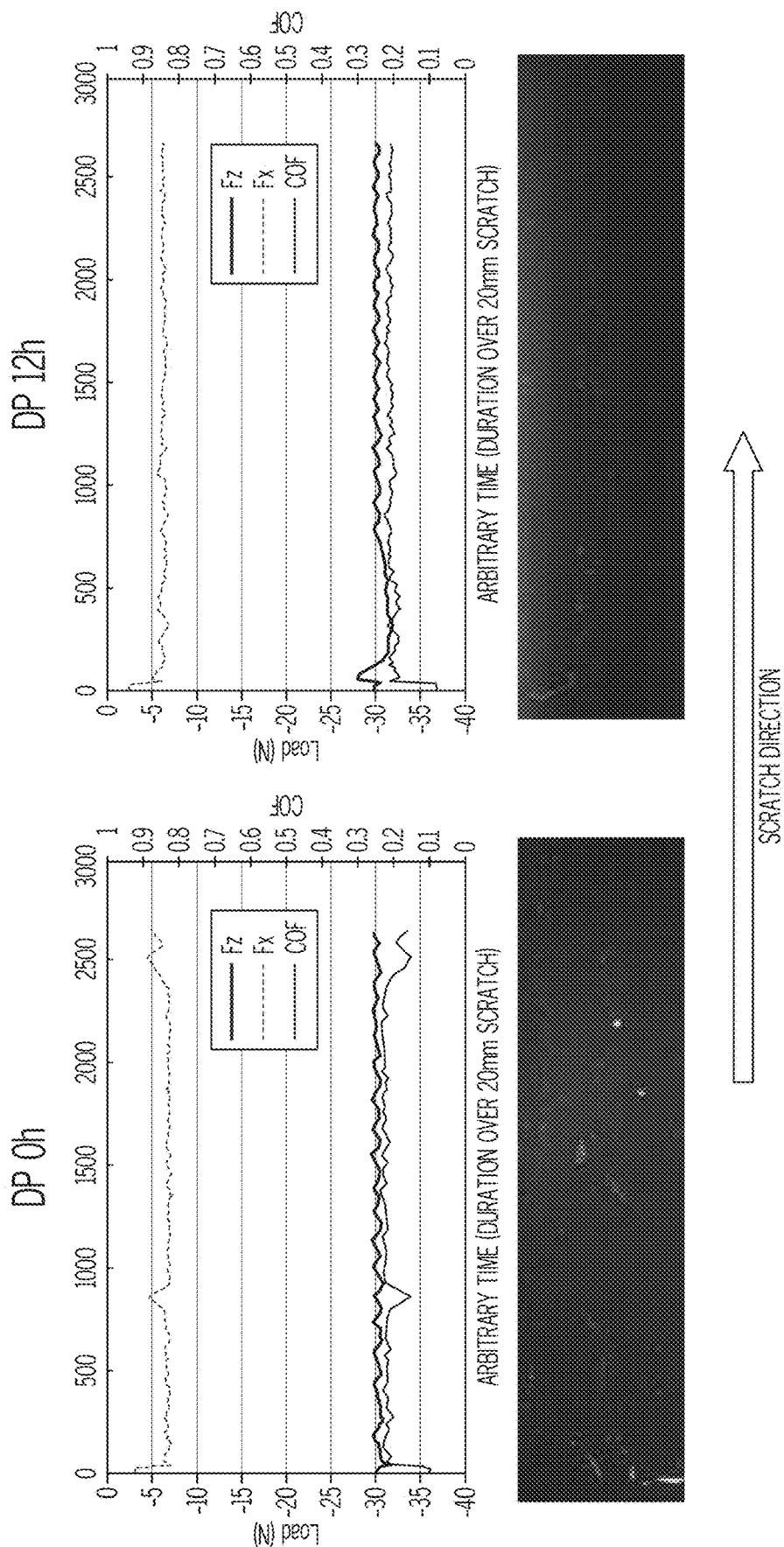
FIG. 29 graphically depicts the coefficient of friction, applied force and frictive force for coated glass containers before and after depyrogenation.

Samples were prepared with a composition which included a coupling agent layer formed from 0.125% APS and 1.0% aminophenyltrimethyloxysilane (APhTMS), having a ratio of 1:8, and an outer coating layer formed from 0.1% NOVASTRAT® 800 polyimide. The thermal stability of the applied coating was evaluated by determining the coefficient of friction and frictive force of vials before and after depyrogenation. Specifically, coated vials were subjected to a vial-on-vial frictive test under a load of 30 N. The coefficient of friction and frictive force were measured and are plotted in FIG. 29 as a function of time. A second set of vials were depyrogenated for 12 hours at 320° C. and subjected to the same vial-on-vial frictive test under a load of 30 N. The coefficient of friction remained the same both before and after depyrogenation indicating that the coatings were thermally stable. A photograph of the contacted area of the glass is also shown.

Samples were prepared with a composition which included a coupling agent layer formed from 0.0625% APS and 0.5% aminophenyltrimethyloxysilane (APhTMS), having a ratio of 1:8, and an outer coating layer formed from 0.05% NOVASTRAT® 800 polyimide. The thermal stability of the applied coating was evaluated by determining the coefficient of friction and frictive force of vials before and after depyrogenation. Specifically, coated vials were subjected to a vial-on-vial frictive test under a load of 30 N. The coefficient of friction and frictive force were measured and are plotted in FIG. 37 as a function of time. A second set of vials were depyrogenated for 12 hours at 320° C. and subjected to the same vial-on-vial frictive test under a load of 30 N. The coefficient of friction remained the same both before and after depyrogenation indicating that the coatings were thermally stable. A photograph of the contacted area of the glass is also shown.

Figure 38:
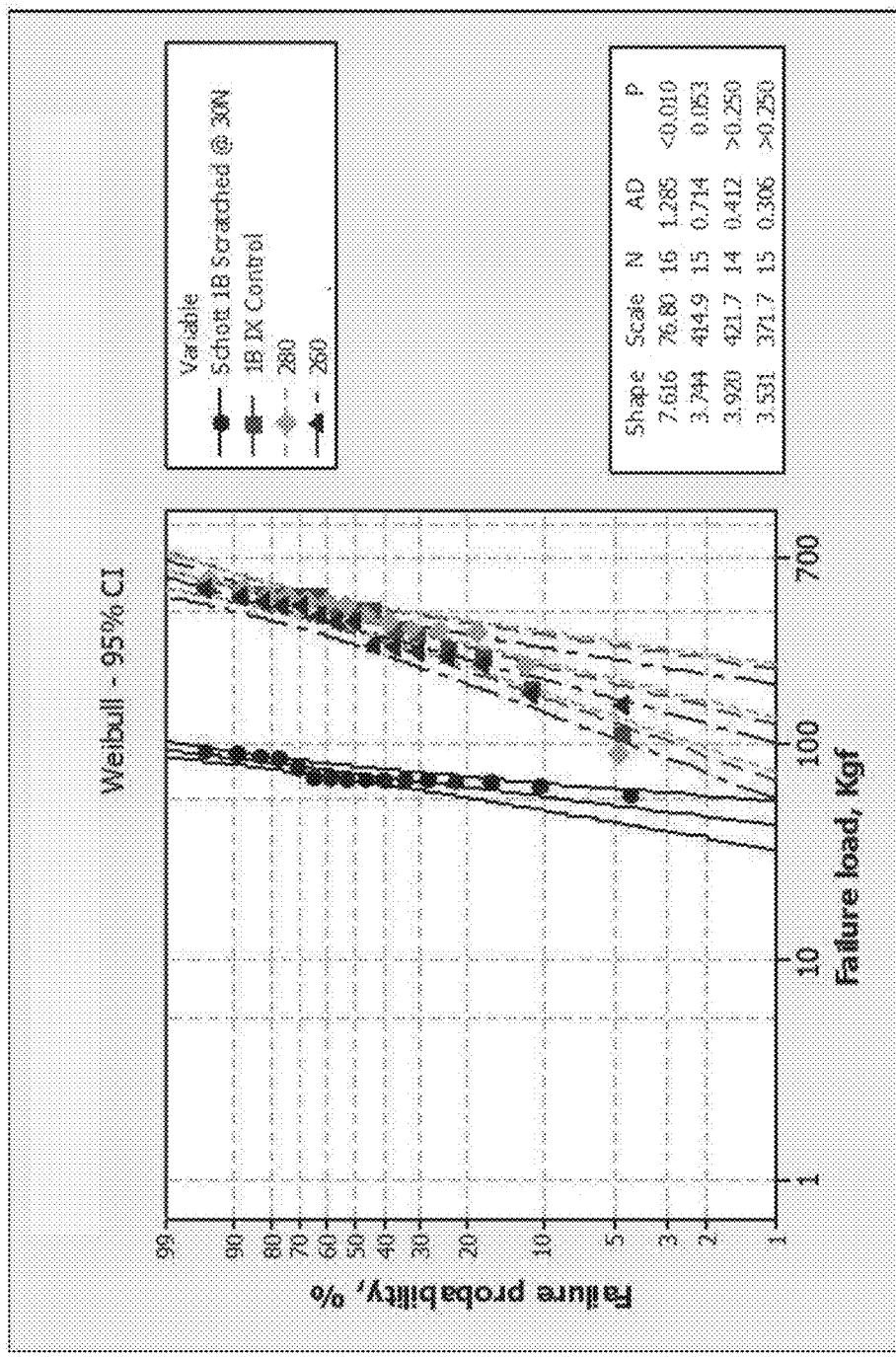
FIG. 38 graphically depicts the failure probability as a function of applied load in a horizontal compression test for vials, according to one or more embodiments shown and described herein.

FIG. 38 graphically depicts the failure probability as a function of applied load in a horizontal compression test for the vials with low-friction coatings formed from 0.125% APS and 1.0% aminophenyltrimethyloxysilane (APhTMS), having a ratio of 1:8, and an outer coating layer formed from 0.1% NOVASTRAT® 800 polyimide (Shown as "260" on FIG. 38), and formed from 0.0625% APS and 0.5% aminophenyltrimethyloxysilane (APhTMS), having a ratio of 1:8, and an outer coating layer formed from 0.05% NOVASTRAT® 800 polyimide (Shown as "280" on FIG. 38). A photograph of the contacted area of the glass is also shown. The data shows that failure load remains unchanged from uncoated unscratched samples for coated, depyrogenated, and scratched samples demonstrating glass protection from damage by the coating.

Figure 39:
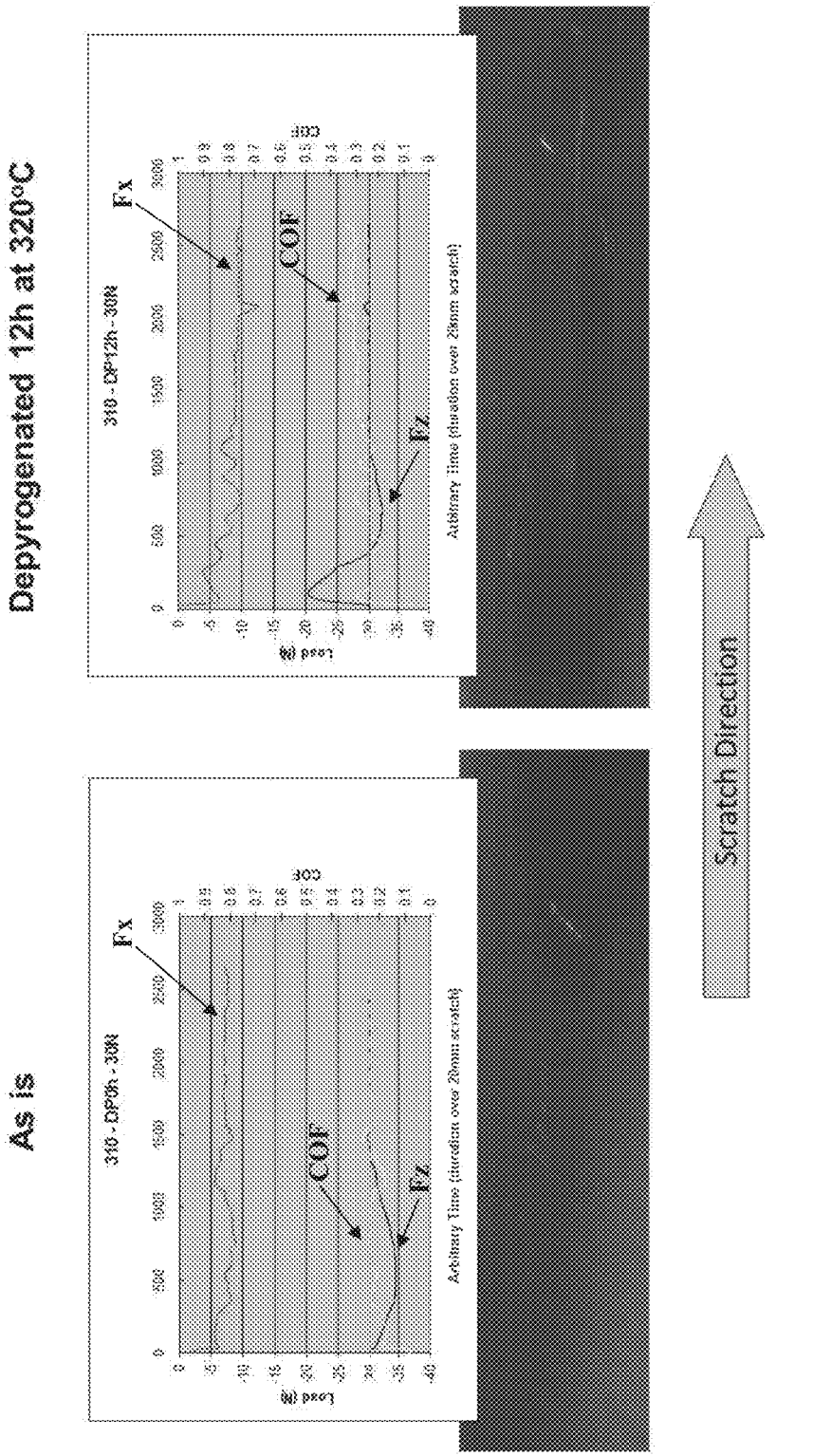
FIG. 39 graphically depicts the coefficient of friction, applied force and frictive force for coated glass containers before and after depyrogenation, according to one or more embodiments shown and described herein.

Vials were prepared with low-friction coatings have varying ratios of silanes. Samples were prepared with a composition which included a coupling agent layer formed from 0.5% Dynasylan® Hydrosil 1151 and 0.5% aminophenyltrimethyloxysilane (APhTMS), having a ratio of 1:1, and an outer coating layer formed from 0.05% NOVASTRAT® 800 polyimide. The thermal stability of the applied coating was evaluated by determining the coefficient of friction and frictive force of vials before and after depyrogenation. Specifically, coated vials were subjected to a vial-on-vial frictive test under a load of 30 N. The coefficient of friction and frictive force were measured and are plotted in FIG. 39 as a function of time. A second set of vials were depyrogenated for 12 hours at 320° C. and subjected to the same vial-on-vial frictive test under a load of 30 N. The coefficient of friction remained the same both before and after depyrogenation indicating that the coatings were thermally stable. A photograph of the contacted area of the glass is also shown. This suggests that hydrolysates of aminosilanes, such as aminosilsesquioxanes, are useful in the coating formulations as well.

Figure 30:
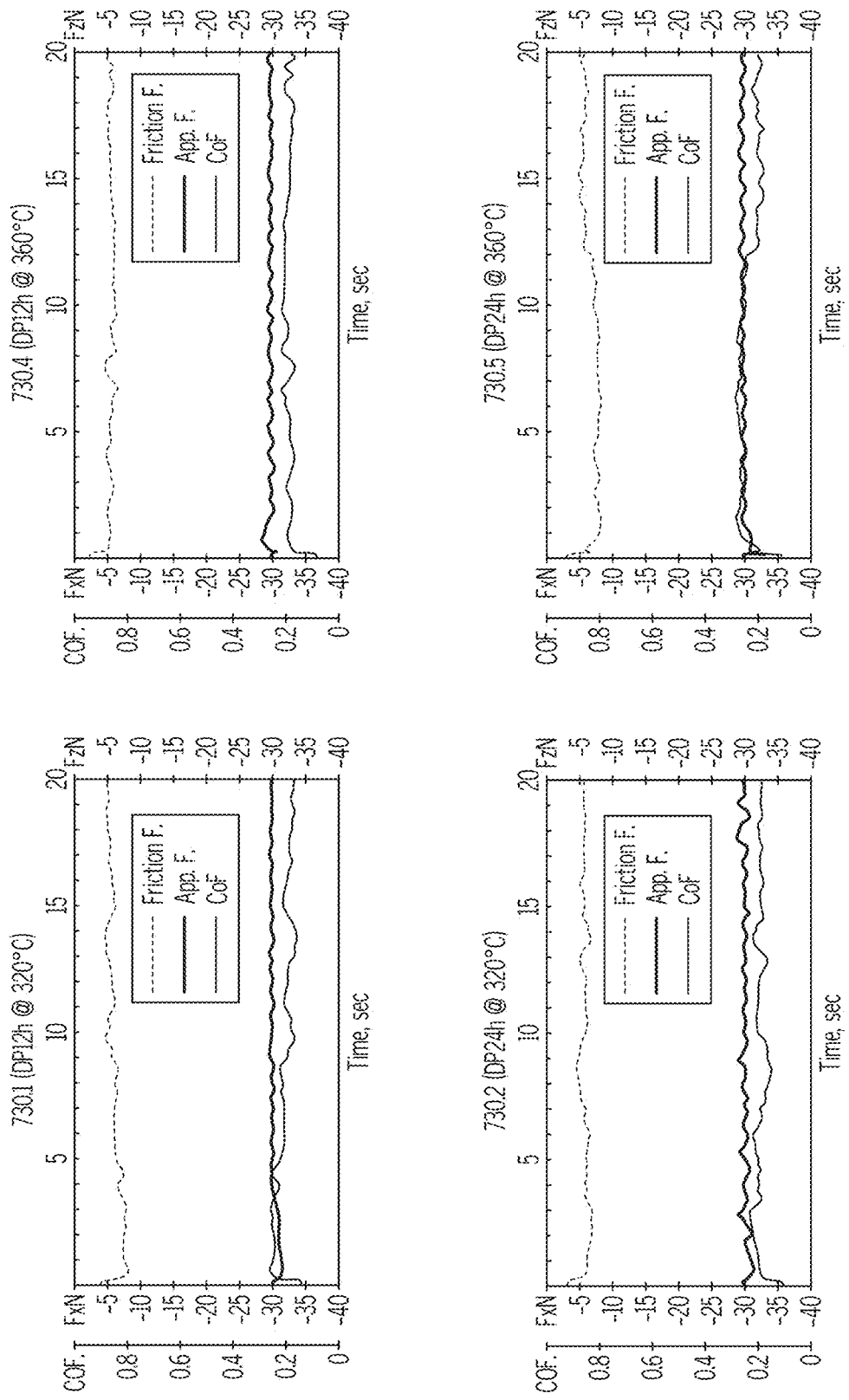
FIG. 30 graphically depicts the coefficient of friction, applied force and frictive force for coated glass containers for different depyrogenation conditions.
Figure 40:
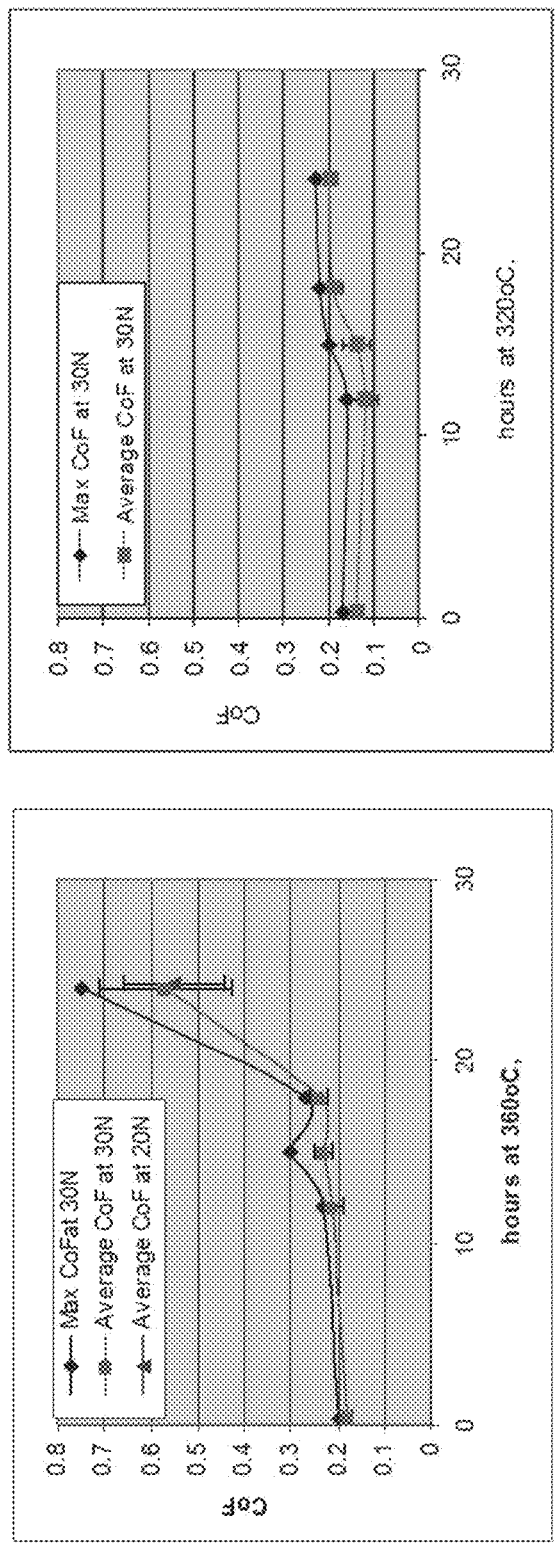
FIG. 40 graphically depicts the coefficient of friction after varying heat treatment times, according to one or more embodiments shown and described herein, according to one or more embodiments shown and described herein.

The thermal stability of the applied coating was also evaluated for a series of depyrogenation conditions. Specifically, type 1B ion-exchanged glass vials were prepared with a composition which included a coupling agent layer having a 1:1 ratio of GAPS (0.5%) to aminophenyltrimethyloxysilane (0.5%) and an outer coating layer which consisted of 0.5% NOVASTRAT® 800 polyimide. Sample vials were subjected to one of the following depyrogenation cycles: 12 hours at 320° C.; 24 hours at 320° C.; 12 hours at 360° C.; or 24 hours at 360° C. The coefficient of friction and frictive force were then measured using a vial-on-vial frictive test and plotted as a function of time for each depyrogenation condition, as shown in FIG. 30. As shown in FIG. 30, the coefficient of friction of the vials did not vary with the depyrogenation conditions indicating that the coating was thermally stable. FIG. 40 graphically depicts the coefficient of friction after varying heat treatment times at 360° C. and 320° C.

Example 18

Vials were coated as described in Example 2 with a APS/NOVASTRAT® 800 coating. The light transmission of coated vials, as well as uncoated vials, was measured within a range of wavelengths between 400-700 nm using a spectrophotometer. The measurements are performed such that a light beam is directed normal to the container wall such that the beam passes through the low-friction coating twice, first when entering the container and then when exiting it. FIG. 11 graphically depicts the light transmittance data for coated and uncoated vials measured in the visible light spectrum from 400-700 nm. Line 440 shows an uncoated glass container and line 442 shows a coated glass container.

Example 19

Figure 46:
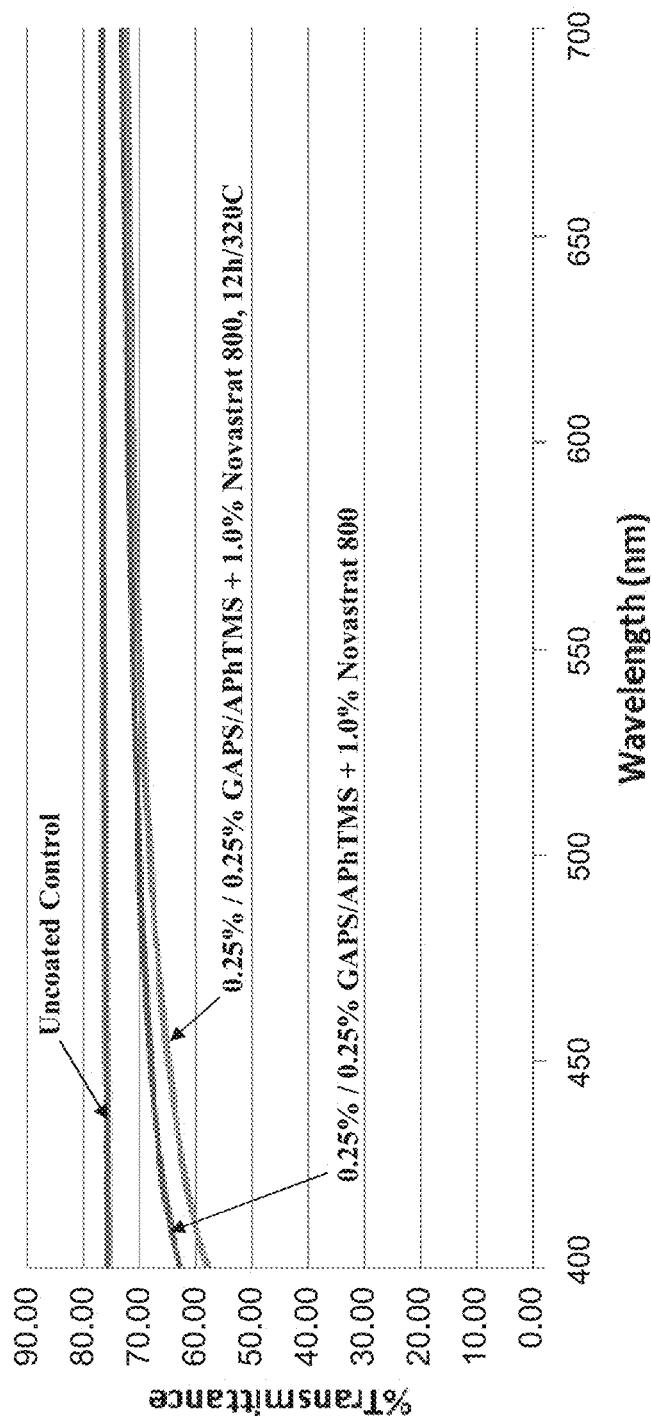
FIG. 46 graphically depicts the light transmittance data for coated and uncoated vials measured in the visible light spectrum from 400-700 nm, according to one or more embodiments shown and described herein.

Vials were coated with a 0.25% GAPS/0.25% APhTMS coupling agent and 1.0% NOVASTRAT® 800 polyimide and were tested for light transmission before and after depyrogenation at 320° C. for 12 hours. An uncoated vial was also tested. Results are shown in FIG. 46.

Example 20

To improve polyimide coating uniformity, the NOVASTRAT® 800 polyamic acid was converted into polyamic acid salt and dissolved in methanol, significantly faster evaporating solvent compared to dimethylacetamide, by adding 4 g of triethylamine to 1 L of methanol and then adding NOVASTRAT® 800 polyamic acid to form 0.1% solution.

Figure 41:
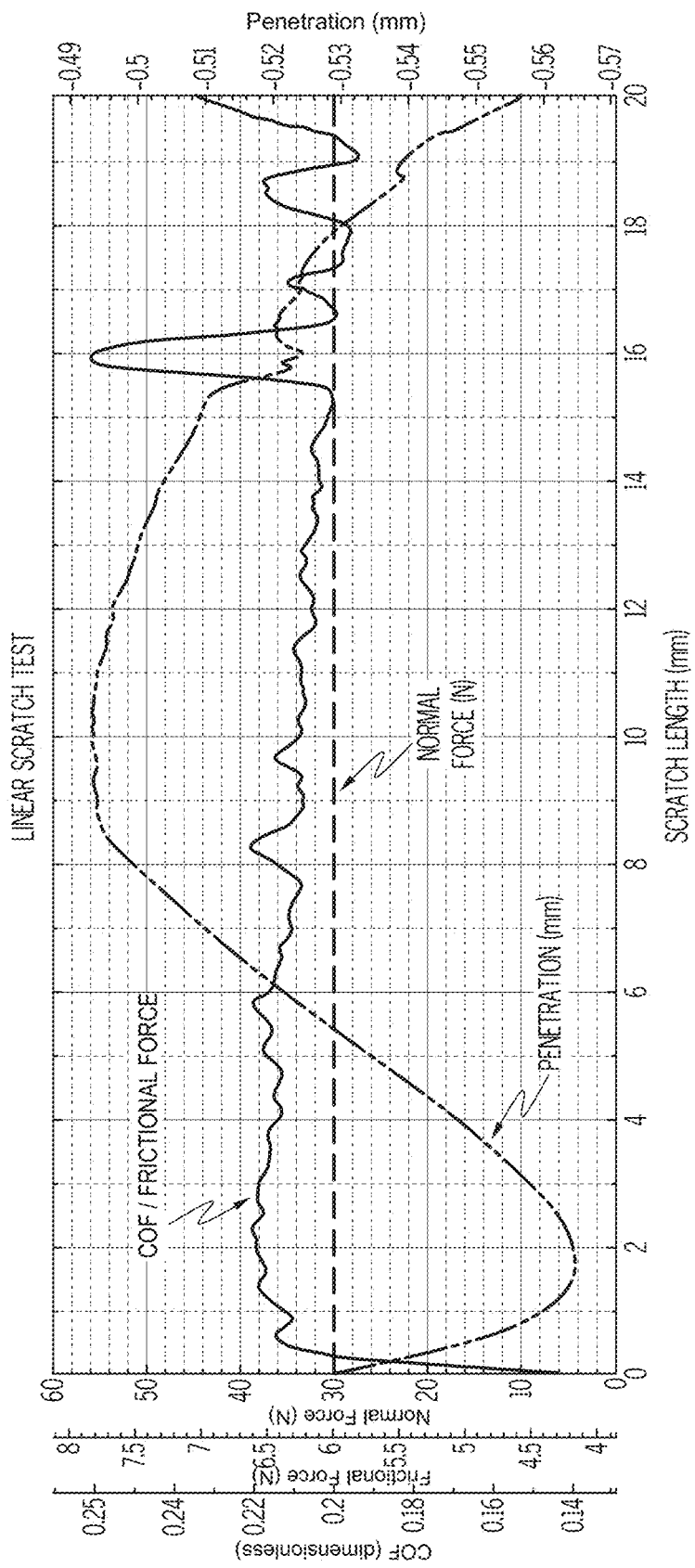
FIG. 41 graphically depicts the coefficient of friction, applied force and frictive force for coated glass containers before and after depyrogenation, according to one or more embodiments shown and described herein.
Figure 42:
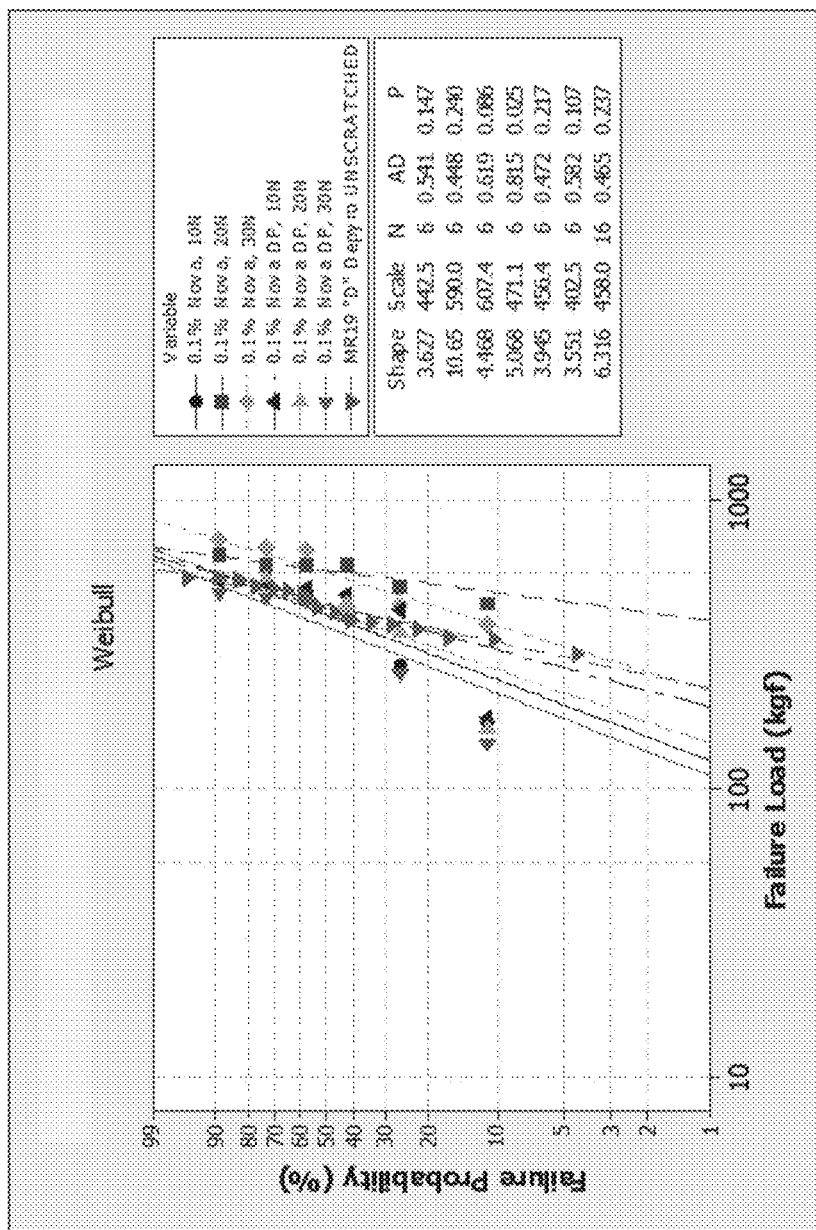
FIG. 42 graphically depicts the failure probability as a function of applied load in a horizontal compression test for vials, according to one or more embodiments shown and described herein.

Coating on 1B ion-exchanged vials formed from 1.0% GAPS/1.0% APhTMS in methanol/water mixture and 0.1% NOVASTRAT® 800 polyamic acid salt in methanol. The coated vials were depyrogenated for 12h at 360° C. and undepyrgenated and depyrogenated samples were scratched in vial-on-vial jig at 10, 20 and 30 N normal loads. No glass damage was observed at normal forces of 10 N, 20 N and 30 N. FIG. 41 shows the coefficient of friction, applied force and frictive force for the samples after a heat treatment at 360° C. for 12 hours. FIG. 42 graphically depicts the failure probability as a function of applied load in a horizontal compression test for the samples. Statistically the sample series at 10 N, 20 N, and 30 N were indistinguishable from each other. The low load failure samples broke from origins located away from the scratch.

Figure 44:
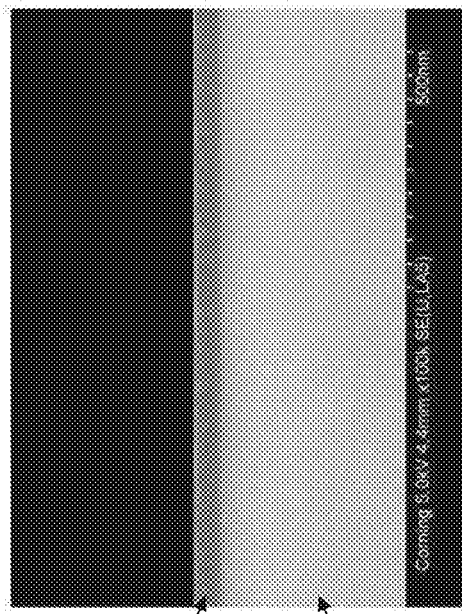
FIG. 44 shows a scanning electron microscope image of a coating, according to one or more embodiments shown and described herein.
Figure 43:
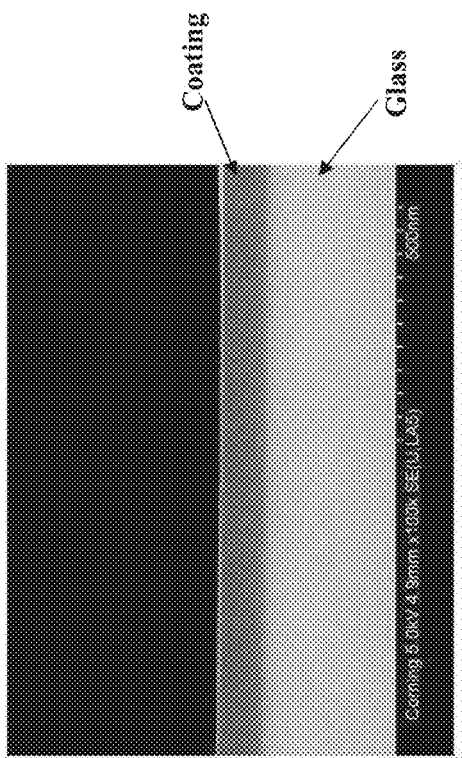
FIG. 43 shows a scanning electron microscope image of a coating, according to one or more embodiments shown and described herein.
Figure 45:
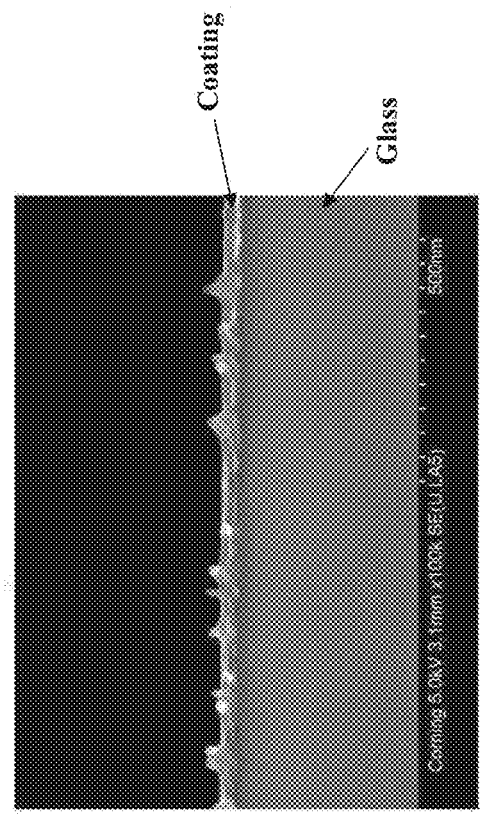
FIG. 45 shows a scanning electron microscope image of a coating, according to one or more embodiments shown and described herein.

Thickness of the coating layers was estimated using ellipsometry and scanning electron microscopy (SEM), shown in FIGS. 43-45, respectively. The samples for coating thickness measurements were produced using silicon wafer (ellipsometry) and glass slides (SEM). The methods show thicknesses varying from 55 to 180 nm for silsesquioxane tie-layer and 35 nm for NOVASTRAT® 800 polyamic acid salt.

Example 21

Plasma cleaned Si wafers pieces were dip coated using 0.5% GAPS, 0.5% APhTMS solution in 75/25 methanol/water vol/vol mixture. The coating was exposed to 120° C. for 15 minutes. The coating thickness was determined using ellipsometry. Three samples were prepared, and had thicknesses of 92.1 nm, 151.7 nm, and 110.2 nm, respectively, with a standard deviation of 30.6 nm.

Glass slides were dip coated and examined with a scanning electron microscope. FIG. 43 shows an SEM image glass slide dipped in a coating solution of 1.0% GAPS, 1.0% APhTMS, and 0.3% NMP with an 8 mm/s pull out rate after a curing at 150° C. for 15 minutes. The coating appears to be about 93 nm thick. FIG. 44 shows an SEM image glass slide dipped in a coating solution of 1.0% GAPS, 1.0% APhTMS, and 0.3% NMP with a 4 mm/s pull out rate after a curing at 150° C. for 15 minutes. The coating appears to be about 55 nm thick. FIG. 45 shows an SEM image glass slide dipped in a coating solution of 0.5 NOVASTRAT® 800 solution with a 2 mm/s pull up rate after a curing at 150° C.

for 15 min and heat treatment at 320° C. for 30 minutes. The coating appears to be about 35 nm thick.

Comparative Example A

Glass vials formed from a Type 1B glass were coated with a diluted coating of Bayer Silicone aqueous emulsion of Baysilone M with a solids content of about 1-2%. The vials were treated at 150° C. for 2 hours to drive away water from the surface leaving a polydimethylsiloxane coating on the exterior surface of the glass. The nominal thickness of the coating was about 200 nm. A first set of vials were maintained in untreated condition (i.e., the "as-coated vials"). A second set of vials were treated at 280° C. for 30 minutes (i.e., the "treated vials"). Some of the vials from each set were first mechanically tested by applying a scratch with a linearly increasing load from 0-48N and a length of approximately 20 mm using a UMT-2 tribometer. The scratches were evaluated for coefficient of friction and morphology to determine if the scratching procedure damaged the glass or if the coating protected the glass from damage due to scratching.

Figure 33:
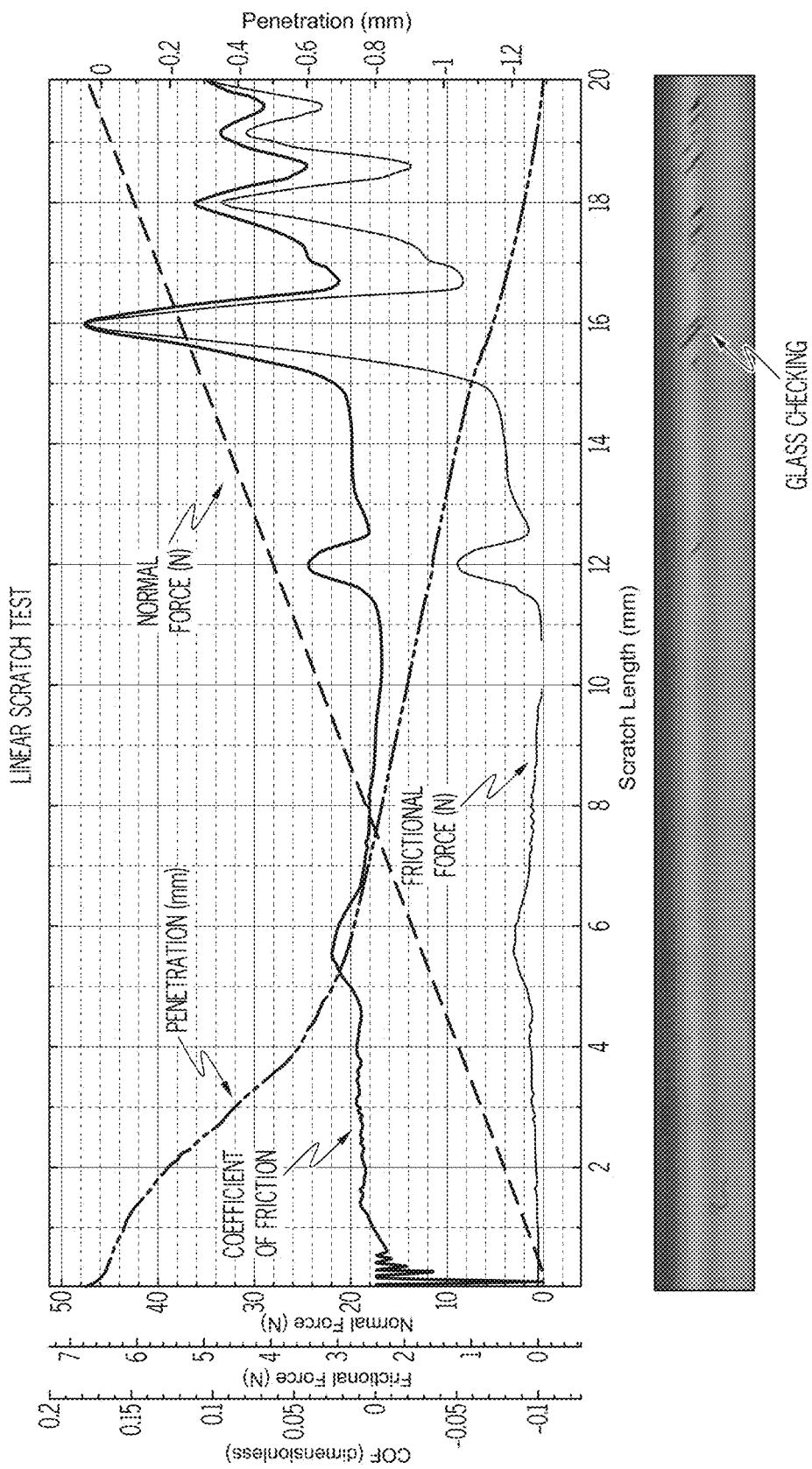
FIG. 33 graphically depicts the coefficient of friction, scratch penetration, applied normal force, and frictional force (y-ordinates) as a function of the length of the applied scratch (x-ordinate) for the as-coated vials of a Comparative Example.

FIG. 33 is a plot showing the coefficient of friction, scratch penetration, applied normal force, and frictional force (y-ordinates) as a function of the length of the applied scratch (x-ordinate) for the as-coated vials. As graphically depicted in FIG. 33, the as-coated vials exhibited a coefficient of friction of approximately 0.03 up to loads of about 30 N. The data shows that below approximately 30 N the COF is always below 0.1. However, at normal forces greater than 30 N, the coating began to fail, as indicated by the presence of glass checking along the length of scratch. Glass checking is indicative of glass surface damage and an increased propensity of the glass to fail as a result of the damage.

Figure 34:
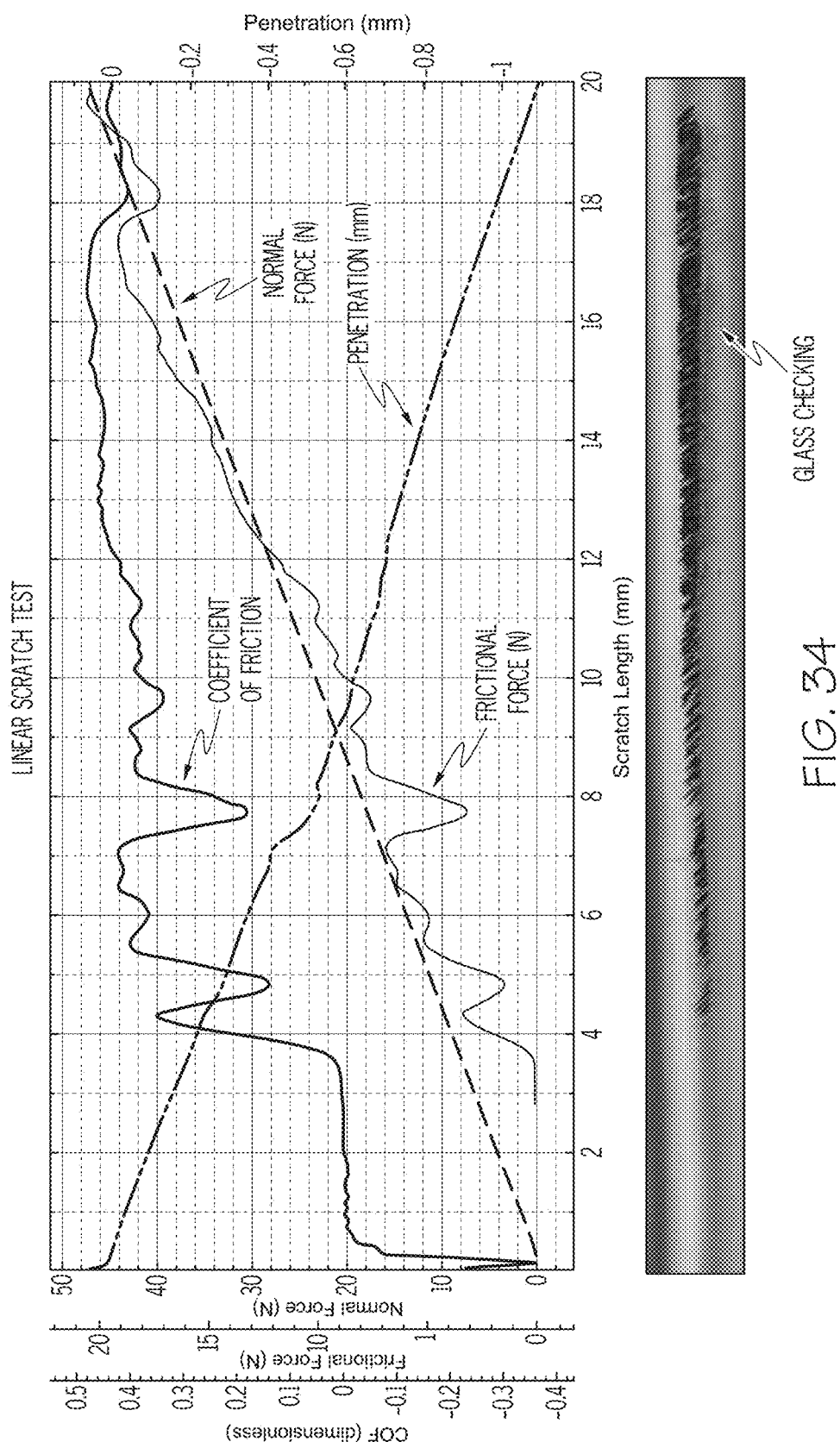
FIG. 34 graphically depicts the coefficient of friction, scratch penetration, applied normal force, and frictional force (y-ordinates) as a function of the length of the applied scratch (x-ordinate) for the thermally treated vials of a Comparative Example.

FIG. 34 is a plot showing the coefficient of friction, scratch penetration, applied normal force, and frictional force (y-ordinates) as a function of the length of the applied scratch (x-ordinate) for the treated vials. For the treated vials, the coefficient of friction remained low until the applied load reached a value of approximately 5 N. At that point the coating began to fail and the glass surface was severely damaged as evident from the increased amount of glass checking which occurred with increasing load. The coefficient of friction of the treated vials increased to about 0.5. However, the coating failed to protect the surface of the glass at loads of 30 N following thermal exposure, indicating that the coating was not thermally stable.

The vials were then tested by applying 30 N static loads across the entire length of the 20 mm scratch. Ten samples of as-coated vials and ten samples of treated vials were tested in horizontal compression by applying a 30 N static load across the entire length of the 20 mm scratch. None of the as-coated samples failed at the scratch while 6 of the 10 treated vials failed at the scratch indicating that the treated vials had lower retained strength.

Comparative Example B

A solution of Wacker Silres MP50 (part #60078465 lot #EB21192) was diluted to 2% and was applied to vials formed from the Reference Glass Composition. The vials were first cleaned by applying plasma for 10 seconds prior to coating. The vials were dried at 315° C. for 15 minutes to drive off water from the coating. A first set of vials was maintained in "as-coated" condition. A second set of vials was treated for 30 minutes at temperatures ranging from 250° C. to 320° C. (i.e., "treated vials"). Some of the vials from each set were first mechanically tested by applying a scratch with a linearly increasing load from 0-48N and a length of approximately 20 mm using a UMT-2 tribometer. The scratches were evaluated for coefficient of friction and morphology to determine if the scratching procedure damaged the glass or if the coating protected the glass from damage due to scratching.

Figure 35:
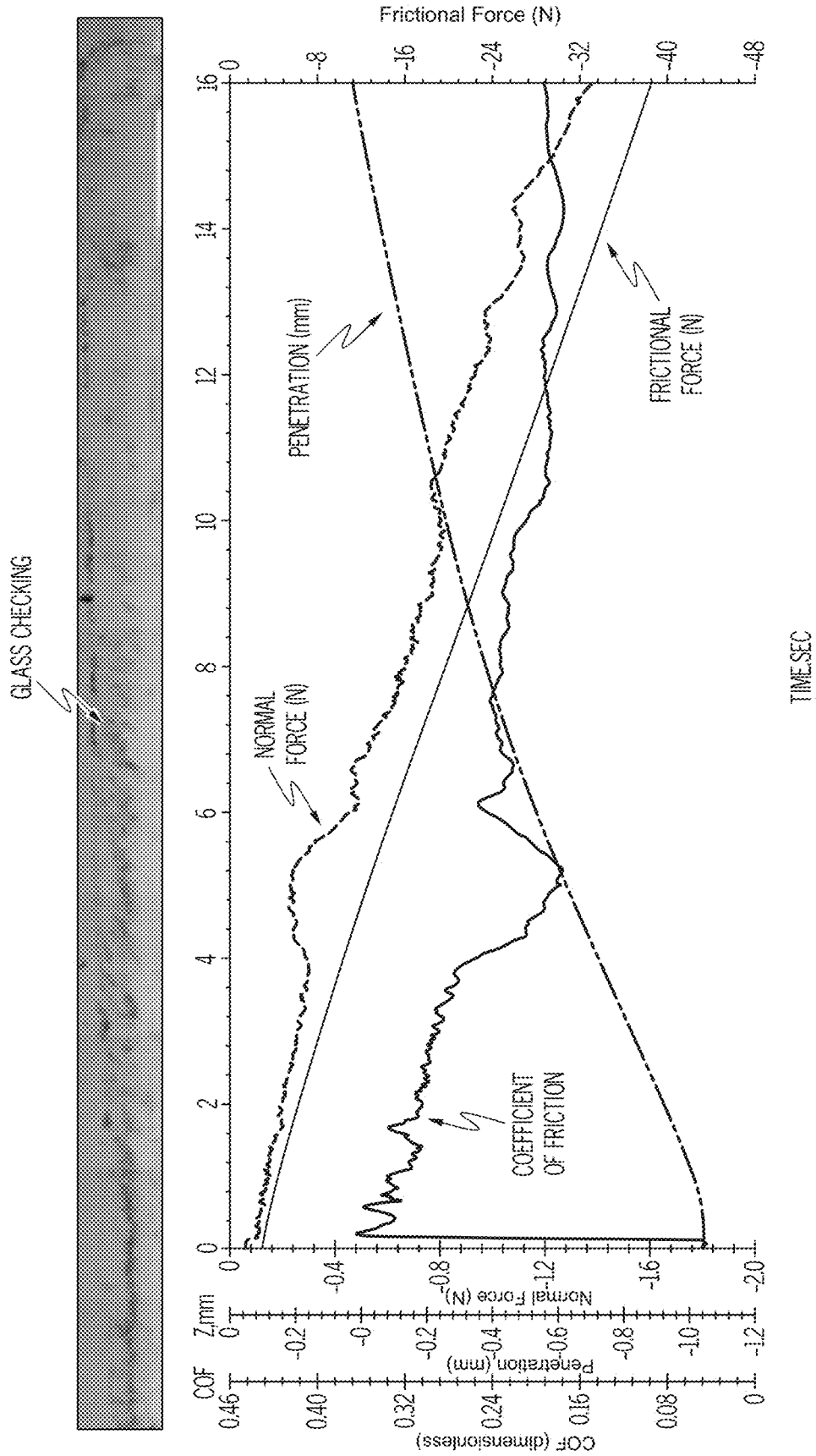
FIG. 35 graphically depicts the coefficient of friction, scratch penetration, applied normal force, and frictional force (y-ordinates) as a function of the length of the applied scratch (x-ordinate) for the as-coated vials of a Comparative Example.

FIG. 35 is a plot showing the coefficient of friction, scratch penetration, applied normal force, and frictional force (y-ordinates) as a function of the length of the applied scratch (x-ordinate) for the as-coated vials. The as-coated vials exhibited damage to the coating, but no damage to the glass.

Figure 36:
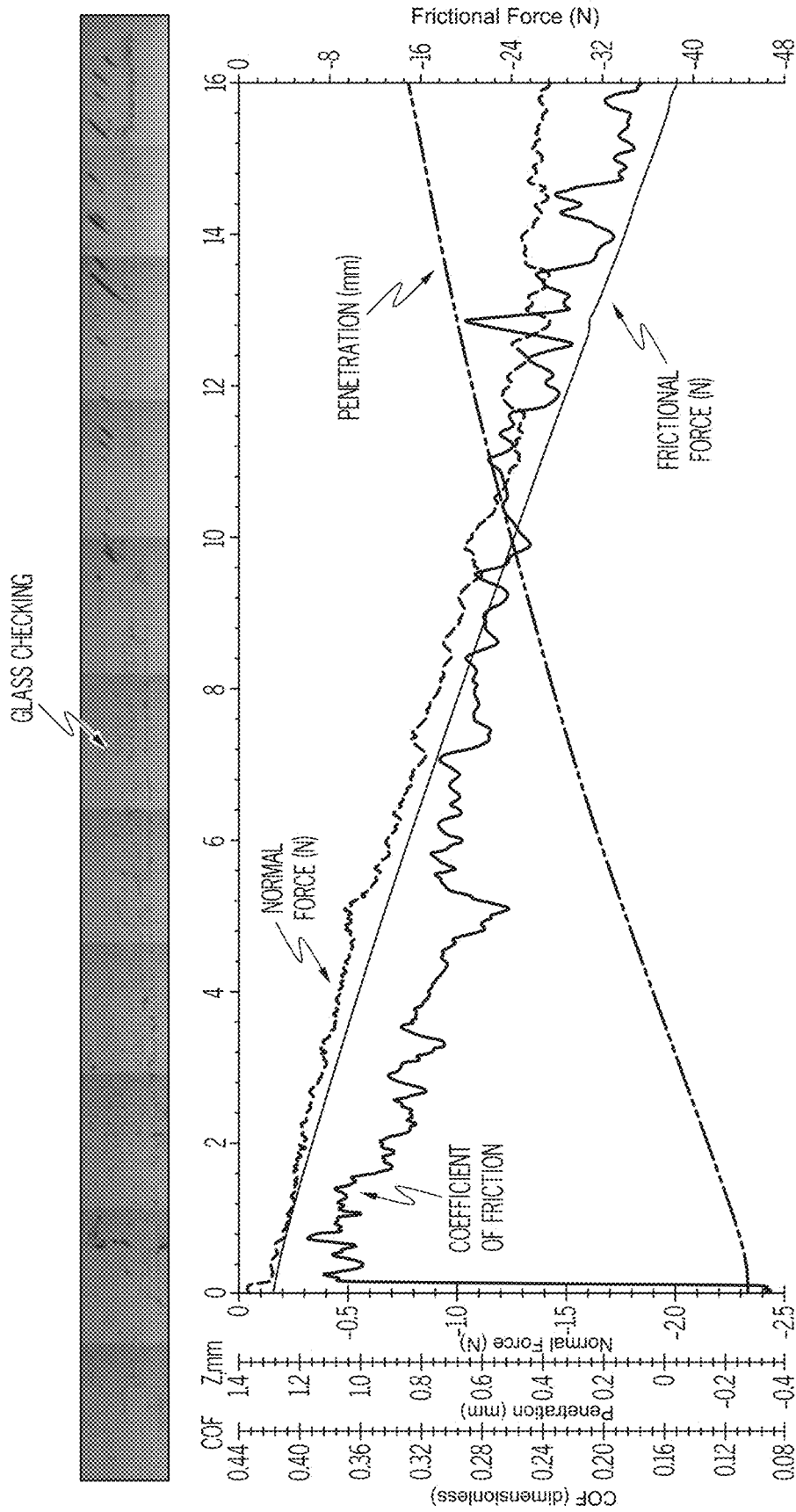
FIG. 36 graphically depicts the coefficient of friction, scratch penetration, applied normal force, and frictional force (y-ordinates) as a function of the length of the applied scratch (x-ordinate) for the thermally treated vials of a Comparative Example.

FIG. 36 is a plot showing the coefficient of friction, scratch penetration, applied normal force, and frictional force (y-ordinates) as a function of the length of the applied scratch (x-ordinate) for the treated vials treated at 280° C. The treated vials exhibited significant glass surface damage at applied loads greater than about 20N. It was also determined that the load threshold to glass damage decreased with increasing thermal exposure temperatures, indicating that the coatings degraded with increasing temperature (i.e., the coating is not thermally stable). Samples treated at temperatures lower than 280° C. showed glass damage at loads above 30N.

Comparative Example C

Vials formed from the Reference Glass Composition were treated with Evonik Silikophen P 40/W diluted to 2% solids in water. The samples were then dried at 150° C. for 15 minutes and subsequently cured at 315° C. for 15 minutes. A first set of vials was maintained in "as-coated" condition. A second set of vials was treated for 30 minutes at a temperature of 260° C. (i.e., "the 260° C. treated vials"). A third set of vials was treated for 30 minutes at a temperature of 280° C. (i.e., "the 280° C. treated vials"). The vials were scratched with a static load of 30 N using the testing jig depicted in FIG. 9. The vials were then tested in horizontal compression. The 260° C. treated vials and the 280° C. treated vials failed in compression while 2 of 16 of the as-coated vials failed at the scratch. This indicates that the coating degraded upon exposure to elevated temperatures and, as a result, the coating did not adequately protect the surface from the 30 N load.

Based on the foregoing, it should now be understood that various aspects of coated glass articles are disclosed herein. According to a first aspect, a coated glass article comprises: a glass body comprising a first surface; and a low-friction coating positioned on at least a portion of the first surface of the glass body, the low-friction coating comprising a polymer chemical composition, wherein: the coated glass article is thermally stable at a temperature of at least about 260° C. or even 280° C. for 30 minutes. The term thermally stable means that (1) a coefficient of friction of an abraded area of the portion of the exterior surface with the low-friction coating is less than 0.7 after exposure to the specified elevated temperature for 30 minutes and abrasion under a 30 N load and does not have observable damage and (2) a retained strength of the coated glass article in horizontal compression does not decrease by more than about 20% after exposure to an elevated temperature of 280° C. for 30 minutes abrasion under a 30 N load. In some embodiments of this first aspect, a light transmission through the coated glass article is greater than or equal to about 55% of a light transmission through an uncoated glass article for wavelengths from about 400 nm to about 700 nm. In some embodiments of this first aspect, the low-friction coating has a mass loss of less than about 5% of its mass when heated from a temperature of 150° C. to 350° C. at a ramp rate of about 10° C./minute.

In a second aspect, a coated glass article comprises a glass body comprising a first surface; and a low-friction coating positioned on at least a portion of the first surface of the glass body, the low-friction coating comprising: a polymer chemical composition; and a coupling agent comprising at least one of: a first silane chemical composition, a hydrolysate thereof, or an oligomer thereof, wherein the first silane chemical composition is an aromatic silane chemical composition; and a chemical composition formed from the oligomerization of at least the first silane chemical composition and a second silane chemical composition, wherein: the first silane chemical composition and the second silane chemical composition are different chemical compositions; the coated glass article is thermally stable at a temperature of at least about 260° C. for 30 minutes; a light transmission through the coated glass article is greater than or equal to about 55% of a light transmission through an uncoated glass article for wavelengths from about 400 nm to about 700 nm; and the low-friction coating has a mass loss of less than about 5% of its mass when heated from a temperature of 150° C. to 350° C. at a ramp rate of about 10° C./minute.

In a third aspect, a coated glass article comprises a glass body comprising a first surface; a low-friction coating positioned on at least a portion of the first surface of the glass body, the low-friction coating comprising: a coupling agent comprising an oligomer of one or more silane chemical compositions, wherein the oligomer is a silsesquioxane chemical composition and at least one of the silane chemical compositions comprises at least one aromatic moiety and at least one amine moiety; and a polyimide chemical composition formed from the polymerization of at least a first diamine monomer chemical composition, a second diamine monomer chemical composition, and a dianhydride monomer chemical composition, wherein the first diamine monomer chemical composition is different than the second diamine monomer chemical composition.

In a fourth aspect, a coated glass article comprises a glass body comprising a first surface; and a low-friction coating positioned on at least a portion of the first surface of the glass body, the low-friction coating comprising a polymer chemical composition, wherein: the coated glass article is thermally stable at a temperature of at least about 300° C. for 30 minutes; and a light transmission through the coated glass article is greater than or equal to about 55% of a light transmission through an uncoated glass article for wavelengths from about 400 nm to about 700 nm.

In a fifth aspect, coated glass article comprises: a glass body comprising a first surface and a second surface opposite the first surface, wherein the first surface is an exterior surface of a glass container; and a low-friction coating bonded to at least a portion of the first surface of the glass body, the low-friction coating comprising a polymer chemical composition, wherein: the coated glass article is thermally stable at a temperature of at least about 280° C. for 30 minutes; and a light transmission through the coated glass article is greater than or equal to about 55% of a light transmission through an uncoated glass article for wavelengths from about 400 nm to about 700 nm.

In a sixth aspect, a coated glass article comprises: a glass body comprising a first surface; and a low-friction coating bonded to at least a portion of the first surface of the glass body, the low-friction coating comprising: a coupling agent layer positioned on the first surface of the glass body, the coupling agent layer comprising a coupling agent, the coupling agent comprising at least one of: a first silane chemical composition, a hydrolysate thereof, or an oligomer thereof, wherein the first silane chemical composition is an aromatic silane chemical composition; and a chemical composition formed from the oligomerization of at least the first silane chemical composition and a second silane chemical composition, a polymer layer positioned over the coupling agent layer, the polymer layer comprising a polyimide chemical composition; and wherein: the first silane chemical composition and the second silane chemical composition are different chemical compositions; the coated glass article is thermally stable at a temperature of at least about 280° C. for 30 minutes; and a light transmission through the coated glass article is greater than or equal to about 55% of a light transmission through an uncoated glass article for wavelengths from about 400 nm to about 700 nm.

In a seventh aspect, a coated glass article comprises: a glass body comprising a first surface; a low-friction coating bonded to at least a portion of the first surface of the glass body, the low-friction coating comprising: a coupling agent layer comprising a coupling agent, the coupling agent comprising an oligomer of one or more silane chemical compositions, wherein the oligomer is a silsesquioxane chemical composition and at least one of the silane chemical compositions comprises at least one aromatic moiety and at least one amine moiety; a polymer layer, the polymer layer comprising a polyimide chemical composition formed from the polymerization of at least a first diamine monomer chemical composition, a second diamine monomer chemical composition, and a dianhydride monomer chemical composition, wherein the first diamine monomer chemical composition is different than the second diamine monomer chemical composition; and an interface layer comprising one or more chemical compositions of the polymer layer bound with one or more of the chemical compositions of the coupling agent layer.

An eighth aspect includes the coated glass article of any of the first through fourth, sixth, or seventh aspects, wherein: the glass body is a glass container comprising a second surface opposite the first surface; and the first surface is an exterior surface of the glass container.

A ninth aspect includes the coated glass article of any of the first through seventh aspects, wherein the coated glass article is a pharmaceutical package.

A tenth aspect includes the coated glass article of the ninth aspect, wherein the pharmaceutical package contains a pharmaceutical composition.

An eleventh aspect includes the coated glass article of any of the first through seventh aspects, wherein the glass body comprises ion-exchanged glass.

A twelfth aspect includes the coated glass article of any of the first through fifth aspects, wherein the low-friction coating comprises: a coupling agent layer positioned on the first surface of the glass body, the coupling agent layer comprising the coupling agent; and a polymer layer positioned over the coupling agent layer, the polymer layer comprising the polymer chemical composition.

A thirteenth aspect includes the coated glass article of the sixth or twelfth aspects, wherein: the low-friction coating further comprises an interface layer positioned between the coupling agent layer and the polymer layer; and the interface layer comprises one or more chemical compositions of the polymer layer bound with one or more of the chemical compositions of the coupling agent layer.

A fourteenth aspect includes the coated glass article of any of the first through seventh aspects, wherein the coefficient of friction of the portion of the coated glass article with the low-friction coating is at least 20% less than a coefficient of friction of a surface of an uncoated glass article formed from a same glass composition.

A fifteenth aspect includes the coated glass article of includes any of the first through seventh aspects, wherein the portion of the coated glass article with the low-friction coating has a coefficient of friction of less than or equal to about 0.7 after exposure to autoclave conditions.

A sixteenth aspect includes the coated glass article of includes any of the first through seventh aspects, wherein the portion of the coated glass article with the low-friction coating has a coefficient of friction of less than or equal to about 0.7 after the coated glass article is submerged in a water bath at a temperature of about 70° C. for 1 hour.

A seventeenth aspect includes the coated glass article of, any of the first through seventh aspects, wherein the portion of the coated glass article with the low-friction coating has a coefficient of friction of less than or equal to about 0.7 after exposure to lyophilization conditions.

An eighteenth aspect includes the coated glass article of the first, fourth, or fifth aspects, wherein the low-friction coating further comprises a coupling agent.

A nineteenth aspect includes the coated glass article of the eighteenth aspect, wherein the coupling agent comprises at least one of: a first silane chemical composition, a hydrolysate thereof, or an oligomer thereof; and a chemical composition formed from the oligomerization of at least the first silane chemical composition and a second silane chemical composition, wherein the first silane chemical composition and the second silane chemical composition are different chemical compositions A twentieth aspect includes the coated glass article of nineteenth aspect, wherein the first silane chemical composition is an aromatic silane chemical composition.

A twenty-first aspect includes the coated glass article of the eighteenth aspect, wherein the coupling agent comprises a silsesquioxane chemical composition.

A twenty-second aspect includes the coated glass article of twenty-first aspect, wherein the silsesquioxane chemical composition comprises an aromatic moiety.

A twenty-third aspect includes the coated glass article of twenty-second aspect, wherein the silsesquioxane chemical composition further comprises an amine moiety.

A twenty-fourth aspect includes the coated glass article of the eighteenth aspect, wherein the coupling agent comprises at least one of: a mixture of a first silane chemical composition and a second silane chemical composition; and a chemical composition formed from the oligomerization of at least the first silane chemical composition and the second silane chemical composition, wherein the first silane chemical composition and the second silane chemical composition are different chemical compositions.

A twenty-fifth aspect includes the coated glass article of twenty-fourth aspect, wherein the first silane chemical composition is an aromatic silane chemical composition.

A twenty-sixth aspect includes the coated glass article of the eighteenth aspect, wherein the first silane chemical composition is an aromatic silane chemical composition.

A twenty-seventh aspect includes the coated glass article of any of the second, sixth, or twenty-sixth aspects, wherein the first silane chemical composition comprises at least one amine moiety.

A twenty-eighth aspect includes the coated glass article of any of the second, sixth, or twenty-sixth aspects, wherein the first silane chemical composition is an aromatic alkoxysilane chemical composition, an aromatic acyloxysilane chemical composition, an aromatic halogen silane chemical composition, or an aromatic aminosilane chemical composition.

A twenty-ninth aspect includes the coated glass article of any of the second, sixth, or twenty-sixth aspects, wherein the first silane chemical composition is selected from the group consisting of aminophenyl, 3-(m-aminophenoxy) propyl, N-phenylaminopropyl, or (chloromethyl) phenyl substituted alkoxy, acyloxy, halogen, or amino silanes.

A thirtieth aspect includes the coated glass article of any of the second, sixth, or twenty-sixth aspects, wherein the first silane chemical composition is aminophenyltrimethoxy silane.

A thirty-first aspect includes the coated glass article of any of the second, sixth, or twenty-sixth aspects, wherein the coupling agent comprises at least one of: a mixture of the first silane chemical composition and the second silane chemical composition, wherein the second silane chemical composition is an aliphatic silane chemical composition; and a chemical composition formed from the oligomerization of at least the first silane chemical composition and the second silane chemical composition.

A thirty-second aspect includes the coated glass article of the thirty-first aspect, wherein a molar ratio of the first silane chemical composition and the second silane chemical composition is from about 0.1:1 to about 10:1.

A thirty-third aspect includes the coated glass article of the thirty-first aspect, wherein the first silane chemical composition is an aromatic alkoxysilane chemical composition comprising at least one amine moiety and the second silane chemical composition is an aliphatic alkoxysilane chemical composition comprising at least one amine moiety.

A thirty-fourth aspect includes the coated glass article of the thirty-first aspect, wherein the first silane chemical composition is selected from the group consisting of aminophenyl, 3-(m-aminophenoxy) propyl, N-phenylaminopropyl, or (chloromethyl) phenyl substituted alkoxy, acyloxy, halogen, or amino silanes, hydrolysates thereof, or oligomers thereof, and the second silane chemical composition is selected from the group consisting of 3-aminopropyl, N-(2-aminoethyl)-3-aminopropyl, vinyl, methyl, N-phenylaminopropyl, (N-phenylamino)methyl, N-(2-Vinylbenzylaminoethyl)-3-aminopropyl substituted alkoxy, acyloxy, halogen, or amino silanes, hydrolysates thereof, or oligomers thereof.

A thirty-fifth aspect includes the coated glass article of the thirty-first aspect, wherein the first silane chemical composition comprises at least one amine moiety and the second silane chemical composition comprises at least one amine moiety.

A thirty-sixth aspect includes the coated glass article of the thirty-first aspect, wherein the first silane chemical composition is aminophenyltrimethoxy silane and the second silane chemical composition is 3-aminopropyltrimethoxy silane.

A thirty-seventh aspect includes the coated glass article of the third or seventh aspects, wherein the oligomer is formed from at least aminophenyltrimethoxy silane.

A thirty-eighth aspect includes the coated glass article of the third or seventh aspects, wherein the oligomer is formed from at least aminophenyltrimethoxy silane and aminopropyltrimethoxy silane.

A thirty-ninth aspect includes the coated glass article of the third or seventh aspects, wherein the first diamine monomer chemical composition is ortho-Tolidine, the second diamine monomer chemical composition is 4,4'-methylene-bis(2-methylaniline), and the dianhydride monomer chemical composition is benzophenone-3,3',4,4'-tetracarboxylic dianhydride.

A fortieth aspect includes the coated glass article of any of the first, second, fourth, or fifth aspects, wherein the polymer chemical composition is a polyimide chemical composition.

A forty-first aspect includes the coated glass article of any of the first, second, fourth, or fifth aspects, wherein the polymer chemical composition is a polyimide chemical composition formed from the polymerization of: at least one monomer chemical composition comprising at least two amine moieties; and at least one monomer chemical composition comprising at least two anhydride moieties and having a benzophenone structure.

A forty-second aspect includes the coated glass article of the forty-first aspect, wherein the monomer chemical composition comprising at least two anhydride moieties is benzophenone-3,3',4,4'-tetracarboxylic dianhydride.

A forty-third aspect includes the coated glass article of any of the first, second, fourth, or fifth aspects, wherein the polymer chemical composition is a polyimide chemical composition formed from the polymerization of at least: a first monomer chemical composition, the first monomer chemical composition comprising at least two amine moieties; a second monomer chemical composition, the second monomer chemical composition comprising at least two amine moieties; and a third monomer chemical composition, the third monomer chemical composition comprising at least two anhydride moieties; wherein the first monomer chemical composition is different than the second monomer chemical composition.

A forty-fourth aspect includes the coated glass article of the forty-third aspect, wherein the third monomer chemical composition has a benzophenone structure.

A forty-fifth aspect includes the coated glass article of the forty-fourth aspect, wherein the third monomer composition is benzophenone-3,3',4,4'-tetracarboxylic dianhydride.

A forty-sixth aspect includes the coated glass article of the forty-third aspect, wherein the first monomer chemical composition comprises two aromatic ring moieties.

A forty-seventh aspect includes the coated glass article of the forty-sixth aspect, wherein the two aromatic ring moieties of the first monomer chemical composition are directly bonded to one another.

A forty-eighth aspect includes the coated glass article of the forty-seventh aspect, wherein the second monomer chemical composition comprises two aromatic ring moieties and the two aromatic ring moieties of the second monomer chemical composition are bonded with an alkyl moiety.

A forty-ninth aspect includes the coated glass article of the forty-eighth aspect, wherein a molar ratio of the first monomer chemical composition to the second monomer chemical composition is between about 0.01:0.49 to about 0.40:0.10.

A fiftieth aspect includes the coated glass article of the forty-sixth aspect, wherein the two aromatic ring moieties of the first monomer chemical composition are bonded with an alkyl moiety.

A fifty-first aspect includes the coated glass article of the forty-sixth aspect, wherein the first monomer chemical composition comprises a tolidine structure.

A fifty-second aspect includes the coated glass article of the fifty-first aspect, wherein the first monomer chemical composition is ortho-Tolidine.

A fifty-third aspect includes the coated glass article of the fifty-first aspect, wherein the first monomer chemical composition is 4,4'-methylene-bis(2-methylaniline).

A fifty-fourth aspect includes the coated glass article of the fifty-first aspect, wherein the first monomer chemical composition is ortho-Tolidine and the second monomer chemical composition is 4,4'-methylene-bis(2-methylaniline).

A fifty-fifth aspect includes the coated glass article of the forty-sixth aspect, wherein the second monomer chemical composition comprises an aromatic ring moiety.

A fifty-sixth aspect includes the coated glass article of any of the first through fifty-fifth aspects, wherein the low-friction coating has a mass loss of less than about 5% of its mass when heated from a temperature of 150° C. to 350° C. at a ramp rate of about 10° C./minute.

In a fifty-seventh aspect, a low-friction coating for a substrate, the low-friction coating comprising: a polyimide chemical composition; and a coupling agent comprising at least one of: a mixture of a first silane chemical composition, a hydrolysate thereof, or an oligomer thereof, and a second silane chemical composition, a hydrolysate thereof, or an oligomer thereof, wherein the first silane chemical composition is an aromatic silane chemical composition and the second silane chemical composition is an aliphatic silane chemical composition; and a chemical composition formed from the oligomerization of at least the first silane chemical composition and the second silane chemical composition, wherein: the coated glass article is thermally stable at a temperature of at least about 260° C. for 30 minutes; a light transmission through the coated glass article is greater than or equal to about 55% of a light transmission through an uncoated glass article for wavelengths from about 400 nm to about 700 nm; and the low-friction coating has a mass loss of less than about 5% of its mass when heated from a temperature of 150° C. to 350° C. at a ramp rate of about 10° C./minute.

A fifty-eighth aspect includes the coated glass article of the fifty-seventh aspect, wherein the glass body comprises ion-exchanged glass.

A fifty-ninth aspect includes the coated glass article of the fifty-seventh aspect, wherein the polyimide chemical composition is formed from the polymerization of: at least one monomer chemical composition comprising at least two amine moieties; and at least one monomer chemical composition comprising at least two anhydride moieties and having a benzophenone structure.

A sixtieth aspect includes the coated glass article of the fifty-seventh aspect, wherein the polyimide chemical composition is formed from the polymerization of at least benzophenone-3,3',4,4'-tetracarboxylic dianhydride, ortho-Tolidine, and 4,4'-methylene-bis(2-methylaniline).

A sixty-first aspect includes the coated glass article of the fifty-seventh aspect, wherein the first silane chemical composition comprises at least one amine moiety.

A sixty-second aspect includes the coated glass article of the fifty-seventh aspect, wherein the first silane chemical composition is aminophenyltrimethoxy silane and the second silane chemical composition is 3-aminopropyltrimethoxy silane.

In a sixty-third aspect, a process for producing a coated glass container comprises: loading a plurality of glass containers into a cassette; immersing the cassette and the plurality of glass containers in a bath of molten alkali salt; removing the cassette and the glass containers from the bath of molten alkali salt; immersing the cassette and the plurality of glass containers in a water bath to remove residual alkali salt from the glass containers; washing the glass containers with deionized water; and coating the glass containers with a low-friction coating.

A sixty-fourth aspect includes the coated glass article of the sixty-third aspect, wherein the cassette and the plurality of glass containers are preheated prior to being immersed in the bath of molten alkali salt.

A sixty-fifth aspect includes the coated glass article of the sixty-third aspect, wherein the bath of molten alkali salt is 100% KNO3 at a temperature of greater than or equal to about 350° C. and less than or equal to about 500° C.

A sixty-sixth aspect includes the coated glass article of the sixty-third aspect, wherein the cassette and the glass containers are held in the bath of molten alkali salt for a holding period sufficient to achieve a depth of layer up to about 100 µm and a compressive stress greater than or equal to 300 MPa in the surface of the glass container.

A sixty-seventh aspect includes the coated glass article of the sixty-fifth aspect, wherein the holding period is less than 30 hours.

A sixty-eighth aspect includes the coated glass article of the sixty-third aspect, wherein, after the cassette and glass containers are removed from the bath of molten alkali salt, the cassette is rotated about a horizontal axis to empty molten salt from the glass containers.

A sixty-ninth aspect includes the coated glass article of the sixty-third aspect, wherein the cassette and glass containers are suspended over the bath of molten alkali salt as the cassette is rotated.

A seventieth aspect includes the coated glass article of the sixty-third aspect, wherein the cassette and glass containers are cooled before being immersed in the water bath.

A seventy-first aspect includes the coated glass article of the sixty-third aspect, wherein the water bath is a first water bath and the cassette and glass containers are immersed in a second water bath after being immersed in the first water bath.

A seventy-second aspect includes the coated glass article of the sixty-third aspect, further comprising unloading the glass containers from the cassette prior to washing the glass containers in deionized water.

A seventy-third aspect includes the coated glass article of the sixty-third aspect, wherein coating the glass containers with a low-friction coating comprises applying a coating solution to the glass containers.

A seventy-fourth aspect includes the coated glass article of the sixty-third aspect, wherein coating the glass containers with a low-friction coating comprises: applying a coupling agent to an exterior surface of the glass containers; and applying a polymer coating to the glass containers over the coupling agent.

A seventy-fifth aspect includes the coated glass article of the seventy-fourth aspect, wherein the coupling agent and the polymer coating solution are dip coated onto the glass container.

A seventy-sixth aspect includes the coated glass article of the seventy-fourth aspect, wherein the coupling agent and the polymer coating solution are spray coated onto the glass container.

A seventy-seventh aspect includes the coated glass article of the seventy-fourth aspect, wherein the coupling agent and the polymer coating solution are misted or fogged onto the glass container.

A seventy-eighth aspect includes the coated glass article of the seventy-fourth aspect, wherein the coupling agent and the polymer coating solution are transferred onto the glass container by any solution transfer technique (swabbed, brushed, printed, rolled on, etc.).

A seventy-ninth aspect includes the coated glass article of the seventy-fourth aspect, wherein the glass surface with an applied coupling agent is heat treated prior to applying the polymer coating solution.

A eightieth aspect includes the coated glass article of the seventy-ninth aspect, wherein the glass surface with an applied coupling agent is heat treated by heating the glass containers in an oven.

An eighty-first aspect includes the coated glass article of the seventy-fourth aspect, further comprising curing the polymer coating solution after the polymer coating solution is applied to the glass container.

An eighty-second aspect includes the coated glass article of the seventy-fourth aspect, wherein the coupling agent and/or polymer coating is thermally cured.

An eighty-third aspect includes the coated glass article of the seventy-fourth aspect, wherein the coupling agent and/or polymer coating is cured with UV light.

It should now be understood that the glass containers with low frictive coatings described herein exhibit improved resistance to mechanical damage as a result of the application of the low frictive coating and, as such, the glass containers have enhanced mechanical durability. This property makes the glass containers well suited for use in various applications including, without limitation, pharmaceutical packaging materials.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of making a coated pharmaceutical container, the method comprising the steps of:
    forming a glass tube;
    forming the glass tube into a pharmaceutical container comprising an interior surface and an exterior surface, wherein the pharmaceutical container comprises a glass composition that has Class HGA1 hydrolytic resistance when tested according to the ISO 720 testing standard; and
    applying a coating to the exterior surface but not on any portion of the interior surface, wherein the coating comprises a polymer;
    wherein:
        the coating has a coefficient of friction less than or equal to 0.7, wherein the coefficient of friction is a maximum coefficient of friction measured relative to a second pharmaceutical container in a vial-on-vial testing jig under a normal load of 30 N, the second pharmaceutical container formed from the same glass composition and comprising the same coating and subjected to the same environmental conditions prior to measurement of the coefficient of friction;
        the coated pharmaceutical container is thermally stable after heating to a temperature of at least 260° C. for a time period of 30 minutes; and
        the coating has a thickness of less than 100 nm.

2. The method of claim 1, wherein the applying the coating comprises a dipping process, a spraying process, or both.

3. The method of claim 1, wherein the polymer comprises one or more of polyimides, fluoropolymers, silsesquioxane-based polymers, and silicone resins.

4. The method of claim 1, wherein the applying the coating comprises:
   applying a coupling agent layer in direct contact with the exterior surface; and
   applying a polymer layer in direct contact with the coupling agent layer.

5. The method of claim 1, further comprising a step of subjecting the pharmaceutical container to depyrogenation.

6. The method of claim 5, wherein the depyrogenation comprises heating the coated pharmaceutical container to a temperature of from about 250° C. to about 400° C. for a time period of from about 30 minutes to about 72 hours.

7. The method of claim 1, the glass of the pharmaceutical container is borosilicate glass.

8. The method of claim 1, the glass of the pharmaceutical container is alkali aluminosilicate glass.

9. The method of claim 1, wherein the coating has a coefficient of friction that is at least 20% less than an uncoated glass pharmaceutical container, wherein the coefficient of friction of the uncoated glass pharmaceutical container is a maximum coefficient of friction measured relative to a second uncoated pharmaceutical container in a vial-on-vial testing jig under a normal load of 30 N, the second uncoated pharmaceutical container formed from the same glass composition and subjected to the same environmental conditions prior to measurement as the second uncoated pharmaceutical container.

10. A method of making a coated pharmaceutical container, the method comprising the steps of:
   applying a coating to an exterior surface of a pharmaceutical container but not on any portion of an interior surface of the pharmaceutical container, wherein the coating comprises a polymer, and wherein the pharmaceutical container comprises a glass composition that has Class HGA1 hydrolytic resistance when tested according to the ISO 720 testing standard; and
   curing the coating by heating;
   wherein:
      the coating has a coefficient of friction less than or equal to 0.7, wherein the coefficient of friction is a maximum coefficient of friction measured relative to a second pharmaceutical container in a vial-on-vial testing jig under a normal load of 30 N, the second pharmaceutical container formed from the same glass composition and comprising the same coating and subjected to the same environmental conditions prior to measurement of the coefficient of friction;
      the pharmaceutical container is thermally stable after heating to a temperature at least 260° C. for a time period of 30 minutes; and
      the coating has a thickness of less than 100 nm.

11. The method of claim 10, wherein the applying the coating comprises a dipping process, a spraying process, or both.

12. The method of claim 10, wherein the polymer comprises one or more of polyimides, fluoropolymers, silsesquioxane-based polymers, and silicone resins.

13. The method of claim 10, wherein the applying the coating comprises:
   applying a coupling agent layer in direct contact with an exterior surface of the pharmaceutical container; and
   applying a polymer layer in direct contact with the coupling agent layer.

14. The method of claim 10, the glass of the pharmaceutical container is borosilicate glass.

15. The method of claim 10, the glass of the pharmaceutical container is alkali aluminosilicate glass.

16. The method of claim 10, wherein the coating has a coefficient of friction that is at least 20% less than an uncoated glass pharmaceutical container, wherein the coefficient of friction of the uncoated glass pharmaceutical container is a maximum coefficient of friction measured relative to a second uncoated pharmaceutical container in a vial-on-vial testing jig under a normal load of 30 N, the second uncoated pharmaceutical container formed from the same glass composition and subjected to the same environmental conditions prior to measurement as the second uncoated pharmaceutical container.

17. A method of making a coated pharmaceutical container, the method comprising the steps of:
   forming a glass tube;
   forming the glass tube into a pharmaceutical container comprising an interior surface and an exterior surface, wherein the pharmaceutical container comprises a glass composition that has Class HGA1 hydrolytic resistance when tested according to the ISO 720 testing standard;
   applying a coating to the exterior surface but not on any portion of an interior surface of the pharmaceutical container, wherein the coating comprises a polymer and wherein the coating is a low-friction coating; and
   subjecting the pharmaceutical container to a lyophilization condition, wherein:
      the coating has a coefficient of friction that does not increase by more than 30% after the lyophilization condition, wherein the coefficient of friction is a maximum coefficient of friction measured relative to a second pharmaceutical container in a vial-on-vial testing jig under a normal load of 30 N, the second pharmaceutical container formed from the same glass composition and comprising the same coating and subjected to the same environmental conditions prior to measurement of the coefficient of friction;
      the coated pharmaceutical container is thermally stable after heating to a temperature of at least 260° C. for a time period of 30 minutes; and
      the coating has a thickness of less than 100 nm.

18. The method of claim 17, wherein the lyophilization condition comprises filling the pharmaceutical container with a liquid that contains protein and then freezing at a temperature of −100° C., followed by water sublimation for 20 hours at −15° C. under vacuum.

19. The method of claim 17, wherein the applying the coating comprises a dipping process, a spraying process, or both.

20. The method of claim 17, wherein the applying the coating comprises:
   applying a coupling agent layer in direct contact with the exterior surface; and
   applying a polymer layer in direct contact with the coupling agent layer.

21. The method of claim 17, further comprising subjecting the pharmaceutical container to depyrogenation.

22. A method of making a coated pharmaceutical container, the method comprising the steps of:
   forming a glass tube;
   forming the glass tube into a pharmaceutical container comprising an interior surface and an exterior surface, wherein the pharmaceutical container comprises a glass composition that has Class HGA1 hydrolytic resistance when tested according to the ISO 720 testing standard; and applying a coating to the exterior surface but not on any portion of the interior surface, wherein the coating comprises a polymer;

wherein:
the coating has a coefficient of friction less than or equal to 0.7, wherein the coefficient of friction is a maximum coefficient of friction measured relative to a second pharmaceutical container in a vial-on-vial testing jig under a normal load of 30 N, the second pharmaceutical container formed from the same glass composition and comprising the same coating and subjected to the same environmental conditions prior to measurement of the coefficient of friction;

the coated pharmaceutical container is thermally stable after heating to a temperature of at least 260° C. for a time period of 30 minutes; and the applying the coating comprises a dipping process, a spraying process, or both.

23. The method of claim 22, wherein the coating has a thickness of less than or equal to 1 micron.

24. The method of claim 22, wherein the polymer comprises one or more of polyimides, fluoropolymers, silsesquioxane-based polymers, and silicone resins.

25. The method of claim 22, wherein the applying the coating comprises:
applying a coupling agent layer in direct contact with the exterior surface; and
applying a polymer layer in direct contact with the coupling agent layer.

26. The method of claim 22, further comprising a step of subjecting the pharmaceutical container to depyrogenation.

27. The method of claim 26, wherein the depyrogenation comprises heating the coated pharmaceutical container to a temperature of from about 250° C. to about 400° C. for a time period of from about 30 minutes to about 72 hours.

28. The method of claim 22, the glass of the pharmaceutical container is borosilicate glass.

29. The method of claim 22, the glass of the pharmaceutical container is alkali aluminosilicate glass.

30. The method of claim 22, wherein the coating has a coefficient of friction that is at least 20% less than an uncoated glass pharmaceutical container, wherein the coefficient of friction of the uncoated glass pharmaceutical container is a maximum coefficient of friction measured relative to a second uncoated pharmaceutical container in a vial-on-vial testing jig under a normal load of 30 N, the second uncoated pharmaceutical container formed from the same glass composition and subjected to the same environmental conditions prior to measurement as the second uncoated pharmaceutical container.

31. The method of claim 22, wherein the applying of the coating comprises the dipping process.

32. The method of claim 22, wherein the applying of the coating comprises the spraying process.

33. A method of making a coated pharmaceutical container, the method comprising the steps of:
applying a coating to an exterior surface of a pharmaceutical container but not on any portion of an interior surface of the pharmaceutical container, wherein the coating comprises a polymer, and wherein the pharmaceutical container comprises a glass composition that has Class HGA1 hydrolytic resistance when tested according to the ISO 720 testing standard; and
curing the coating by heating;

wherein:
the coating has a coefficient of friction less than or equal to 0.7, wherein the coefficient of friction is a maximum coefficient of friction measured relative to a second pharmaceutical container in a vial-on-vial testing jig under a normal load of 30 N, the second pharmaceutical container formed from the same glass composition and comprising the same coating and subjected to the same environmental conditions prior to measurement of the coefficient of friction;

the pharmaceutical container is thermally stable after heating to a temperature at least 260° C. for a time period of 30 minutes; and the applying the coating comprises a dipping process, a spraying process, or both.

34. The method of claim 33, wherein the coating has a thickness of less than or equal to 1 micron.

35. The method of claim 33, wherein the polymer comprises one or more of polyimides, fluoropolymers, silsesquioxane-based polymers, and silicone resins.

36. The method of claim 33, wherein the applying the coating comprises:
applying a coupling agent layer in direct contact with an exterior surface of the pharmaceutical container; and
applying a polymer layer in direct contact with the coupling agent layer.

37. The method of claim 33, the glass of the pharmaceutical container is borosilicate glass.

38. The method of claim 33, the glass of the pharmaceutical container is alkali aluminosilicate glass.

39. The method of claim 33, wherein the coating has a coefficient of friction that is at least 20% less than an uncoated glass pharmaceutical container, wherein the coefficient of friction of the uncoated glass pharmaceutical container is a maximum coefficient of friction measured relative to a second uncoated pharmaceutical container in a vial-on-vial testing jig under a normal load of 30 N, the second uncoated pharmaceutical container formed from the same glass composition and subjected to the same environmental conditions prior to measurement as the second uncoated pharmaceutical container.

40. The method of claim 33, wherein the applying of the coating comprises the dipping process.

41. The method of claim 33, wherein the applying of the coating comprises the spraying process.

42. A method of making a coated pharmaceutical container, the method comprising the steps of:
forming a glass tube;
forming the glass tube into a pharmaceutical container comprising an interior surface and an exterior surface, wherein the pharmaceutical container comprises a glass composition that has Class HGA1 hydrolytic resistance when tested according to the ISO 720 testing standard;
applying a coating to the exterior surface but not on any portion of an interior surface of the pharmaceutical container, wherein the coating comprises a polymer and wherein the coating is a low-friction coating; and
subjecting the pharmaceutical container to a lyophilization condition, wherein:
the coating has a coefficient of friction that does not increase by more than 30% after the lyophilization condition, wherein the coefficient of friction is a maximum coefficient of friction measured relative to a second pharmaceutical container in a vial-on-vial testing jig under a normal load of 30 N, the second pharmaceutical container formed from the same glass composition and comprising the same coating and subjected to the same environmental conditions prior to measurement of the coefficient of friction;

the coated pharmaceutical container is thermally stable after heating to a temperature of at least 260° C. for a time period of 30 minutes; and the applying the coating comprises a dipping process, a spraying process, or both.

43. The method of claim 42, wherein the lyophilization condition comprises filling the pharmaceutical container with a liquid that contains protein and then freezing at a temperature of −100° C., followed by water sublimation for 20 hours at −15° C. under vacuum.

44. The method of claim 42, wherein the coating has a thickness of less than or equal to 1 micron.

45. The method of claim 42, wherein the applying the coating comprises:

applying a coupling agent layer in direct contact with the exterior surface; and applying a polymer layer in direct contact with the coupling agent layer.

46. The method of claim 42, further comprising subjecting the pharmaceutical container to depyrogenation.

47. The method of claim 42, wherein the applying of the coating comprises the dipping process.

48. The method of claim 42, wherein the applying of the coating comprises the spraying process.

* * * * *

UNITED STATES PATENT AND TRADEMARK OFFICE
CERTIFICATE OF CORRECTION

PATENT NO.      : 11,872,189 B2
APPLICATION NO. : 16/870657
DATED           : January 16, 2024
INVENTOR(S)     : Andrei Gennadyevich Fadeev et al.

It is certified that error appears in the above-identified patent and that said Letters Patent is hereby corrected as shown below:

On the Title Page

On the page 3, in Column 1, item [56] under "U.S. Patent Documents", Line 57, delete "Tenze et al." and insert -- Henze et al. --.

On the page 5, in Column 2, item [56] under "Other Publications", Line 17, delete "polymide" and insert -- polyimide --.

Signed and Sealed this
Twentieth Day of January, 2026

John A. Squires
*Director of the United States Patent and Trademark Office*